United States Patent
Maeda et al.

(10) Patent No.: US 7,529,417 B2
(45) Date of Patent: May 5, 2009

(54) APPARATUS, METHOD AND STORAGE MEDIUM FOR IMAGE ENCODING/DECODING USING SHAPE-BASED COEFFICIENT INTERPOLATION

(75) Inventors: Mitsuru Maeda, Tokyo (JP); Hiroshi Kajiwara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 11/176,665

(22) Filed: Jul. 8, 2005

(65) Prior Publication Data

US 2006/0013304 A1    Jan. 19, 2006

(30) Foreign Application Priority Data

| Jun. 6, 2000 | (JP) | ............................. 2005-166170 |
| Jul. 9, 2004 | (JP) | ............................. 2004-203703 |
| Jul. 9, 2004 | (JP) | ............................. 2004-203704 |
| Jun. 6, 2005 | (JP) | ............................. 2005-166169 |

(51) Int. Cl.
G06K 9/36 (2006.01)
G06K 9/46 (2006.01)
H04N 7/12 (2006.01)
H04N 11/02 (2006.01)
H04N 11/04 (2006.01)

(52) U.S. Cl. .................... 382/233; 382/248; 348/395.1; 348/398.1; 375/240.19

(58) Field of Classification Search ................. 382/232, 382/233, 248, 250; 348/395.1, 398.1, 400.1–407.1; 358/426.01, 426.14; 375/240.18–240.2

See application file for complete search history.

(56) References Cited

U.S. PATENT DOCUMENTS

| 5,929,912 | A | * | 7/1999 | Aono et al. ............. 375/240.11 |
| 5,945,930 | A |   | 8/1999 | Kajiwara ..................... 341/50 |
| 6,028,963 | A |   | 2/2000 | Kajiwara .................... 382/239 |
| 6,031,938 | A |   | 2/2000 | Kajiwara .................... 382/239 |
| 6,101,282 | A |   | 8/2000 | Hirabayashi et al. ........ 382/246 |
| 6,208,693 | B1 | * | 3/2001 | Chen et al. ............. 375/240.24 |
| 6,233,355 | B1 |   | 5/2001 | Kajiwara .................... 382/238 |
| 6,310,980 | B1 |   | 10/2001 | Kajiwara .................... 382/238 |
| 6,501,859 | B1 |   | 12/2002 | Kajiwara .................... 382/239 |
| 6,549,676 | B1 |   | 4/2003 | Nakayama et al. .......... 382/246 |
| 6,560,365 | B1 |   | 5/2003 | Nakayama et al. .......... 382/233 |
| 6,665,444 | B1 |   | 12/2003 | Kajiwara .................... 382/240 |
| 6,711,295 | B2 |   | 3/2004 | Nakayama et al. .......... 382/232 |
| 6,768,819 | B2 |   | 7/2004 | Yamazaki et al. ........... 382/240 |
| 6,847,735 | B2 |   | 1/2005 | Kajiwara et al. ............ 382/233 |

(Continued)

OTHER PUBLICATIONS

J.E. Fowler ("Shape-adaptive Tarp Coding", IEEE Proc. ICIP, vol. 1, Sep. 14-17, 2003, pp. 621-624) discloses a shape-adaptive coding.*

*Primary Examiner*—Yubin Hung
(74) *Attorney, Agent, or Firm*—Fitzpatrick, Cella, Harper & Scinto

(57) ABSTRACT

An image encoding/decoding apparatus is provided, including a frequency band division unit for dividing image data into a plurality of frequency bands to generate sub-band coefficients, a sub-band coefficient interpolation unit for interpolating sub-band coefficients outside a region of a shape by using shape information representing a shape of the image data and the sub-band coefficients in the region of the shape, an encoding unit for encoding the interpolated sub-band coefficients to generate encoded data, and a shape information encoding unit for encoding the shape information to generate shape information encoded data.

10 Claims, 61 Drawing Sheets

U.S. PATENT DOCUMENTS

| | | |
|---|---|---|
| 6,879,726 B2 | 4/2005 | Sato et al. .................... 382/239 |
| 6,879,727 B2 | 4/2005 | Sato et al. .................... 382/239 |
| 6,917,716 B2 | 7/2005 | Kajiwara et al. ............ 382/240 |
| 6,947,600 B1 | 9/2005 | Sato et al. .................... 382/233 |
| 6,985,630 B2 | 1/2006 | Kajiwara .................... 382/233 |
| 7,013,050 B2 | 3/2006 | Kajiwara .................... 382/240 |
| 7,031,536 B2 | 4/2006 | Kajiwara .................... 382/240 |
| RE39,984 E | 1/2008 | Kajiwara .................... 382/239 |
| 7,437,007 B1* | 10/2008 | Augustine et al. ............ 382/235 |
| 2001/0047517 A1* | 11/2001 | Christopoulos et al. ....... 725/87 |
| 2002/0025078 A1* | 2/2002 | Bottou ....................... 382/240 |
| 2002/0064312 A1* | 5/2002 | Yamaguchi et al. ......... 382/233 |
| 2003/0002742 A1* | 1/2003 | Sano et al. ................... 382/239 |
| 2004/0013312 A1 | 1/2004 | Kajiwara .................... 382/240 |
| 2004/0213347 A1 | 10/2004 | Kajiwara ............... 375/240.11 |
| 2005/0100226 A1 | 5/2005 | Kajiwara et al. ............ 382/232 |
| 2005/0249283 A1 | 11/2005 | Kajiwara et al. ....... 375/240.12 |
| 2005/0276332 A1* | 12/2005 | Van Der Tol et al. .... 375/240.18 |
| 2006/0045362 A1 | 3/2006 | Ito et al. ..................... 382/232 |
| 2006/0210176 A1 | 9/2006 | Kajiwara et al. ............ 382/232 |

* cited by examiner

| a | a | a | a | A | a | a | a | a |
|---|---|---|---|---|---|---|---|---|
| a | b | a | B | A | b | a | b | a |
| a | b | C | B | A | b | c | b | a |
| c | D | C | B | A | b | c | d | c |
| E | D | C | B | A | b | c | d | e |
| a | f | a | f | A | F | a | f | a |
| a | b | C | B | A | F | G | f | a |
| c | D | C | B | A | F | G | H | g |
| E | D | C | B | A | F | G | H | I |

| a | a | a | a | A | a | a | a | a |
|---|---|---|---|---|---|---|---|---|
| a | b | a | B | A | b | a | b | a |
| a | b | C | B | A | b | c | b | a |
| c | D | C | B | A | F | a | f | a |
| E | D | C | B | A | b | c | d | e |
| a | a | a | a | A | a | a | a | a |
| a | f | a | f | A | F | a | f | a |
| a | f | g | f | A | F | G | f | a |
| a | b | a | B | A | F | G | H | g |
| i | h | g | f | A | F | G | H | I |

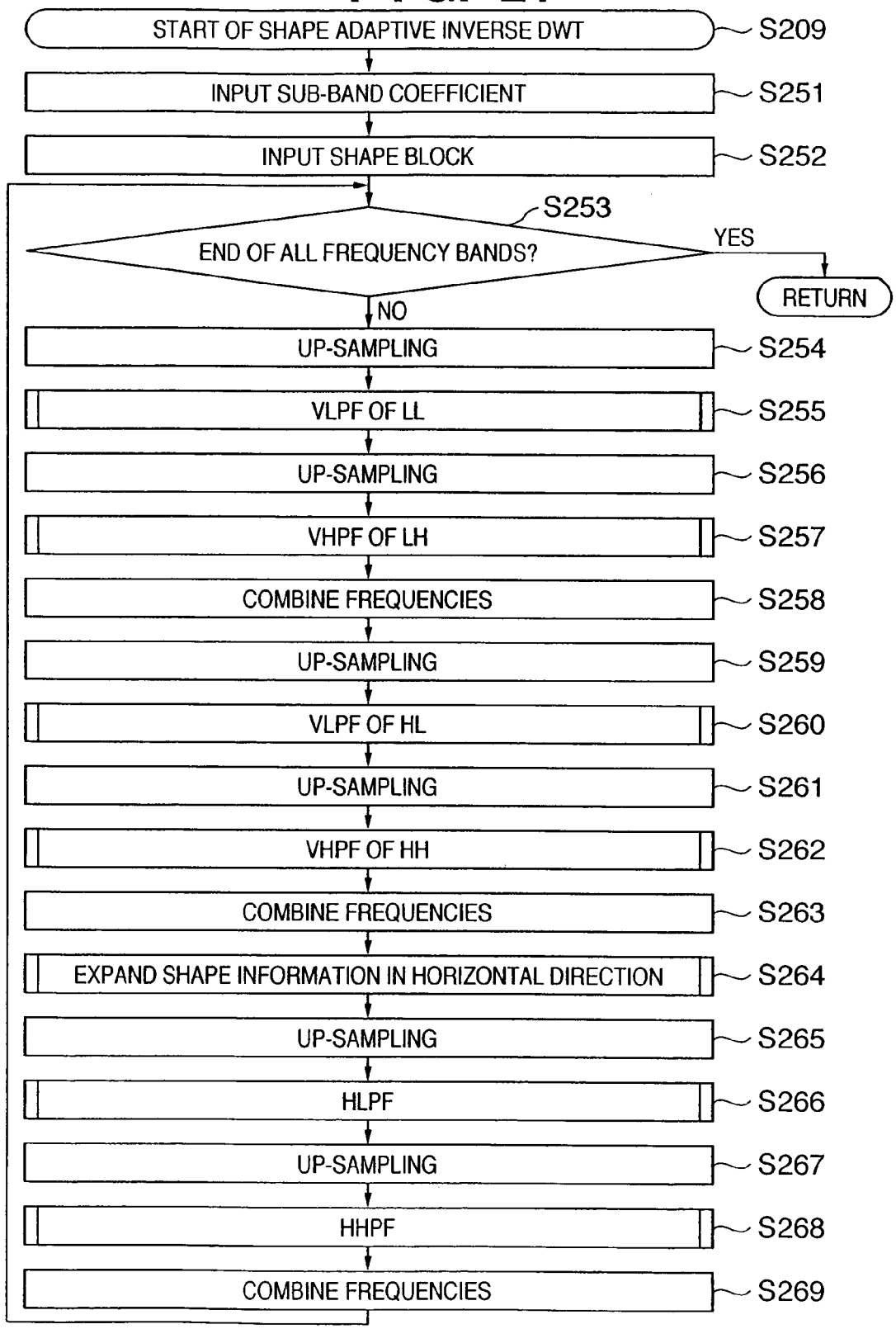

FIG. 30

|   |   |   |   | A |   |   |   |   |
|---|---|---|---|---|---|---|---|---|
|   |   |   | B | A |   |   |   |   |
|   |   | C | B | A |   |   |   |   |
|   | D | C | B | A |   |   |   |   |
| E | D | C | B | A |   |   |   |   |
|   |   |   |   | A | F |   |   |   |
|   |   |   |   | A | F | G |   |   |
|   |   |   |   | A | F | G | H |   |
|   |   |   |   | A | F | G | H | I |

FIG. 31

| O | O | O | O | A | A | A | A | A |
|---|---|---|---|---|---|---|---|---|
| O | O | O | B | A | A | A | A | A |
| O | O | C | B | A | A | A | A | A |
| O | D | C | B | A | A | A | A | A |
| E | D | C | B | A | A | A | A | A |
| O | O | O | O | A | F | F | F | F |
| O | O | O | O | A | F | G | G | G |
| O | O | O | O | A | F | G | H | H |
| O | O | O | O | A | F | G | H | I |

FIG. 32

| O | O | O | O | A | A | A | A | A |
|---|---|---|---|---|---|---|---|---|
| O | O | O | B | A | A | A | A | A |
| O | O | C | B | A | A | A | A | A |
| O | D | C | B | A | A | A | A | A |
| E | D | C | B | A | A | A | A | A |
| E | D | C | B | A | F | F | F | F |
| E | D | C | B | A | F | G | G | G |
| E | D | C | B | A | F | G | H | H |
| E | D | C | B | A | F | G | H | I |

FIG. 33

|   |   |   |   | A |   |   |   |   |
|---|---|---|---|---|---|---|---|---|
|   |   |   | B | A |   |   |   |   |
|   |   | C |   | A |   |   |   |   |
|   | D |   |   | A |   |   |   |   |
| E | D | C | B | A |   |   |   |   |
|   |   |   |   | A | F |   |   |   |
|   |   |   |   | A |   | G |   |   |
|   |   | C |   | A |   |   | H |   |
|   |   |   |   | A | F | G | H | I |

FIG. 34

| | | | | A | | | | |
|---|---|---|---|---|---|---|---|---|
| | | | B | A | | | | |
| | | C | b | A | | | | |
| | D | c | c | A | | | | |
| E | D | C | B | A | | | | |
| | | | | A | F | | | |
| | | | | A | f | G | | |
| | | C | p | A | g | g | H | |
| | | | | A | F | G | H | I |

FIG. 35

|   |   |   |   | A |   |   |   |   |
|---|---|---|---|---|---|---|---|---|
|   |   |   | B | A |   |   |   |   |
|   |   | C | b | A |   |   |   |   |
|   | D | d | d | A |   |   |   |   |
| E | D | C | B | A |   |   |   |   |
|   |   | n | m | A | F |   |   |   |
|   |   | n | m | A | f | G |   |   |
|   |   | C | p | A | g | g | H |   |
|   |   |   |   | A | F | G | H | I |

FIG. 36

|   |   |   |   |   |   |   |   |   |
|---|---|---|---|---|---|---|---|---|
|   |   |   |   |   |   |   |   |   |
|   |   |   |   | A |   |   |   |   |
|   |   |   | B | A |   |   |   |   |
|   |   | C |   | A |   |   |   |   |
|   | D |   |   | A |   |   |   |   |
| E | D | C | B | A |   |   |   |   |
|   |   |   |   |   |   |   |   |   |
|   |   |   |   | A | F |   |   |   |
|   |   |   |   | A |   | G |   |   |
|   |   | C |   | A |   |   | H | I |
|   |   |   |   | A | F | G | H | I |

FIG. 37

|   |   |   |   |   |   |   |   |
|---|---|---|---|---|---|---|---|
| a | a | a | a | A | a | a | a |
| b | b | b | B | A | a | a | a |
| c | c | C | b | A | a | a | a |
| d | D | d | d | A | a | a | a |
| E | D | C | B | A | a | a | a |
|   |   |   |   |   |   |   |   |
| a | a | a | a | A | F | f | f |
| a | a | a | a | A | a | G | g | g |
| c | c | C | c | A | a | a | H | h |
| a | a | a | a | A | F | G | H | I |

FIG. 38

| a | a | a | a | a | a | a | a | a |
|---|---|---|---|---|---|---|---|---|
| a | a | a | a | A | a | a | a | a |
| b | b | b | B | A | a | a | a | a |
| c | c | C | c | A | a | a | a | a |
| d | D | d | d | A | a | a | a | a |
| E | D | C | B | A | a | a | a | a |
| e | d | c | b | a | a | a | a | a |
| a | a | a | a | A | F | f | f | f |
| a | a | a | a | A | a | G | g | g |
| c | c | C | c | A | a | a | H | h |
| a | a | a | a | A | F | G | H | I |

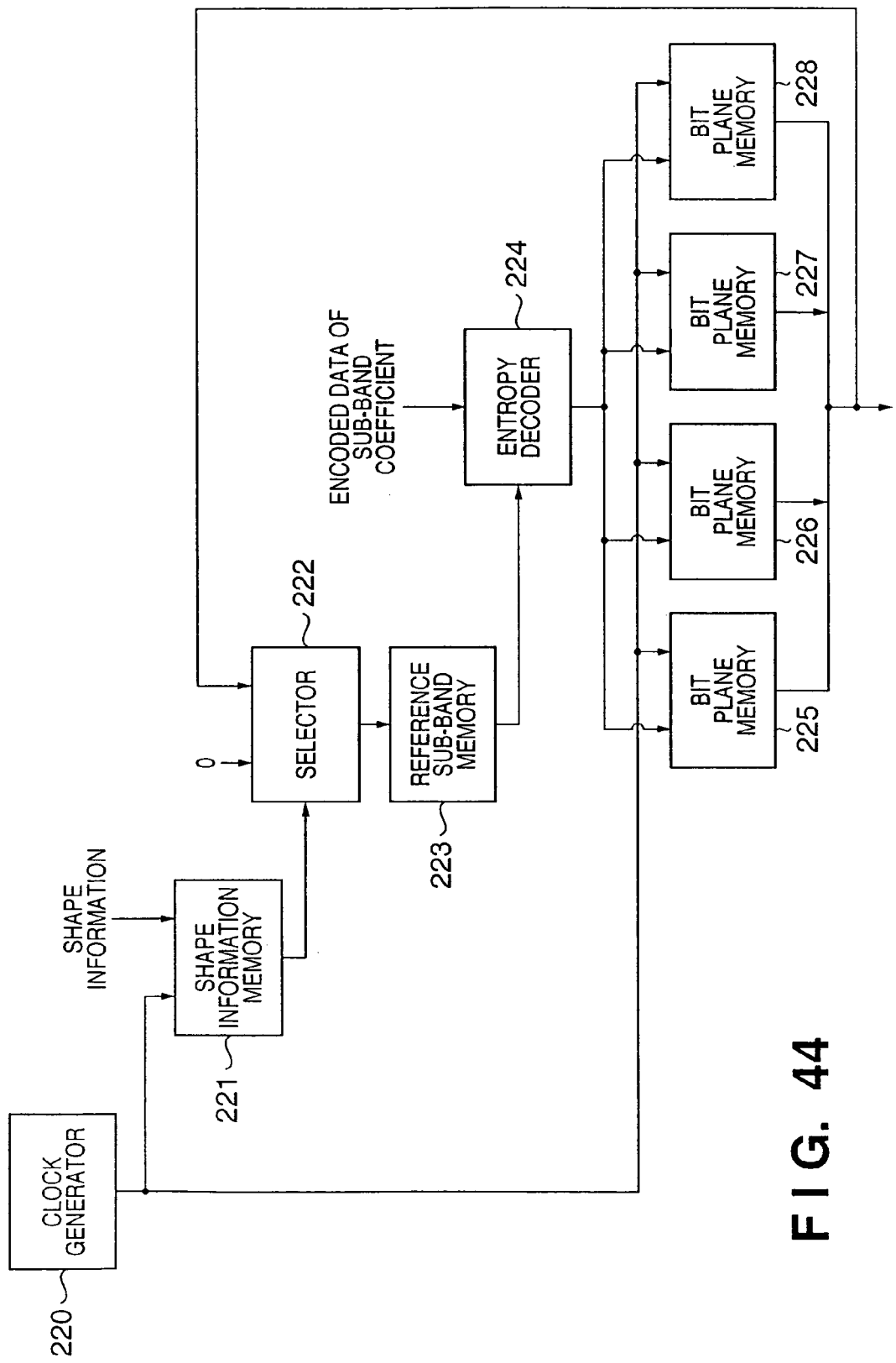
F I G. 44

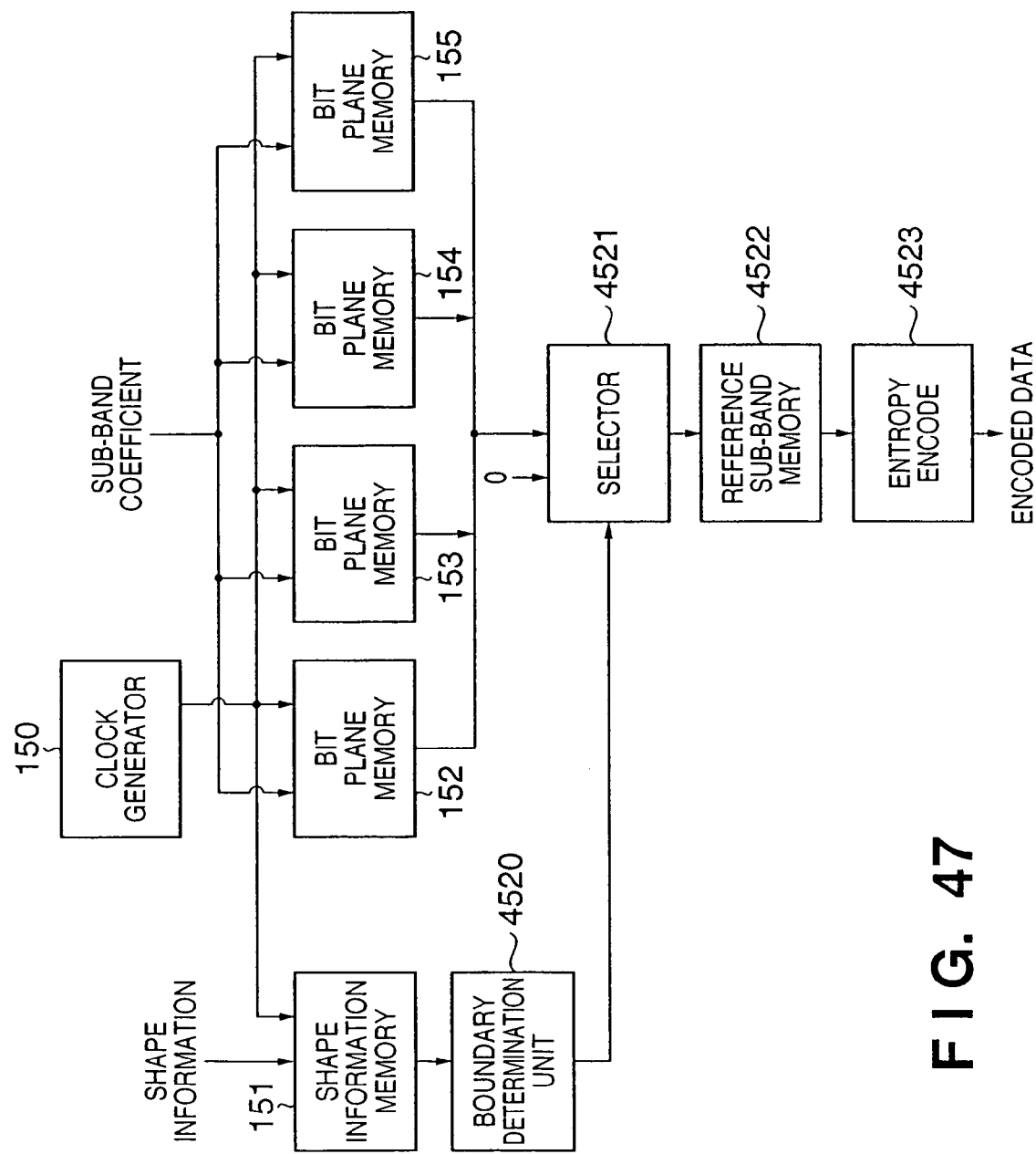
F I G. 47

US 7,529,417 B2

APPARATUS, METHOD AND STORAGE MEDIUM FOR IMAGE ENCODING/DECODING USING SHAPE-BASED COEFFICIENT INTERPOLATION

FIELD OF THE INVENTION

The present invention is related to an image encoding apparatus and decoding apparatus, image encoding method and decoding method, image encoding program and decoding program, and recording medium.

BACKGROUND OF THE INVENTION

In recent years, a variety of content including text information, still image information, and moving image information with large data amounts are supplied through networks. Under these circumstances, development of an encoding technology to compress the information amount progresses. The developed encoding technology, through international standardization, has become very standardized.

Networks themselves are also increasing in size and diversifying so that one content transmitted from the transmitting side reaches the receiving side through various environments. The processing functions of the transmitting- and receiving-side devices also exhibit diversification. A PC which is mainly used as a transmitter-receiver has greatly improved CPU performance and graphic performance. In addition, various devices with different processing performance specifications, including PDAs, cellular phones, TVs, and hard disk recorders, are equipped with a network connection function. For this reason, a function called scalability has received a great deal of attention, with which one datum data can cope with the variable communication line capacity or the processing performance of a receiving-side device.

A JPEG 2000 encoding method is widely known as a still image encoding method having a scalability function. This method is standardized internationally and described in detail in ISO/IEC 15444-1 (Information technology—JPEG 2000 image coding system—Part 1: Core coding system). As the characteristic feature of this method, DWT (Discrete Wavelet Transform) is executed for input image data to separate it into a plurality of frequency bands. The coefficients are quantized, and their values are arithmetically encoded for each bit plane. When a necessary number of bit planes are encoded or decoded, fine layer control can be executed.

The JPEG 2000 encoding method has also implemented ROI (Region Of Interest) which relatively increases the image quality of a region of interest in an image. This technique is not available in the conventional encoding technology.

FIG. 24 shows the encoding procedures of the JPEG 2000 encoding method. A tile division unit 9001 divides an input image into a plurality of regions (tiles). This function is also optional. A DWT unit 9002 executes DWT to separate the data into frequency bands. A quantization unit 9003 quantizes each coefficient. This function is optional. A ROI unit 9007, which is also optional, sets a region of interest. The quantization unit 9003 then executes shift-up. An entropy encoder 9004 executes entropy encoding by EBCOT (Embedded Block Coding with Optimized Truncation). A bit cutoff unit 9005 cuts off lower bits of the encoded data as needed so that rate control is accomplished. A code generator 9006 adds header information, selects various kinds of scalability functions, and outputs the encoded data.

FIG. 25 shows the decoding procedures of the JPEG 2000 encoding method. A code analyzing unit 9020 analyzes the header to obtain information to form layers. A bit cutoff unit 9021 cuts off lower bits of the input encoded data in correspondence with the capacity and decoding capability of the internal buffer. An entropy decoder 9022 decodes the encoded data by EBCOT to obtain quantized wavelet transform coefficients. An inverse quantization unit 9023 executes inverse quantization for the wavelet transform coefficients. An inverse DWT unit 9024 executes inverse DWT to play back the image data. A tile combination unit 9025 combines a plurality of tiles to play back the image data.

A motion JPEG 2000 method (ISO/IEC 15444-3 (Information technology—JPEG 2000 image coding system—Part 3: Motion JPEG 2000)) is also recommended, which executes moving image encoding by applying the JPEG 2000 encoding method to each frame of a moving image.

An MPEG-4 encoding method executes object encoding. FIG. 26 shows the encoding procedure. A block division unit 9031 divides image data into 8×8 blocks. An interpolation unit 9032 executes padding. A difference circuit 9033 subtracts predictive data by motion compensation. A DCT unit 9034 executes discrete cosine transform. A quantization unit 9035 executes quantization. The result is encoded by an entropy encoder 9036.

Information about the shape is divided by a block division unit 9043 into blocks as a unit of encoding and stored in a frame memory 9044 for reference. A difference circuit 9045 obtains the difference by referring to the frame memory 9044 in accordance with a motion vector obtained by a motion compensation unit 9042. The data is encoded by an entropy encoder 9046.

A code generator 9037 adds header information to encode the motion vector and outputs the motion vector together with the encoded data of the shape information and the encoded data of the quantized coefficients.

Simultaneously, an inverse quantization unit 9038 executes inverse quantization. An inverse DCT unit 9039 executes inverse transform of discrete cosine transform. An adding circuit 9040 adds predictive data. The data is stored in a frame memory 9041. The motion compensation unit 9042 obtains the motion vector by referring to the input image and the reference frame stored in the frame memory 9041, thereby generating predictive data.

When shape encoding is applied to a method of executing DWT, like the above-described JPEG 2000 encoding method, and interpolation is executed for each pixel, all transform coefficients are affected, resulting in degradation in quantization and the like. In addition, when interpolation is executed for each pixel, the correlation to a neighboring sub-band coefficient on the frequency space is low. Hence, the efficiency of arithmetic encoding cannot be increased.

SUMMARY OF THE INVENTION

It is an object of the present invention to execute encoding and decoding of encoded data at a high efficiency in correspondence with an arbitrary shape in an encoding method of encoding a sub-band coefficient.

According to an aspect of the present invention, there is provided an image encoding apparatus comprising a frequency band division unit for dividing image data into a plurality of frequency bands to generate sub-band coefficients, a sub-band coefficient interpolation unit for interpolating sub-band coefficients outside a region of a shape by using shape information representing a shape of the image data and the sub-band coefficients in the region of the shape, an encoding unit for encoding the interpolated sub-band coefficients to generate encoded data, and a shape information encoding unit for encoding the shape information to generate shape information encoded data.

According to another aspect of the present invention, there is provided an image decoding apparatus for decoding encoded data obtained by encoding image data and shape information encoded data obtained by encoding shape information representing a shape of the image data, comprising a shape information decoding unit for decoding the shape information encoded data to generate shape information, a decoding unit for decoding the encoded data to generate sub-band coefficients obtained by dividing the image data into a plurality of frequency bands, a frequency band combination unit for combining the frequency bands by generating the image data by interpolating and combining data to sub-band coefficients to be referred to outside a region of the shape with reference to the shape information, and an output unit for outputting the shape information and the image data.

According to yet another aspect of the present invention, there is provided an image encoding apparatus comprising a frequency band division unit for dividing image data into a plurality of frequency bands to generate sub-band coefficients, an integration unit for integrating the sub-band coefficients on the basis of shape information representing a shape of the image data, and an encoding unit for encoding sub-band coefficients in a region of the shape on the basis of the integrated sub-band coefficients and the shape information to generate encoded data.

According to still another aspect of the present invention, there is provided an image encoding apparatus comprising a frequency band division unit for dividing image data into a plurality of frequency bands to generate sub-band coefficients, a selection unit for, when of shape information representing a shape of the image data, shape information corresponding to a sub-band coefficient represents that the shape information belongs to an inside of a region of the shape, selecting the sub-band coefficient, and when the shape information represents that the shape information belongs to an outside of the region, selecting a predetermined value, and an encoding unit for encoding a sub-band coefficient to be encoded by referring to a value output from the selection unit on the basis of pieces of shape information corresponding to sub-band coefficients around the sub-band coefficient.

According to an aspect of the present invention, there is provided an image decoding apparatus for decoding encoded data obtained by encoding image data, comprising a shape information decoding unit for decoding shape information encoded data obtained by encoding shape information representing a shape of the image data to generate shape information, an integrated shape information generation unit for generating integrated shape information by integrating, of the shape information, information representing an inside of a region of the shape, a decoding unit for decoding the encoded data with reference to the integrated shape information to obtain a first sub-band coefficient sequence, an array change unit for changing an array of sub-band coefficients in the first sub-band coefficient sequence by using the shape information and the integrated shape information to generate a second sub-band coefficient sequence, and an image combination unit for combining image data with reference to the second sub-band coefficient sequence and the shape information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing coefficient values to be interpolated with coefficients according to the embodiment of the present invention;

FIG. 6 is a view showing coefficient values interpolated with coefficients according to the embodiment of the present invention;

FIG. 7 is a view showing coefficient values to be interpolated with coefficients according to the embodiment of the present invention;

FIG. 8 is a view showing coefficient values interpolated with coefficients according to the embodiment of the present invention;

FIG. 21 is a flowchart showing a processing operation of shape adaptive DWT according to the fifth embodiment of the present invention;

FIG. 30 is a view showing an example of input quantization results according to the first embodiment of the present invention;

FIG. 31 is a view showing an example of interpolation of quantization results according to the first embodiment of the present invention;

FIG. 32 is a view showing an example of interpolation of quantization results according to the first embodiment of the present invention;

FIG. 33 is a view showing an example of input quantization results according to the third embodiment of the present invention;

FIG. 34 is a view showing an example of interpolation of quantization results according to the third embodiment of the present invention;

FIG. 35 is a view showing an example of interpolation of quantization results according to the third embodiment of the present invention;

FIG. 36 is a view showing an example of input quantization results according to the fourth embodiment of the present invention;

FIG. 37 is a view showing an example of a result which is stored in a working area 508 in correspondence with the quantization results shown in FIG. 36;

FIG. 38 is a view showing an example of a result which is stored in the working area 508 in correspondence with the quantization results shown in FIG. 36;

FIG. 44 is a block diagram showing an arrangement example of a decoder according to the ninth embodiment of the present invention;

FIG. 47 is a block diagram showing an arrangement example of an encoder according to the 10th embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1:
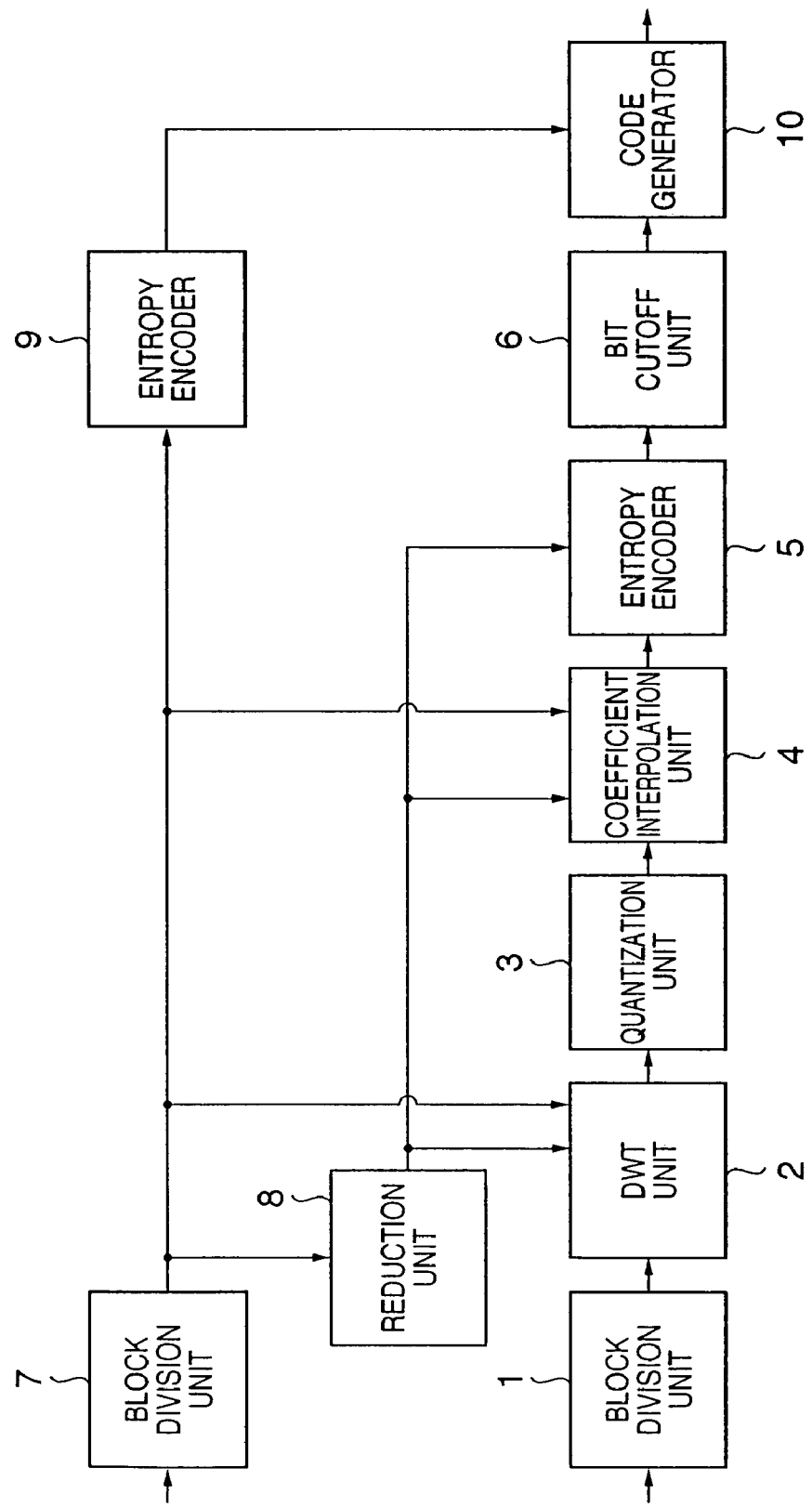
FIG. 1 is a block diagram showing the arrangement of a moving image encoding apparatus according to the first embodiment of the present invention.

The first embodiment of the present invention will be described below in detail with reference to the accompanying drawings. FIG. 1 is a block diagram showing a moving image encoding apparatus according to this embodiment.

In this embodiment, the Motion JPEG 2000 encoding method will be exemplified as an image encoding method used by the moving image encoding apparatus. However, the present invention is not limited to this. The MPEG-4 encoding method will be exemplified as a shape encoding method. However, the present invention is not limited to this.

Referring to FIG. 1, a block division unit 1 divides input image data into blocks. A DWT unit 2 executes DWT for the divided blocks. A quantization unit 3 quantizes sub-band coefficients obtained by DWT. A coefficient interpolation unit 4 interpolates sub-band coefficients outside a region in the quantization result. An entropy encoder 5 executes EBCOT of the JPEG 2000 encoding method for each bit plane. A bit cutoff unit 6 adjusts the bit rate. A block division unit 7 divides input shape information into blocks. A reduction unit 8 reduces the shape information divided into blocks in accordance with the frequency band of the DWT unit 2. An entropy encoder 9 encodes the shape information in accordance with shape encoding of the MPEG-4 encoding method. A code generator 10 generates a necessary header and generates encoded data on the basis of the outputs from the bit cutoff unit 6 and entropy encoder 9.

The moving image encoding operation of the moving image encoding apparatus with the above-described arrangement will be described below.

Figure 22A:
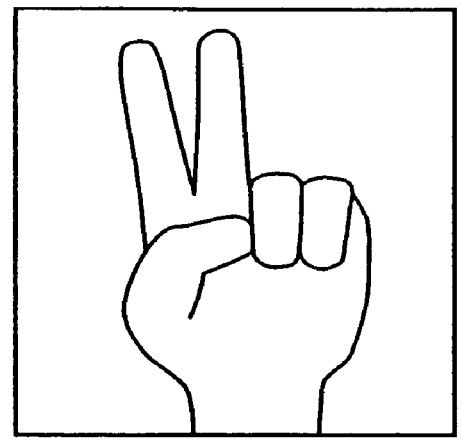
FIGS. 22A, 22B, and 22C are views showing input image examples and shape information according to the present invention.
Figure 22B:
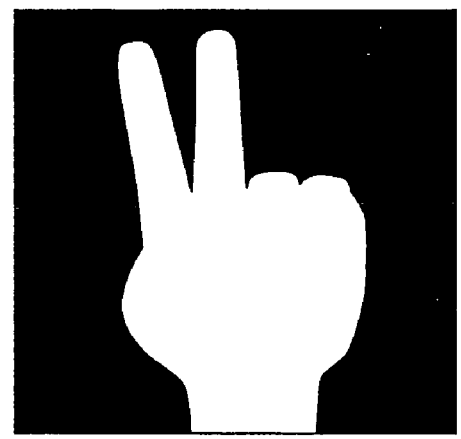

In this embodiment, moving image data is input for each frame. Simultaneously, separately extracted shape information is input. Shape information may be extracted in the apparatus, as a matter of course. Shape information is identification data representing whether image data is contained inside the object indicated by it or is present outside the object. Shape information is expressed by binary data. FIG. 22A shows input moving image data, and FIG. 22B shows its shape information.

Moving image data is input to the block division unit 1, and shape information is input to the block division unit 7. Each block division unit holds data of one frame, divides it into blocks, and outputs each block to the subsequent stage. The moving image data divided into blocks by the block division unit 1 is input to the DWT unit 2. The application count of DWT executed by the DWT unit 2 is 2, and the number of divided blocks is 7. However, the present invention is not limited to this.

The shape information divided into blocks is input to the entropy encoder 9 and reduction unit 8. The shape information is encoded by the entropy encoder 9 in accordance with shape encoding of the MPEG-4 encoding method and output to the code generator 10.

Figure 22C:
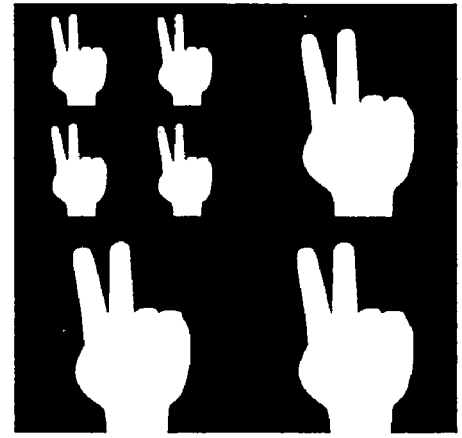

The reduction unit 8 reduces the received shape information in accordance with the application count in the DWT unit 2. When the application count of this embodiment is 2, the shape information is reduced to ½ and ¼. That is, letting T be the application count, reduced images of $(1/2)^N$ (N=1, ..., T) are generated. The pieces of reduced shape information correspond to frequency bands. FIG. 22C shows the pieces of shape information arranged.

Figure 2:
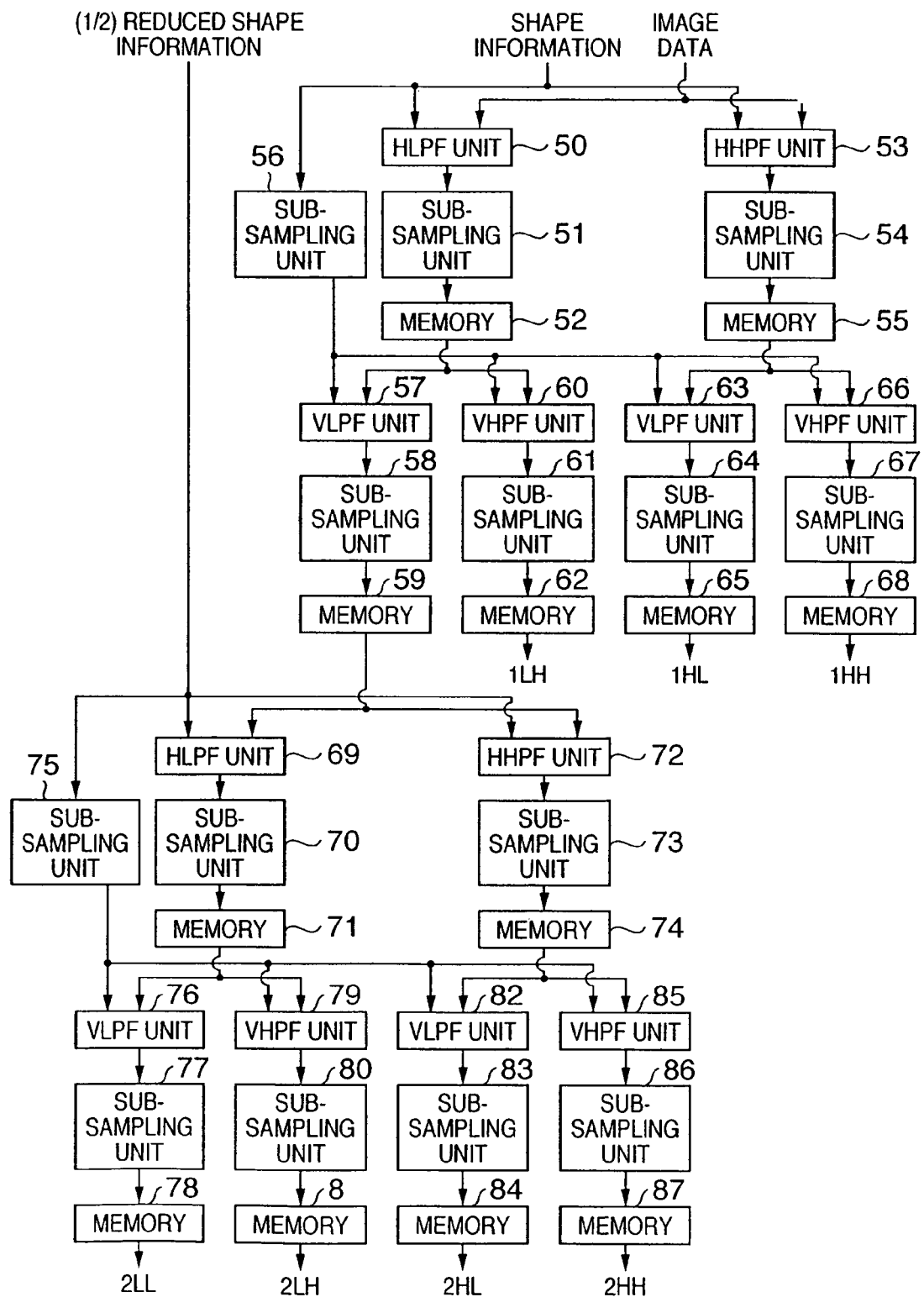
FIG. 2 is a block diagram showing the arrangement of a DWT unit according to the first and third embodiments of the present invention.

FIG. 2 is a block diagram showing the detailed arrangement of the DWT unit 2. Referring to FIG. 2, HLPF units 50 and 69 execute low-pass filter processing in the horizontal direction. HHPF units 53 and 72 execute high-pass filter processing in the horizontal direction. VLPF units 57, 63, 76, and 82 execute low-pass filter processing in the vertical direction. VHPF units 60, 66, 79, and 85 execute high-pass filter processing in the vertical direction. Sub-sampling units 56 and 75 execute ½ sub-sampling of shape information in the horizontal direction. Sub-sampling units 51, 54, 70, and 73 execute ½ sub-sampling of filter outputs in the horizontal direction. Sub-sampling units 58, 61, 64, 67, 77, 80, 83, and 86 execute ½ sub-sampling in the vertical direction. Memories 52, 55, 59, 62, 65, 68, 71, 74, 78, 81, 84, and 87 store filter processing results.

The DWT unit 2 receives image data from the block division unit 1, unreduced shape information from the block division unit 7, and shape information reduced to ½ from the reduction unit 8. The image data is input to the HLPF unit 50 and HHPF unit 53, in which filter processing is executed in the horizontal direction. An example using a 9-7 filter used in JPEG 2000 will be described. For a portion outside the region, pixel values are interpolated virtually, and 7-tap low-pass filtering and 9-tapped high-pass filtering are executed in the horizontal direction. However, present invention is not limited to this.

Figure 3:
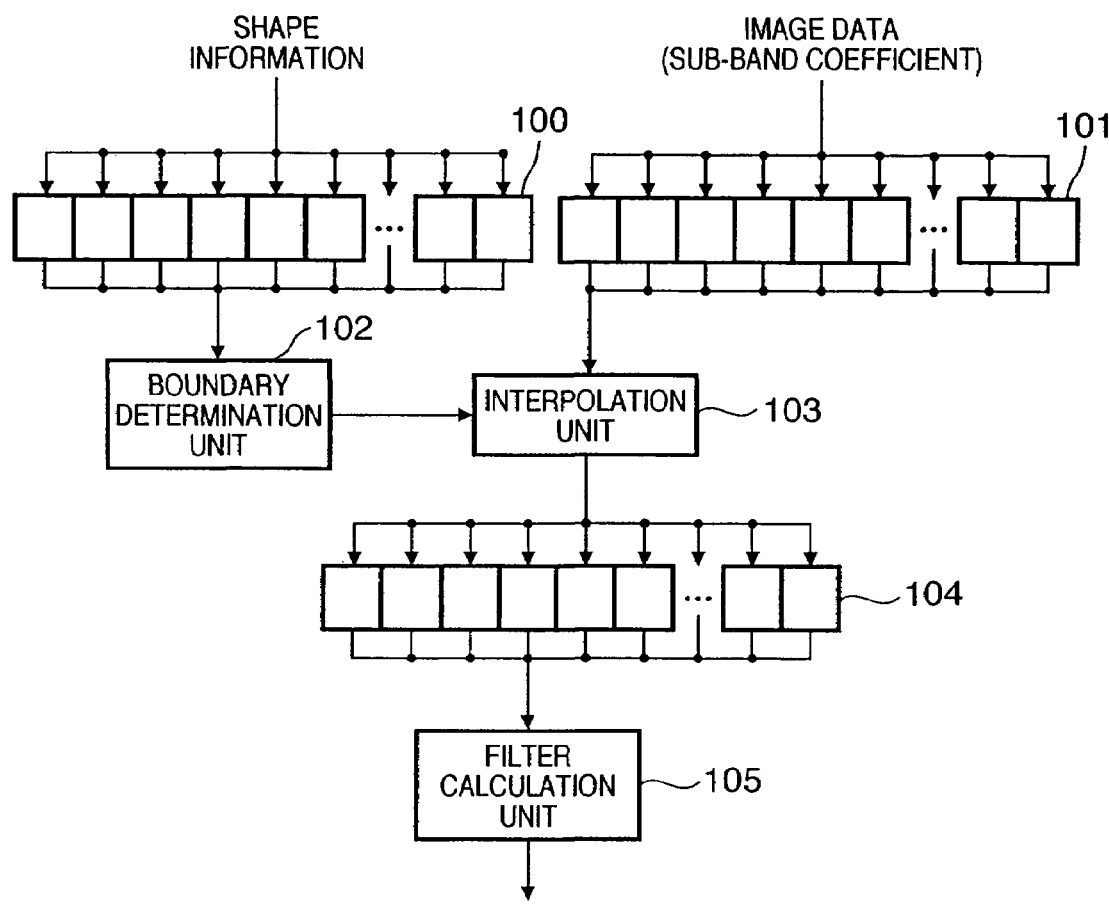
FIG. 3 is a block diagram showing the arrangements of a filter unit of the DWT unit according to the first and third embodiments of the present invention.

FIG. 3 is a block diagram showing details of each filter unit. Referring to FIG. 3, the number of taps depends on each filter. Here, a 9-tap filter will be exemplified.

A latch group 100 accumulates 9-pixel data of shape information. A latch group 101 accumulates 9-pixel data of image data. A boundary determination unit 102 determines boundaries from the input shape information. An interpolation unit 103 generates data to execute filter processing from the result from the boundary determination unit 102 and the image data in the latch group 101. A latch group 104 stores the output from the interpolation unit 103 for each coefficient. A filter calculation unit 105 executes filter calculation.

The shape information and the pixel values to be filtered are input to the latch groups 100 and 101, respectively. The boundary determination unit 102 detects, from the shape information, the boundaries to separate the inside and outside of the region and inputs the result to the interpolation unit 103. The interpolation unit 103 interpolates pixel values except the pixel at the filter center and neighboring inside region pixels. For the pixel values, interpolation is executed point-symmetrically with respect to the boundary by using the pixel values in the region.

Figure 5:
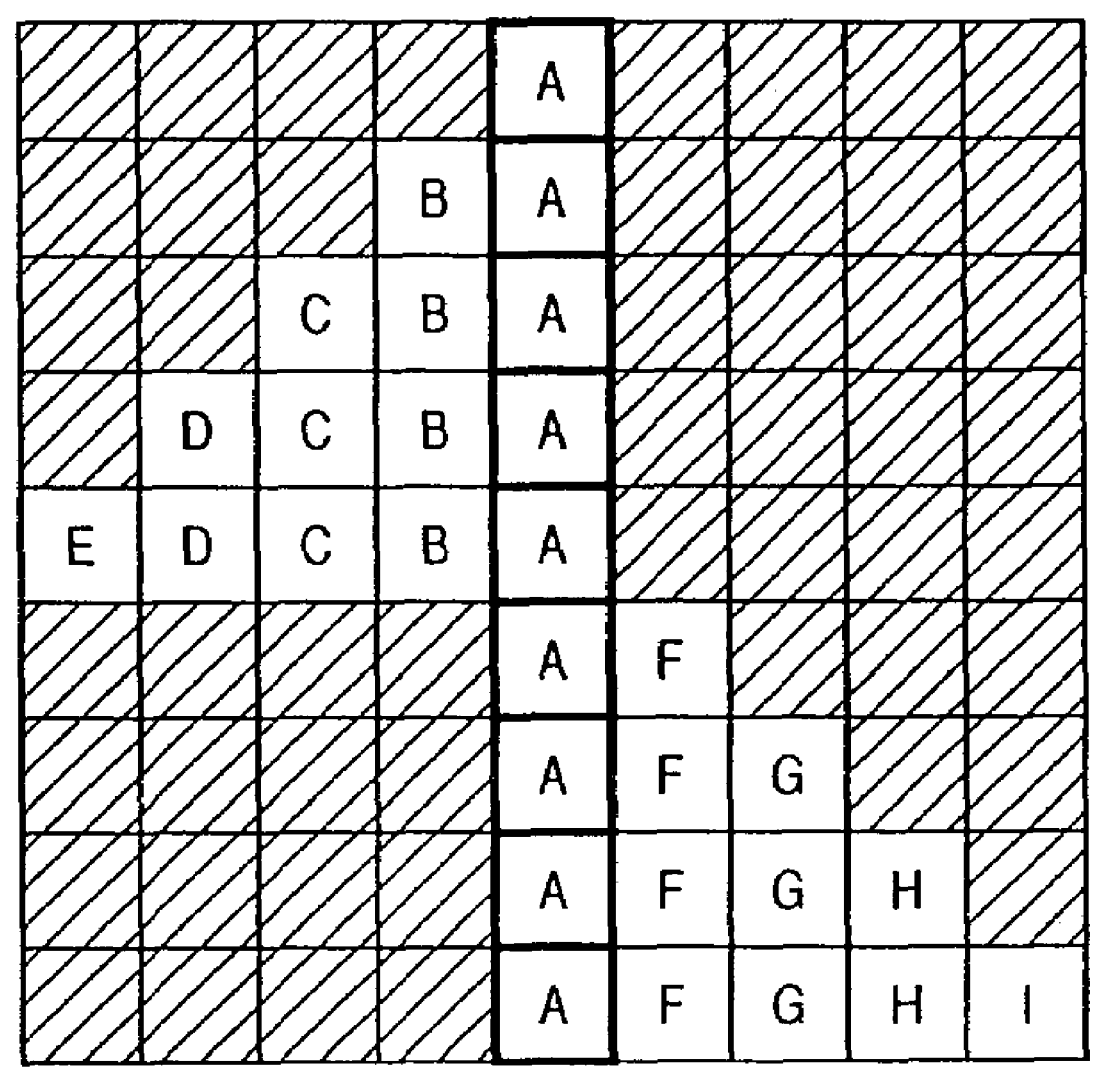

Determination of the inside/outside of the region based on shape information and pixel value interpolation will be described with reference to FIGS. 5 to 8. FIG. 5 shows an example of input image data. Nine pixels are arranged in the horizontal direction. Pixels surrounded by bold lines indicate the center and have a pixel value A. A gray portion indicates the outside of the region. The pixel values are defined as B, C, D, and E from the center to the left. The pixel values are defined as F, G, H, and I from the center to the right. In the first line, the outside of the region is present on both sides of the central pixel A. Hence, boundaries are supposed to be on both sides of the central pixel. In the second line, boundaries are supposed to be on the left side of the pixel B and on the right side of the pixel A. The boundaries can be detected in this way.

Expansion and interpolation are executed point-symmetrically with respect to the boundary. FIG. 6 shows this state. Referring to FIG. 6, a lower case represents a copy result. That is, a represents a value obtained by copying A. Similarly, b and B, c and C, d and D, e and E, f and F, g and G, h and H, and i and I represent copy values and original values. In the first line, the pixel value A is copied to both sides. In the second line, the value of the pixel B is copied to the right side of the pixel A. In addition, the value of the pixel A is copied to the left side of the pixel B. The pixel a obtained by copying the pixel A to the left side of the pixel B is copied to the second pixel on the right side of the pixel A. In this way, pixels are interpolated in all the nine taps. The same interpolation is done for the third and subsequent lines.

Figure 7:
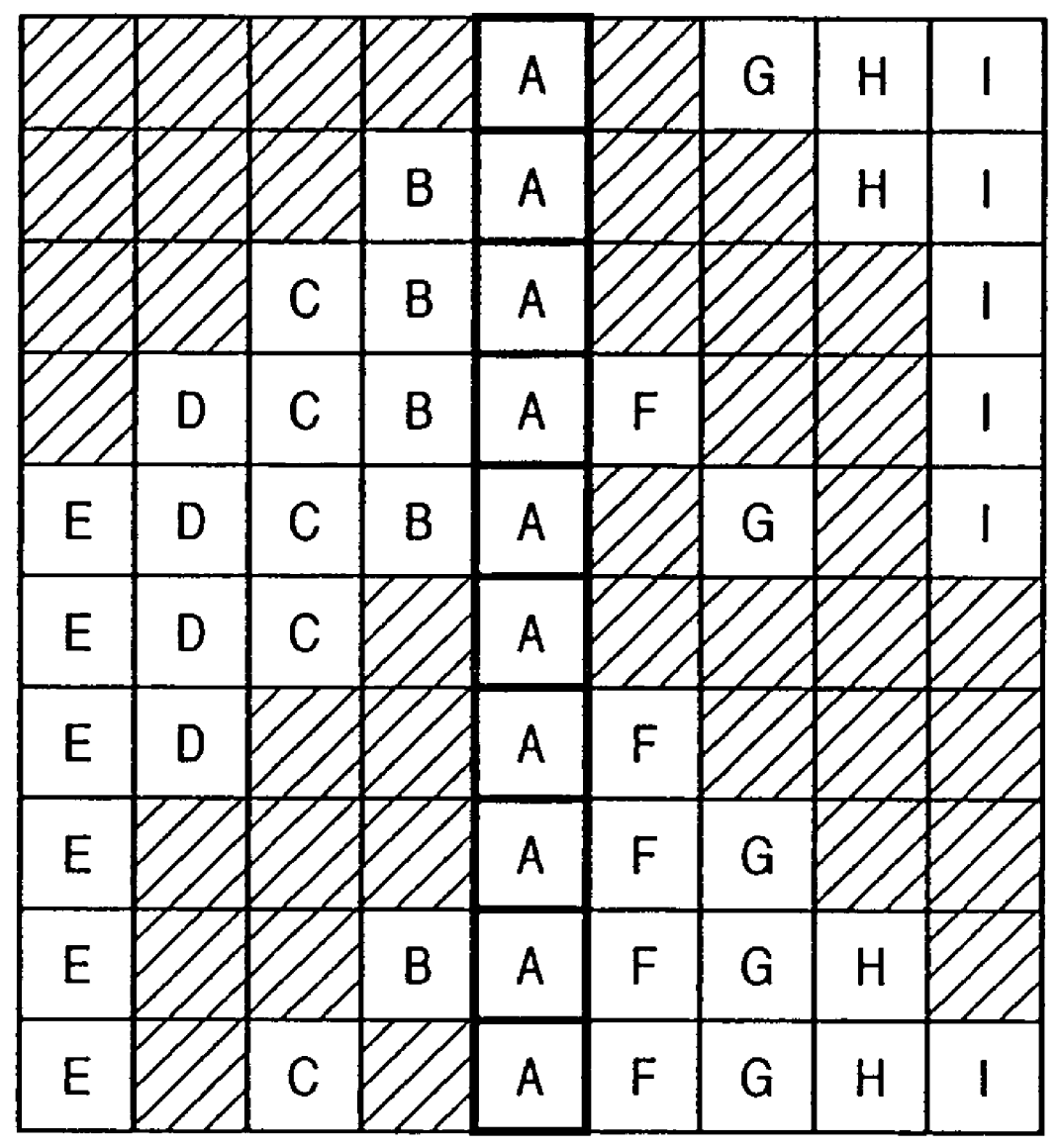

A plurality of regions may exist depending on the boundary shape. FIG. 7 shows an example. In the first line, a region containing the pixels G, H, and I is also present in addition to the region of the pixels A. Even for this region, boundaries on both sides of the central pixel are detected, and interpolation is executed. FIG. 8 shows the result. In the first line, the region containing the pixels A and the region containing the pixels G, H, and I are spaced apart from each other. Hence, interpolation is done for the outside of the region on the left and right sides of the central pixel A so that all pixels change to the pixels a as the copy of the pixel A. Even in the second and subsequent lines, interpolation is executed assuming that boundaries are present on both sides of the region containing the central pixel.

Referring back to FIG. 3, a result obtained by interpolation by the interpolation unit 103 is stored in the latch group 104. The filter calculation unit 105 calculates weights and adds them. Hence, a transformed value corresponding to the pixel A in FIG. 6 or 8 is output.

Referring back to FIG. 2, the conversion result is sub-sampled by the sub-sampling units 51 and 54 to ½ in the horizontal direction and stored in the memories 52 and 55.

The input shape information is sub-sampled by the sub-sampling unit 56 to ½ in the horizontal direction and inputs to the VLPF units 57 and 63 and the VHPF units 60 and 66. The filter units execute filter processing while interpolating values outside the region, like the HLPF unit 50 and the HHPF unit 53. The results are input to the sub-sampling units 58, 61, 64, and 67, sub-sampled to ½ in the vertical direction, and stored in the memories 59, 62, 65, and 68. The memories 59, 62, 65, and 68 store the contents of frequency bands 1LL, 1LH, 1HL, and 1HH.

Figure 23:
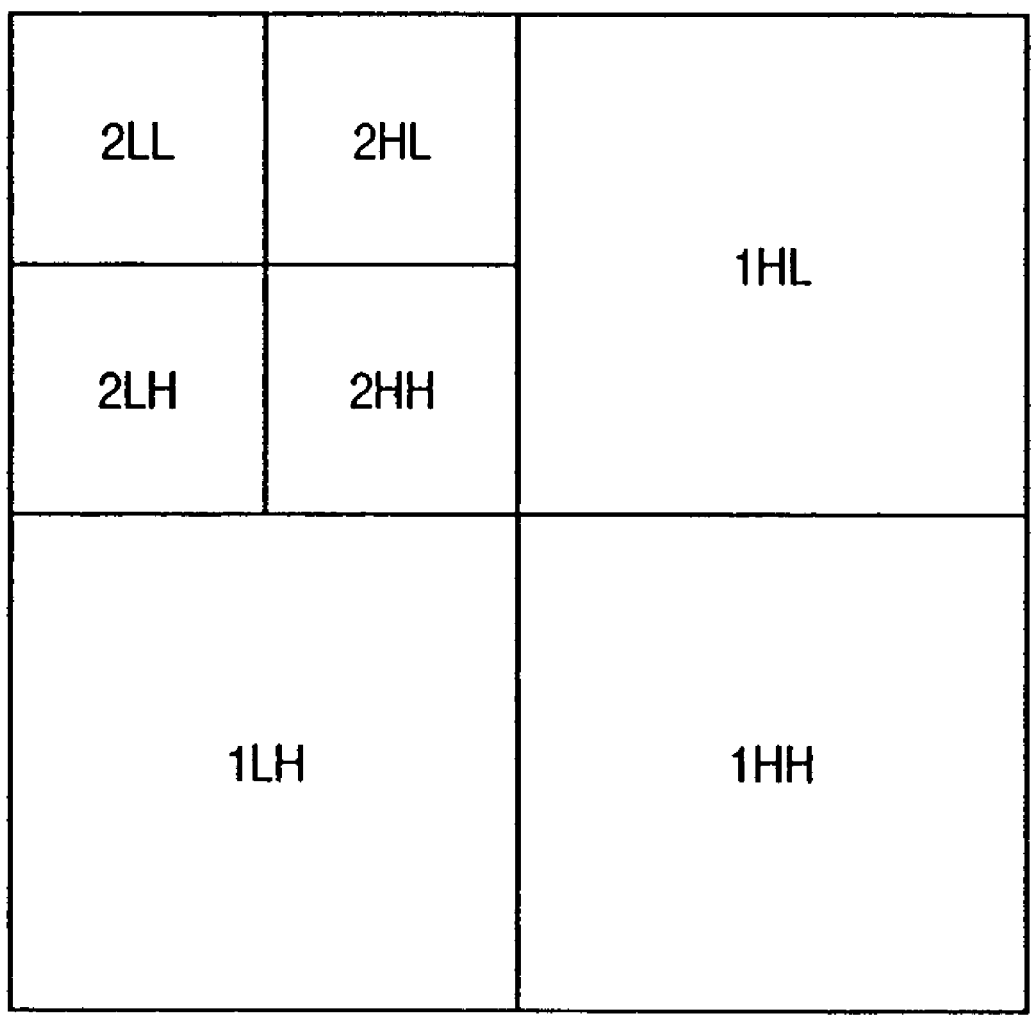
FIG. 23 is a view showing DWT according to the present invention.
Figure 24:
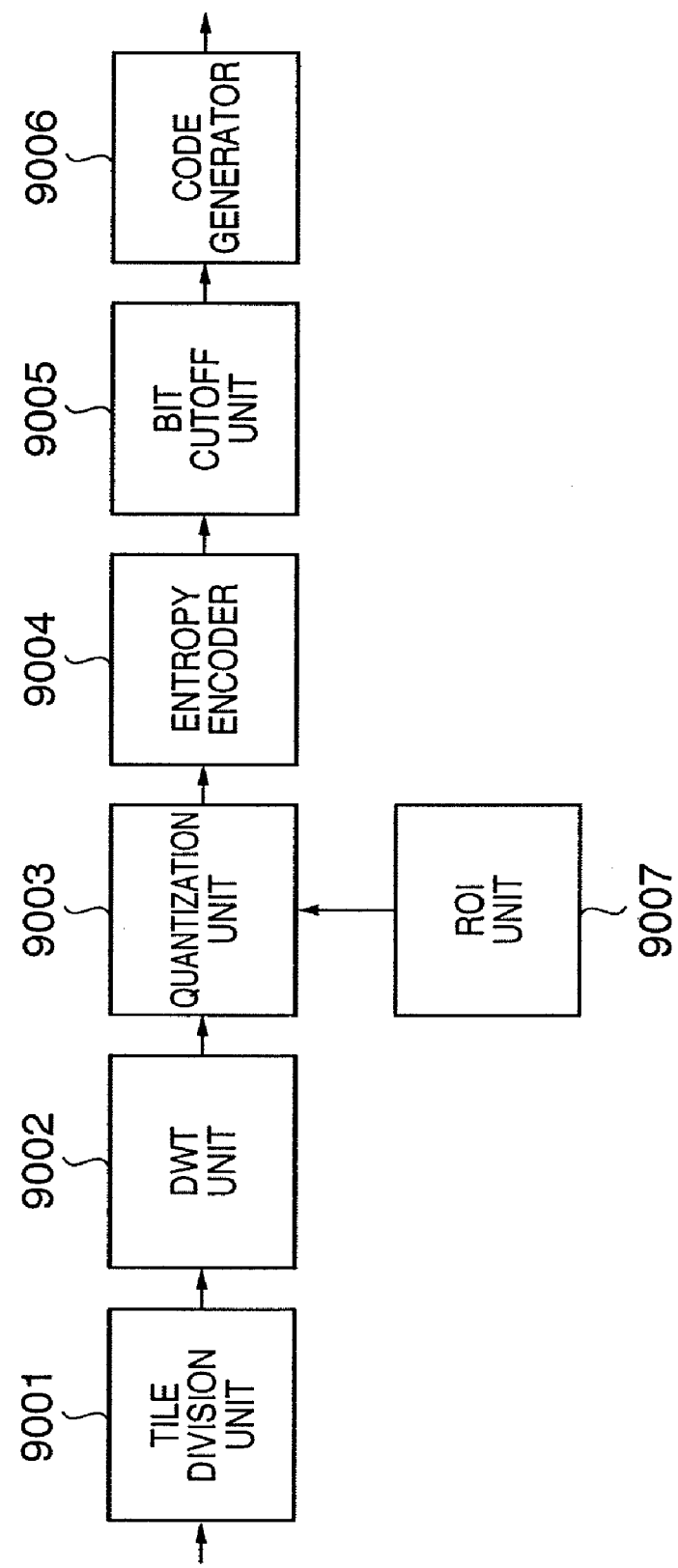
FIG. 24 is a block diagram showing an arrangement example of a conventional moving image encoding apparatus.
Figure 25:
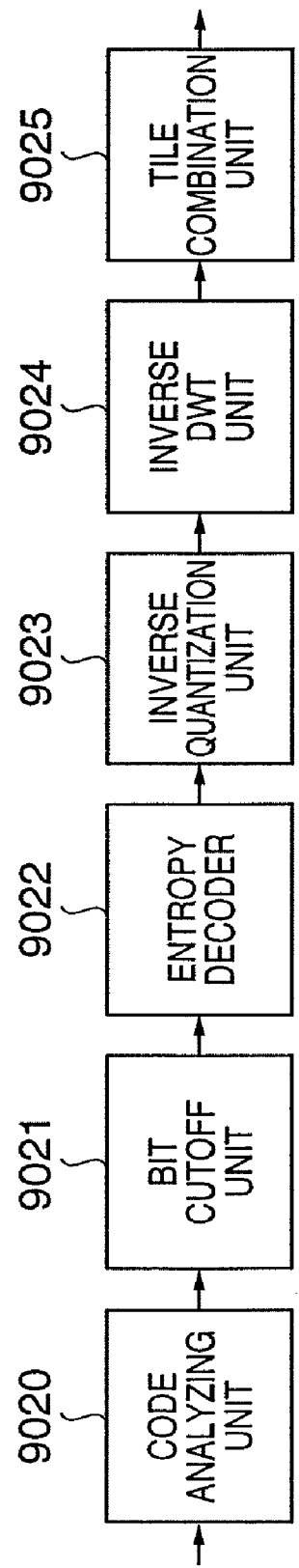
FIG. 25 is a block diagram showing an arrangement example of a conventional moving image decoding apparatus.
Figure 26:
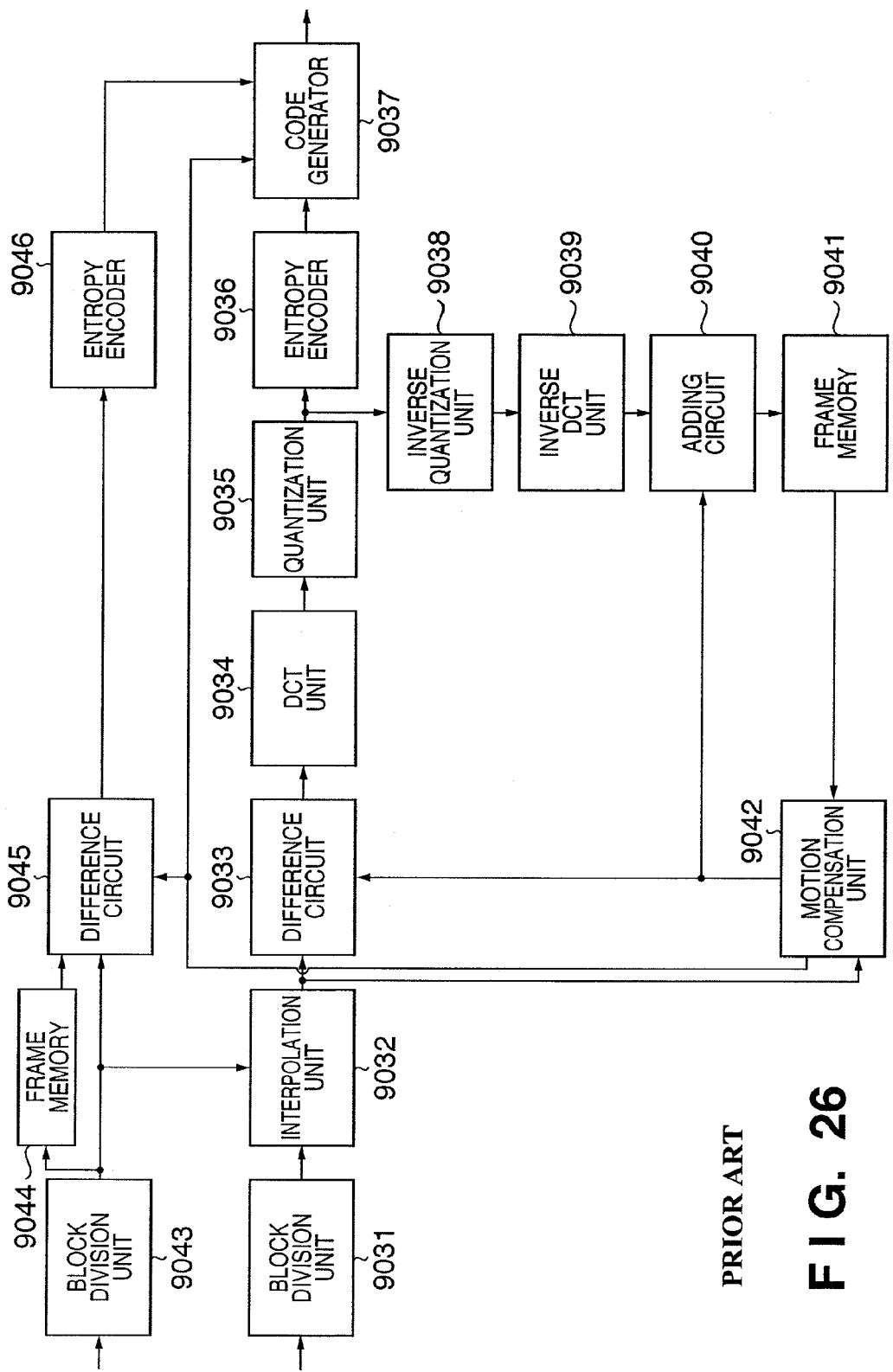
FIG. 26 is a block diagram showing another arrangement example of the conventional moving image encoding apparatus.

Since the application count is 2, the same transform is executed for 1LL. The size of the data input to the HLPF unit 69 and HHPF unit 72 is ½ the input image data in the vertical and horizontal directions. Although shape information reduced to ½ is accordingly input from the reduction unit 8, the processing is the same as described above. As a result, the memories 78, 81, 84, and 87 store the contents of frequency bands 2LL, 2HL, 2LH, and 2HH. FIG. 23 shows the relationship between the frequency bands.

Referring back to FIG. 1, the sub-band coefficient of each frequency band generated by the DWT unit 2 is quantized by the quantization unit 3 and input to the coefficient interpolation unit 4. The coefficient interpolation unit 4 receives the reduced shape information from the reduction unit 8 and interpolates the sub-band coefficients outside the region with the sub-band coefficients in the region.

Figure 4:
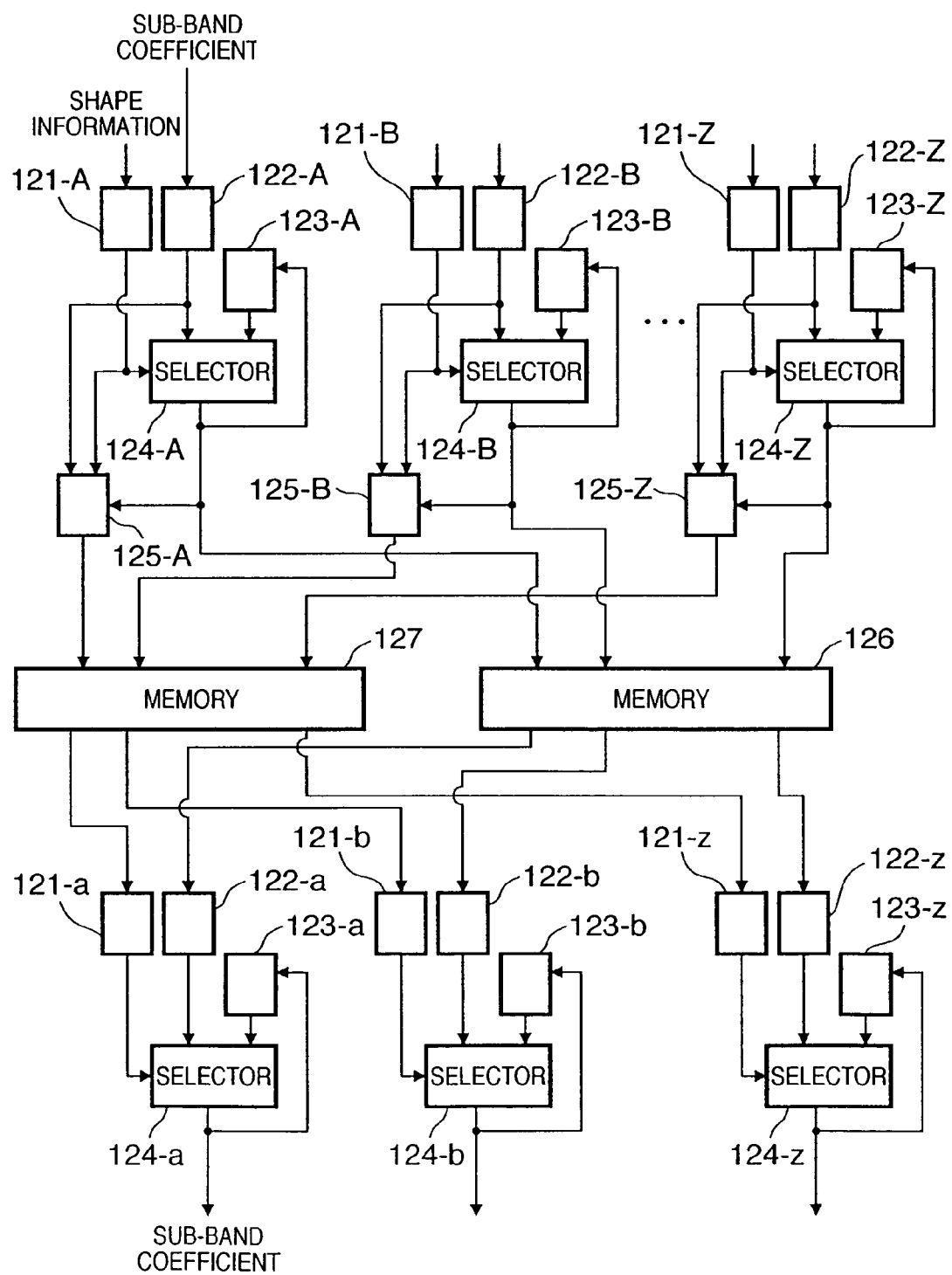
FIG. 4 is a block diagram showing the arrangement of a coefficient interpolation unit according to the first embodiment of the present invention.

FIG. 4 is a block diagram showing the detailed arrangement of the coefficient interpolation unit 4. Referring to FIG. 4, a latch 121 stores shape information. A latch 122 stores a sub-band coefficient. A selector 124 switches the input in accordance with the contents of the latch 121. A latch 123 stores the output from the selector 124. A shape information updating unit 125 detects substitution of coefficients. The blocks 121 to 125 are prepared equal in number (A to Z) to the vertical size of the frequency band. A memory 126 stores interpolation results in the horizontal direction. A memory 127 stores one block output from the shape information updating unit 125.

The latches 121-a to 121-z, latches 122-a to 122-z, latches 123-a to 123-z, and selectors 124-a to 124-z correspond to the horizontal size. The latches 123-A to 123-Z and latches 123-a to 123-z are reset to 0 before processing.

Figure 30:
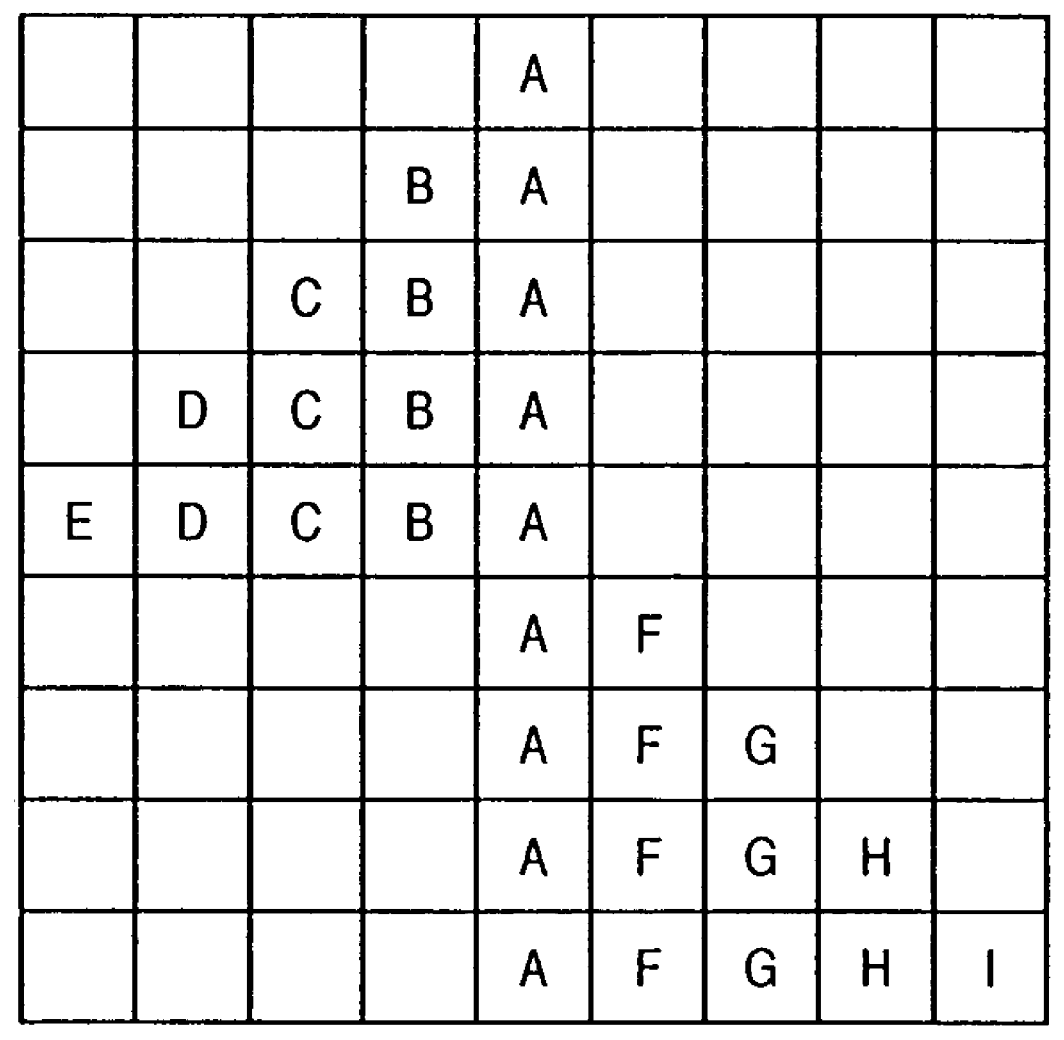

In the above arrangement, a description will be done by exemplifying the frequency band 1LL. The processing is the same even for the remaining frequency bands. The quantization results of the sub-band coefficients of the frequency bands are input from the quantization unit 3 for each line and each pixel in a raster order. FIG. 30 shows input quantization results. Portions with letters A to I indicate quantization results in the region. Blank portions indicate quantization results outside the region. The input quantization results are stored in the latches 122-A to 122-Z. Pieces of reduced shape information corresponding to the quantization results are stored in the latches 121-A to 121-Z for each line and each pixel in a raster order. When the values of the latches 121-A to 121-Z indicate the inside of the region, the selectors 124-A to 124-Z output the values of the latches 122-A to 122-Z. When the values indicate the outside of the region, the selectors 124-A to 124-Z output the values of the latches 123-A to 123-Z. The results are stored in the memory 126.

More specifically, when a sub-band coefficient in the region is present on the left side in the horizontal direction, the value is repeated up to the next sub-band coefficient in the region or the right end of the block. When no sub-band coefficient in the region is present on the left side, 0 is repeated up to the next sub-band coefficient in the region or the right end of the block. A result obtained by executing interpolation in the horizontal direction is stored in the memory 126. FIG. 31 shows a result stored in the memory 126 in correspondence with the quantization result shown in FIG. 30.

The outputs from the latches 121 and 122 and the selector 124 are input to the shape information updating unit 125 (125-A to 125-Z). When the input from the latch 121 indicates the inside of the region, the shape information updating unit 125 outputs the value indicating the inside of the region. When the input indicates the outside of the region, the shape information updating unit 125 compares the contents of the latch 122 with the output from the selector 124. If the values equal and not zero, a value representing the outside of the region is output. If the values are different, a value representing the inside of the region is output. Shape information which is corrected by interpolation in the horizontal direction is stored in the memory 127.

In the blocks following the memory 126, interpolation is executed in the vertical direction. The sub-band coefficients are input from the memory 126 for each pixel of lines from the upper side to the lower side. The latches 121-a to 121-z receive and store shape information reduced to ½ from the reduction unit 8 for each pixel of lines from the upper side to the lower side. When the values of the latches 121-a to 121-z indicate the inside of the region, the selectors 124-a to 124-z output the values of the latches 122-a to 122-z in accordance with the shape information read out from the memory 127. When the values indicate the outside of the region, the selectors 124-a to 124-z output the values of the latches 123-a to 123-z.

More specifically, when a sub-band coefficient in the region is present on the upper side in the vertical direction, the value is repeated up to the next sub-band coefficient in the region or the lower end of the block. When no sub-band coefficient in the region is present on the upper side, 0 is repeated up to the next sub-band coefficient in the region or the lower end of the block. The result is input to the entropy encoder 5. FIG. 32 is a view showing a result output to the entropy encoder 5 in correspondence with the quantization result shown in FIG. 30.

Referring back to FIG. 1, the entropy encoder 5 encodes the received quantization result by EBCOT and inputs the data to the bit cutoff unit 6. To execute rate control in accordance with the capacity of a buffer (not shown), the bit cutoff unit 6 determines the number of bit planes to be output and outputs the encoded data of the bit planes to the code generator 10. The code generator 10 multiplexes a necessary header, the encoded data of the shape information output from the entropy encoder 9, and the encoded data output from the bit cutoff unit 6 and outputs the multiplexed data.

With the series of selection operations, image data corresponding to a shape can be encoded. When expansion is executed by the DWT unit in consideration of the shape, and the sub-band coefficients outside the region are repeatedly interpolated by the coefficient interpolation unit, the influence of interpolation can be suppressed, and high-speed processing can be implemented.

In this embodiment, the JPEG 2000 encoding method is employed as the image encoding method. However, any other encoding method, and for example, a still image encoding method such as Still Texture Object encoding of MPEG-4 may be used. The MPEG-4 encoding method is used to encode shape information. However, any other encoding method such as JBIG or MMR may be used.

Each unit or all units of this embodiment may be described by software and executed by an arithmetic device such as a CPU.

Second Embodiment

Figure 9:
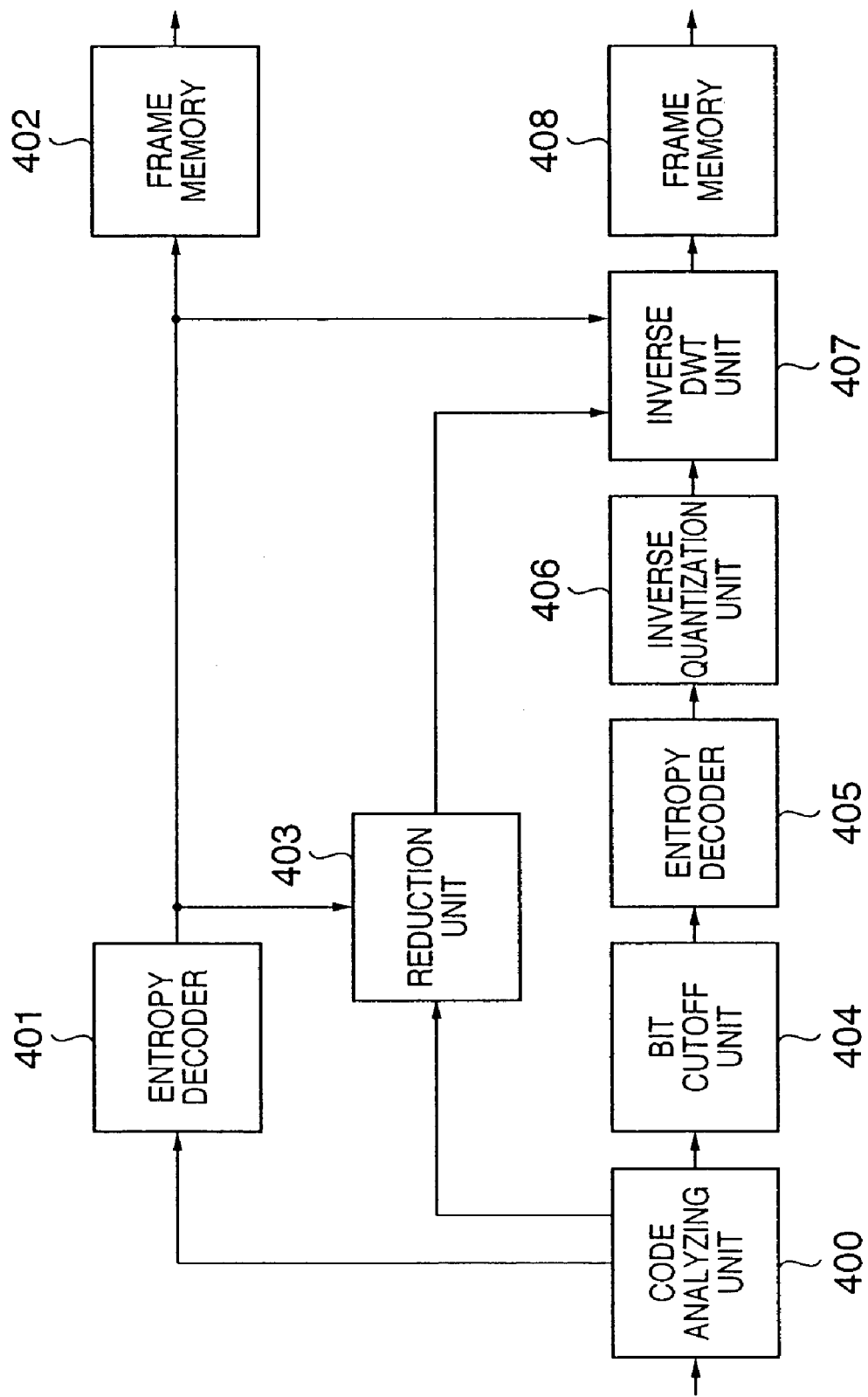
FIG. 9 is a block diagram showing the arrangement of a moving image decoding apparatus according to the second embodiment of the present invention.

FIG. 9 is a block diagram showing the arrangement of a moving image decoding apparatus according to the second embodiment of the present invention. In the second embodiment, an example will be described, in which encoded data generated in the first embodiment is decoded. However, the present invention is not limited to this.

A code analyzing unit 400 analyzes a header, controls the subsequent stage on the basis of the analysis result, and inputs received encoded data to a bit cutoff unit 404 and entropy decoder 401. The entropy decoder 401 decodes data in accordance with shape encoding of the MPEG-4 encoding method. A frame memory 402 stores shape information obtained by decoding. A reduction unit 403 reduces the decoded shape information in accordance with the frequency band of an inverse DWT unit 407. The bit cutoff unit 404 adjusts the number of bits to be decoded. An entropy decoder 405 decodes each bit plane in accordance with EBCOT encoding of the JPEG 2000 encoding method. An inverse quantization unit 406 inverse quantizes quantized sub-band coefficients. The inverse DWT unit 407 executes inverse DWT for each inverse quantized block on the basis of the shape information. A frame memory 408 stores image data obtained by decoding.

The moving image decoding operation of the moving image decoding apparatus with the above arrangement will be described below.

In this embodiment, encoded data of moving image data is input for each frame. The input encoded data is input to the code analyzing unit 400. The code analyzing unit 400 analyzes the added header to grasp the encoding characteristic and initializes subsequent units. The code analyzing unit 400 also separates, from the received encoded data, encoded data related to shape information and encoded data related to image data and outputs the former to the entropy decoder 401 and the latter to the bit cutoff unit 404.

The entropy decoder 401 executes decoding in accordance with shape encoding of the MPEG-4 encoding method to generate shape information and stores it in the frame memory 402. Simultaneously, the shape information is input to the reduction unit 403. The reduction unit 403 generates and holds a reduced image of the shape information in accordance with the DWT application count obtained by analysis by the code analyzing unit 400. In this embodiment, since the encoded data generated in the first embodiment is decoded, the application count is 2. The reduced shape information is input to the inverse DWT unit 407.

The encoded data related to image data is input to the bit cutoff unit 404. The bit cutoff unit 404 adjusts the number of bits to be decoded in accordance with the situation of the entropy decoder 405 and the like. The entropy decoder 405 decodes each bit plane in accordance with EBCOT encoding and inputs the decoded data to the inverse quantization unit 406. The inverse quantization unit 406 executes predetermined inverse quantization for the received value to reproduce sub-band coefficients and inputs them to the inverse DWT unit 407.

Figure 10:
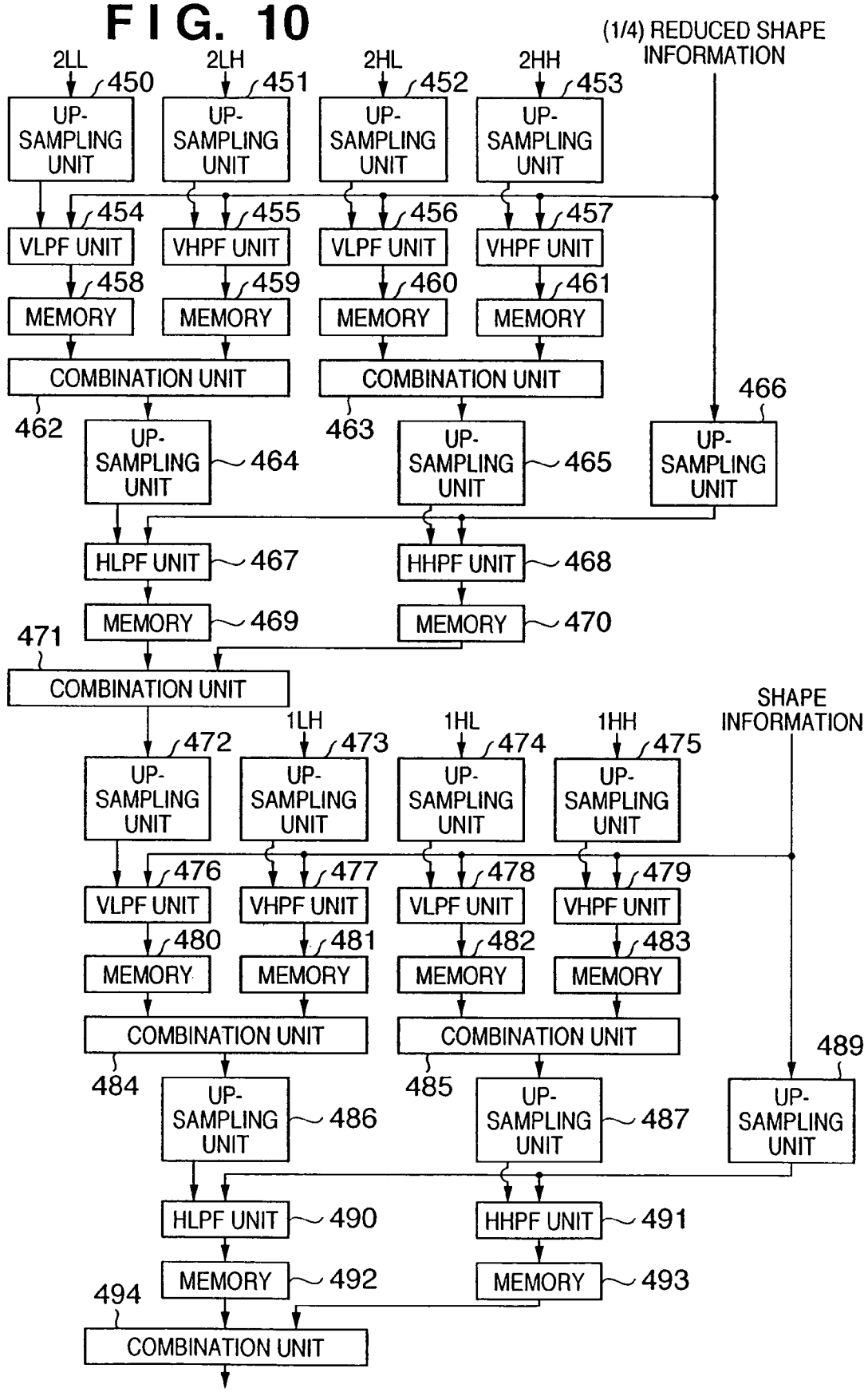
FIG. 10 is a block diagram showing the arrangement of an inverse DWT unit according to the second embodiment of the present invention.

FIG. 10 is a block diagram showing the detailed arrangement of the inverse DWT unit 407. Referring to FIG. 10, up-sampling units 450, 451, 452, 453, 472, 473, 474, and 475 execute double up-sampling in the vertical direction. VLPF units 454, 456, 476, and 478 execute low-pass filter processing in the vertical direction. VHPF units 455, 457, 477, and 479 execute high-pass filter processing in the vertical direction. Memories 458, 459, 460, 461, 469, 470, 480, 481, 482, 483, 492, and 493 store filter processing results. Combination units 462, 463, 471, 484, 485, and 494 combine frequencies. Up-sampling units 464, 465, 486, and 487 double-up-sample the outputs from the filters in the horizontal direction. HLPF units 467 and 490 execute low-pass filter processing in the horizontal direction. HHPF units 468 and 491 execute high-pass filter processing in the horizontal direction. Up-sampling units 466 and 489 double-up-sample shape information in the vertical direction.

The inverse DWT unit 407 receive the sub-band coefficients from the inverse quantization unit 406 in FIG. 9 and shape information reduced to ¼ and shape information reduced to ½ from the reduction unit 403. The sub-band coefficients of frequency bands 2LL, 2LH, 2HL, and 2HH of blocks are input to the up-sampling units 450, 451, 452, and 453, respectively. The up-sampling units 450, 451, 452, and 453 insert 0 values between the coefficients to execute double up-sampling in the vertical direction. The up-sampled sub-band coefficients are input to the VLPF unit 454, VHPF unit 455, VLPF unit 456, and VHPF unit 457, respectively, together with the shape information reduced to ¼.

Each filter has the arrangement shown in FIG. 3 of the first embodiment and execute filter processing while executing interpolation in accordance with inverse DWT coefficients. The obtained results are stored in the memories 458, 459, 460, and 461, respectively. The combination unit 462 reads out the coefficient values from the memories 458 and 459 and combines them at the frequency defined in inverse DWT. The combination unit 463 reads out the coefficient values from the memories 460 and 461 and combines them at the frequency defined in inverse DWT.

The up-sampling units 464 and 465 insert 0values between the coefficients to execute double up-sampling in the horizontal direction. The received shape information reduced to ¼ is input to the up-sampling unit 466 and double-up-sampled in the vertical direction by repeating the shape information for each coefficient. The sub-band coefficients up-sampled by the up-sampling units 464 and 465 are input to the HLPF unit 467 and HHPF unit 468 together with the shape information enlarged by the up-sampling unit 466. The HLPF unit 467 and HHPF unit 468 also have the filter structure shown in FIG. 3. The obtained results are stored in the memories 469 and 470, respectively. The combination unit 471 reads out the coefficient values from the memories 469 and 470 and combines them at the frequency defined in inverse DWT. With this processing, a frequency band 1LL is calculated.

In a similar manner, frequency bands 1LH, 1HL, and 1HH are received from the inverse quantization unit 406 in FIG. 9, filter processing is executed, and finally, pixel values are obtained by the combination unit 494. Referring back to FIG. 9, the obtained pixel values are stored in the frame memory 408 and externally output together with the shape information stored in the frame memory 402.

With the series of selection operations, encoded data which is encoded by causing the DWT unit to execute expansion in consideration of the shape can be decoded. Hence, the encoded data can be decoded without any degradation. In addition, when the information amount is appropriately reduced by bit cutoff, high-speed processing can be implemented.

Third Embodiment

Figure 11:
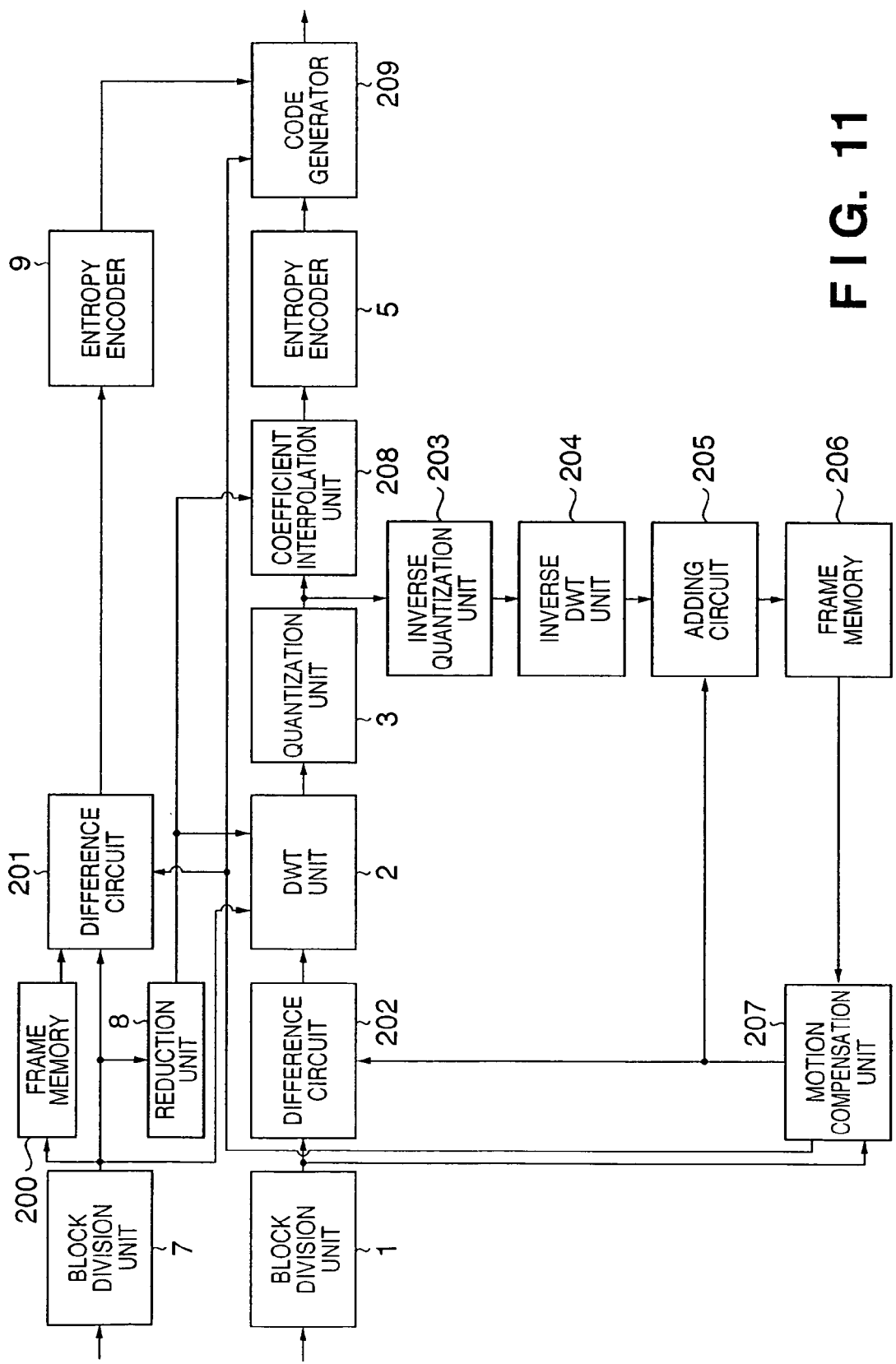
FIG. 11 is a block diagram showing the arrangement of a moving image encoding apparatus according to the third embodiment of the present invention.

FIG. 11 is a block diagram showing the arrangement of a moving image encoding apparatus according to the third embodiment of the present invention. The same reference numerals as in FIG. 1 of the first embodiment denote parts having the same functions in FIG. 11, and a description thereof will be omitted.

A frame memory 200 stores shape information. A difference circuit 201 obtains the difference between the shape information and its predictive data obtained by a motion vector obtained by a motion compensation unit 207. A difference circuit 202 obtains the difference between image data and its predictive data obtained by the motion vector obtained by the motion compensation unit 207. An inverse quantization unit 203 executes inverse quantization of a quantization unit 3. An inverse DWT unit 204 executes inverse transform of a DWT unit 2. An adding circuit 205 adds the result to the predictive data.

A frame memory 206 stores a decoded image for reference for motion compensation. The motion compensation unit 207 executes motion compensation on the basis of the input image and the decoded image stored in the frame memory 206 and calculates the motion vector and predictive data. A coefficient interpolation unit 208 interpolates sub-band coefficients outside the region on the basis of the quantization result. A code generator 209 generates a necessary header, encodes the motion vector, and forms encoded data on the basis of the outputs from entropy encoders 5 and 9.

The moving image encoding operation of the moving image encoding apparatus with the above-described arrangement will be described below.

In this embodiment, moving image data is input for each frame. Simultaneously, separately extracted shape information is input. Shape information may be extracted from the moving image data in the apparatus, as a matter of course.

As in the first embodiment, moving image data is input to a block division unit 1, and shape information is input to a block division unit 7. Each block division unit holds data of one frame, divides it into blocks, and outputs each block to the subsequent stage. The moving image data divided into blocks by the block division unit 1 is input to the motion compensation unit 207 and difference circuit 202.

The motion compensation unit 207 compares the received image data with the data of at least one decoded image stored in the frame memory 206 and generates a motion vector to minimize the predictive error and its predictive data. The generated motion vector is input to the code generator 209.

The shape information divided into blocks by the block division unit 7 is input to the DWT unit 2, the difference circuit 201, reduction unit 8, and frame memory 200. The shape information stored in the frame memory 200 is used for motion compensation of the shape information of other frames. On the basis of the motion vector calculated by the motion compensation unit 207, the difference circuit 201 obtains the predictive data of shape information from the encoded shape information stored in the frame memory 200 and obtains the difference.

The entropy encoder 9 encodes the difference output from the difference circuit 201 in accordance with shape encoding of the MPEG-4 encoding method and outputs the encoded data to the code generator 209.

The reduction unit 8 reduces the received shape information in accordance with the application count in the DWT unit 2.

The difference circuit 202 subtracts the predictive data calculated by the motion compensation unit 207. As in the first embodiment, the DWT unit 2 receives the shape information from the block division unit 7 and the reduced shape information from the reduction unit 8. The DWT unit 2 receives, from the difference circuit 202, pixel values in intra-encoding or a predictive error in motion compensation. The DWT unit 2 executes DWT while executing interpolation and expansion with reference to the shape information. The quantization unit 3 executes quantization. The data is input to the coefficient interpolation unit 208 and inverse quantization unit 203.

Figure 12:
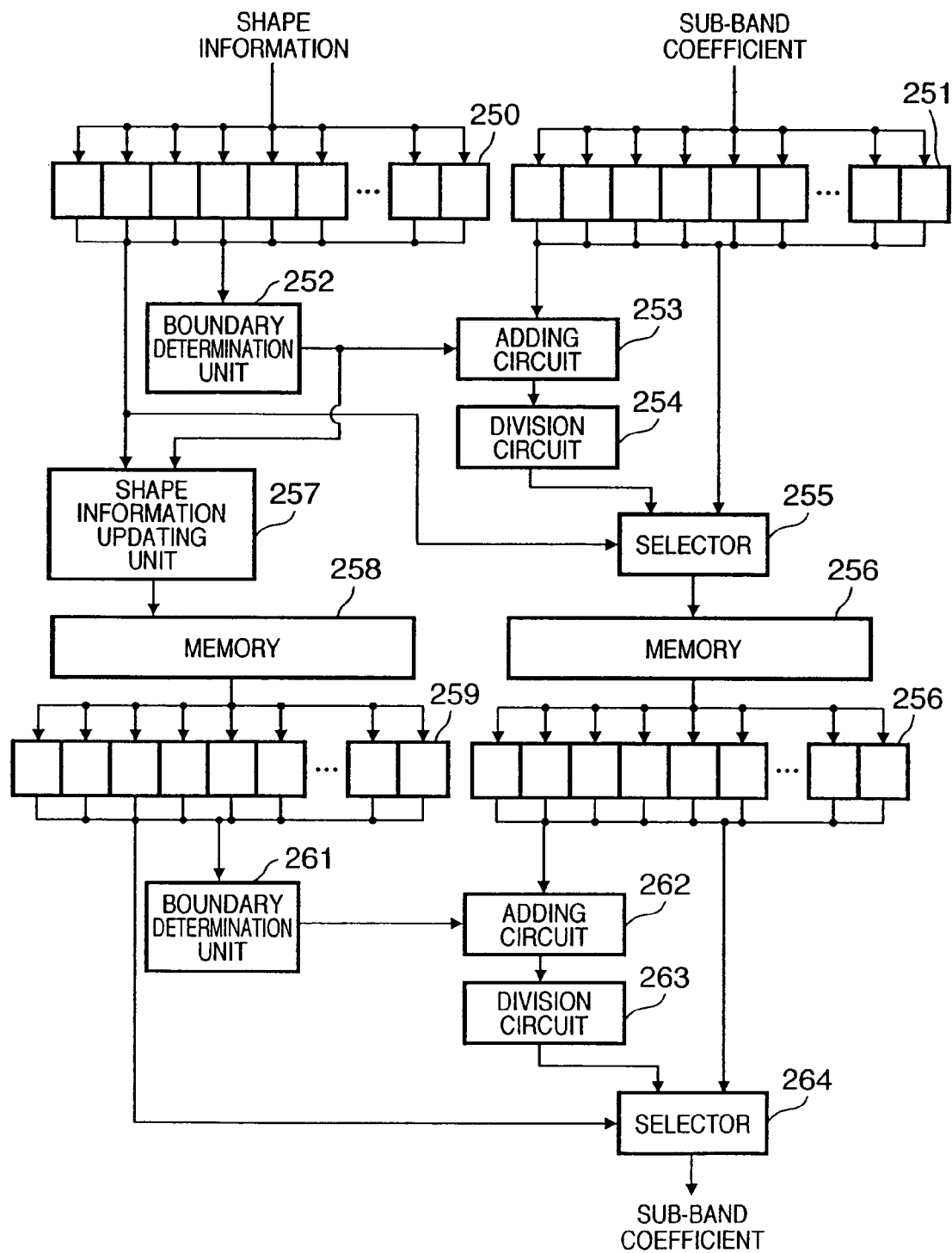
FIG. 12 is a block diagram showing the arrangement of a coefficient interpolation unit according to the third embodiment of the present invention.

FIG. 12 is a block diagram showing the detailed arrangement of the coefficient interpolation unit 208. Referring to FIG. 12, a latch group 250 stores shape information. A latch group 251 stores sub-band coefficients. In each latch group, latches are prepared equal in number to the horizontal size of the frequency band of each block. A boundary determination unit 252 determines boundaries in the horizontal direction. An adding circuit 253 adds the inputs in accordance with an instruction from the boundary determination unit 252. A division circuit 254 divides the output from the adding circuit 253 by 2. A selector 255 selects the output from the latch group 251 or division circuit 254 on the basis of according shape information from the latch group 259. A memory 256 stores a result of interpolation processing in the horizontal direction. A shape information updating unit 257 detects substitution of coefficients.

A memory 258 stores one block output from the shape information updating unit 257. A latch group 259 stores shape information. A latch group 260 stores sub-band coefficients. In each latch group, latches are prepared equal in number to the vertical size of the frequency band of each block. A boundary determination unit 261 determines boundaries in the vertical direction. An adding circuit 262 adds the inputs in accordance with an instruction from the boundary determination unit 261. A division circuit 263 divides the output from the adding circuit 262 by 2. A selector 264 selects the output from the latch group 260 or division circuit 263 on the basis of according shape information from the latch group 259.

Figure 33:
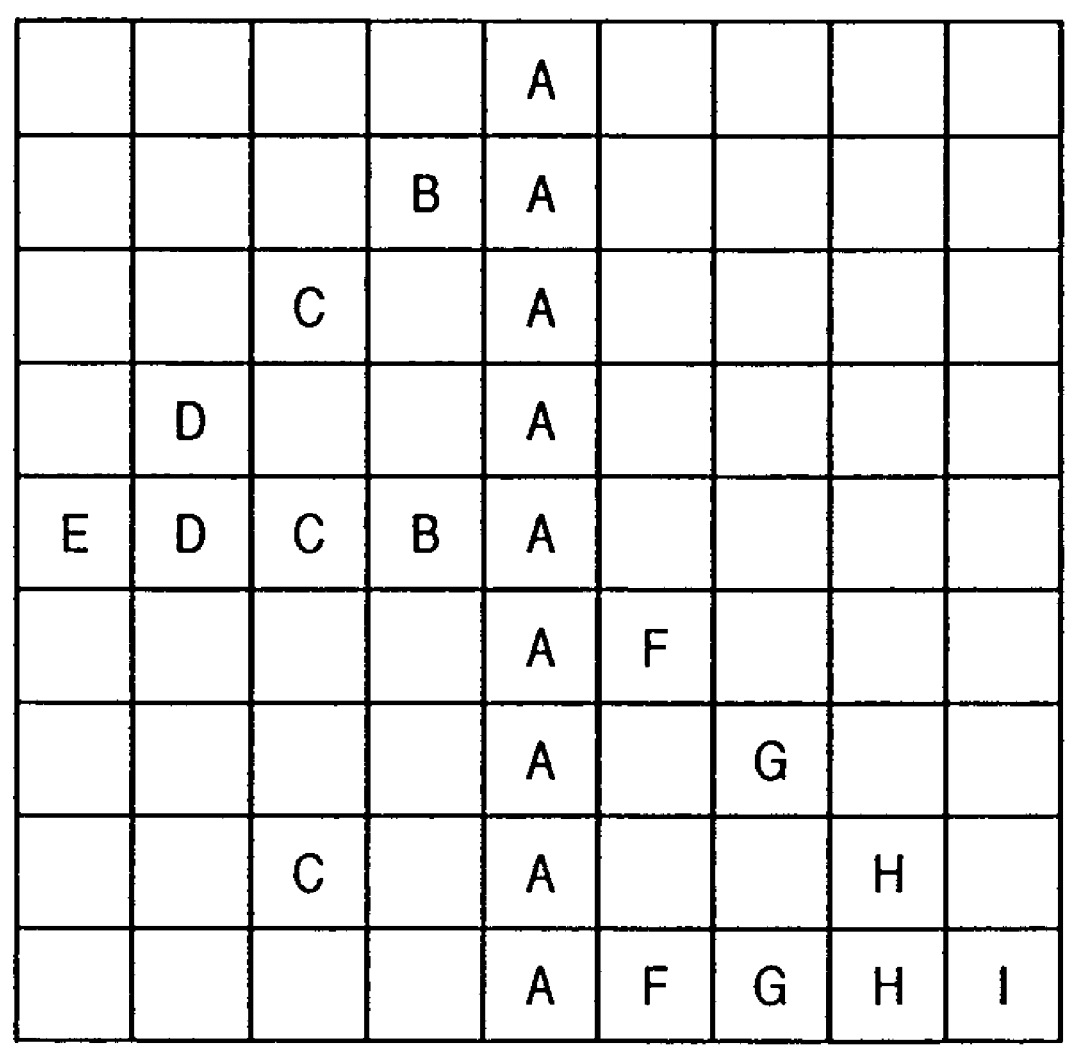

In the above arrangement, a description will be done by exemplifying the frequency band 1LL. The processing is the same even for the remaining frequency bands. The quantization results of the sub-band coefficients of the frequency bands are input from the quantization unit 3 for each line and each pixel in a raster order. The input quantization results are stored in the latch group 251. Pieces of reduced shape information corresponding to the quantization results are stored in the latch group 250 for each line and each pixel in a raster order. The boundary determination unit 252 determines boundaries between the inside and the outside of the region by referring to the latch group 250. FIG. 33 shows input quantization results. Portions with letters A to I indicate quantization results in the region. Blank portions indicate quantization results outside the region.

Figure 34:
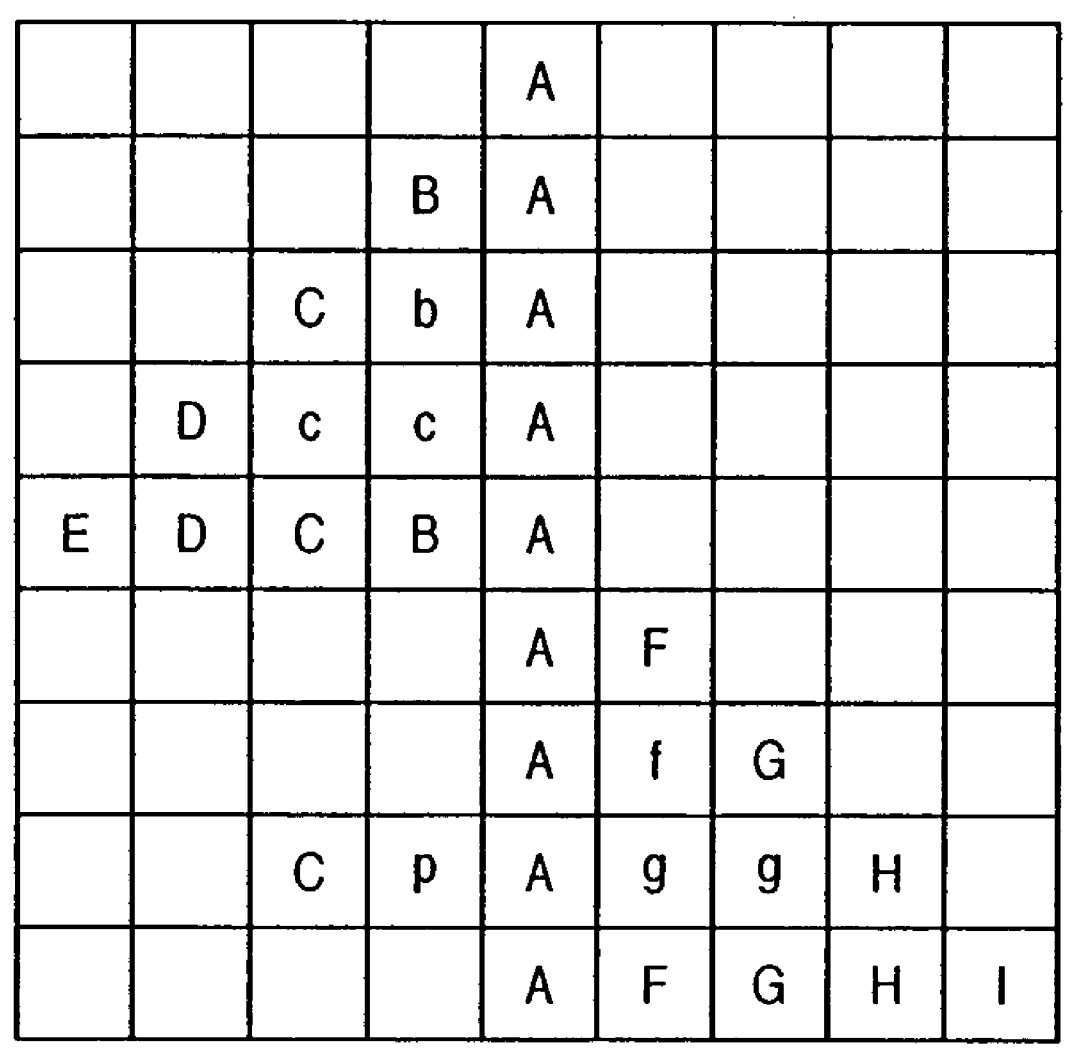

The values are input from both of the latch groups 250 and 251 to the adding circuit 253 and selector 255 for each pixel from the left to the right. When the input from the boundary determination unit 252 indicates a boundary at the left end of the image or on the right side of the region, the adding circuit 253 operates to add the value of the boundary at the left end of the image or on the right side of the region from the latch group 251 to the value of the next region or at the right end of the image. The division circuit 254 divides the output from the adding circuit 253 by 2 and inputs the result to the selector 255. On the basis of the output from the latch group 250, the selector 255 selects and outputs the output from the latch group 251 if it is the inside of the region. Otherwise, the selector 255 selects and outputs the output from the division circuit 254. The result is stored in the memory 256. The memory 256 stores interpolation results in the horizontal direction. FIG. 34 shows a result stored in the memory 256 in correspondence with the quantization results shown in FIG. 33 example of interpolation of quantization results according to the second embodiment of the present invention. In this example, b is the average of A and C, and c is the average of D and A. In addition, f is the average of A and G, g is the average of A and H, and p is the average of C and A. Blank portions are undefined.

The readout shape information is input to the shape information updating unit 257 simultaneously. If the readout shape information indicates the inside of the region, a value representing the inside of the region is output. If the shape information indicates the outside of the region, and region boundaries are present at two ends for a sub-band coefficient input from the boundary determination unit 252, a value representing the inside of the region is output. If no boundary region is present at one end or in both directions, a value representing the outside of the region is output. The output from the shape information updating unit 257 is stored in the memory 258.

When data of one block is stored in the memories 256 and 258, interpolation in the vertical direction is executed at the subsequent stage. From the memory 256, the sub-band coefficients of one vertical line are stored in the latch group 260 for each pixel of the line from the upper side to the lower side. Similarly, from the memory 258, the pieces of shape information are input to and stored in the latch group 259 for each pixel of the line from the upper side to the lower side. The boundary determination unit 261 determines boundaries between the inside and the outside of the region by referring to the latch group 259.

The values are input from the latch group 260 to the adding circuit 262 and selector 264 for each pixel from the top to the bottom. When the value indicates a boundary at the upper end of the image or on the lower side of the region, the adding circuit 262 operates to add the value of the boundary at the upper end of the image or on the lower side of the region from the latch group 260 to the value of the next region or at the lower end of the image. The division circuit 263 divides the output from the adding circuit 262 by 2 and inputs the result to the selector 264. On the basis of the output from the latch group 259, the selector 264 selects and outputs the output from the latch group 260 if it is the inside of the region. Otherwise, the selector 264 selects and outputs the output from the division circuit 263. The result is input to the entropy encoder 5. FIG. 35 shows a result output to the entropy encoder 5 in correspondence with the quantization results shown in FIG. 33. Referring to FIG. 35, n is the average of C and C, and m is the average of B and p.

Referring back to FIG. 11, the encoded data obtained by encoding by the entropy encoder 5 is input to the code generator 209.

The code generator 209 adds header information to encode the motion vector and outputs it together with the encoded data of the shape information and the encoded data of the quantized coefficients.

Simultaneously, the output from the quantization unit 3 is inverse quantized by the inverse quantization unit 203, subjected to inverse transform of DWT by the inverse DWT unit 204 and predictive data addition by the adding circuit 205, and stored in the frame memory 206.

With the series of selection operations, image data corresponding to a shape can be encoded. When expansion is executed by the DWT unit in consideration of the shape, and the sub-band coefficients outside the region are repeatedly interpolated by an average value by the coefficient interpolation unit, the influence of interpolation can be suppressed, and high-speed processing can be implemented. In addition, when motion compensation encoding is executed, the encoding efficiency can be increased.

In this embodiment, the JPEG 2000 encoding method is employed as the image encoding method. However, any other encoding method, and for example, a still image encoding method such as Still Texture Object encoding of MPEG-4 may be used. The MPEG-4 encoding method is used to encode shape information. However, any other encoding method such as JBIG or MMR may be used.

Each unit or all units of this embodiment may be described by software and executed by an arithmetic device such as a CPU.

Fourth Embodiment

Figure 13:
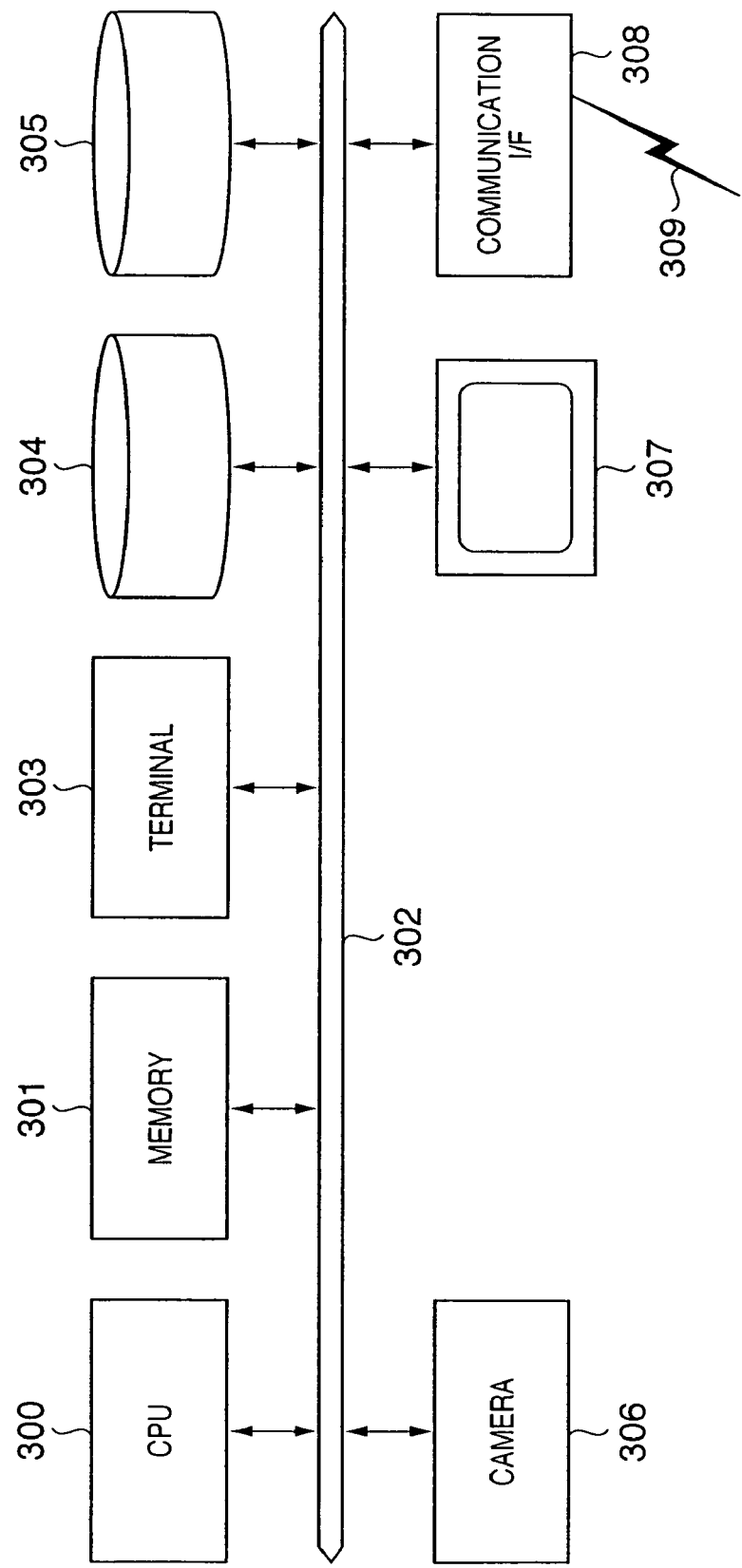
FIG. 13 is a block diagram showing the arrangement of a moving image encoding apparatus according to the fourth, fifth, 12th and 13th embodiment of the present invention.

FIG. 13 is a block diagram showing the arrangement of a moving image encoding apparatus according to the fourth embodiment of the present invention. Referring to FIG. 13, a central processing unit (CPU) 300 controls the entire apparatus and executes various processing operations. An memory 301 provides a storage area necessary for an operation system (OS), software necessary for controlling the apparatus, and calculations. A bus 302 connects various devices to exchange data and control signals. A terminal 303 activates devices, sets various kinds of conditions, and instructs playback. A storage device 304 accumulates software.

A storage device 305 accumulates a stream. The storage devices 304 and 305 can also be formed from movable media separated from the system. A camera 306 senses a moving image. A monitor 307 displays an image. A communication line 309 is formed from a LAN, public line, radio channel, or broadcast wave. A communication interface 308 transmits/receives a stream through the communication line 309.

The memory 301 stores an OS 501 to control the entire apparatus and run various kinds of software, and software (502 to 505) to be run. The memory 301 has an image area 506 to store image data, a code area 507 to store generated encoded data, and a working area 508 to store parameters in various kinds of calculations and encoding and data related to a watermark.

Moving image encoding processing in this arrangement will be described. An example will be described, in which image data input from the camera 306 is encoded and output to the communication line 309.

Figure 14:
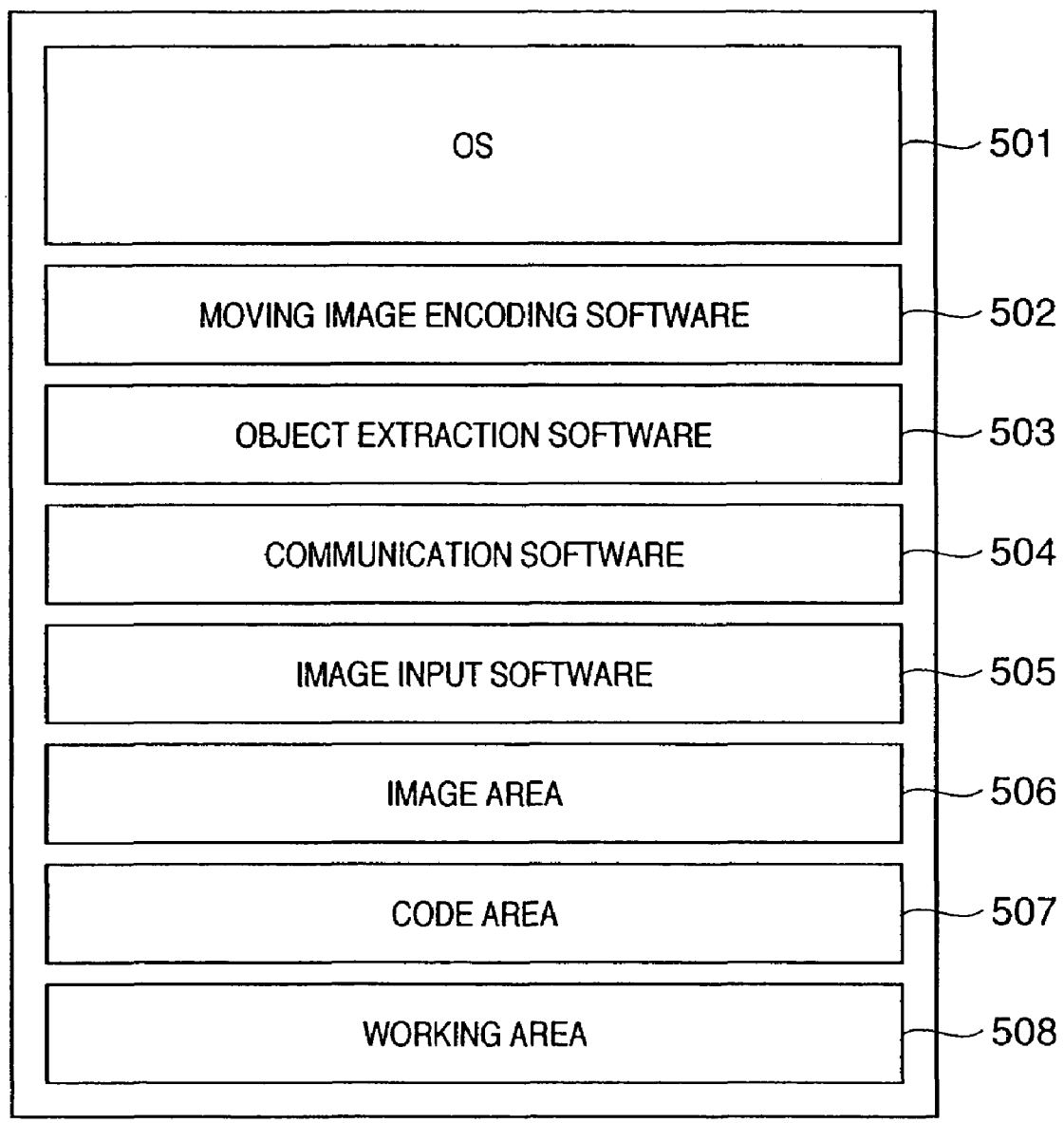
FIG. 14 is a view showing the use and storage states of a memory 301 according to the fourth embodiment of the present invention.

FIG. 14 shows the use and storage states of the memory 301. The memory 301 stores the OS 501 to control the entire apparatus and run various kinds of software, the moving image encoding software 502 to encode a moving image, the object extraction software 503 to extract an object from a moving image, the communication software 504 to communicate, and the image input software 505 to input a moving image from the camera 306 for each frame. The moving image encoding software uses the JPEG 2000 encoding method. However, the present invention is not limited to this.

Before processing, activation is instructed from the terminal 303 to the entire apparatus, and the units are initialized. The software stored in the storage device 304 is expanded on the memory 301 through the bus 302 and activated. In this arrangement, before processing, the code area 507 and working area 508 on the memory 301 are cleared by 0.

The image input software 505 stores image data of each frame sensed by the camera 306 in the image area 506 on the memory 301. Then, the object extraction software 503 extracts an object from the image in the image area 506 and stores its shape information in the image area 506. The storage of image data and shape information in the image area 506 will not particularly be mentioned below.

Figure 15:
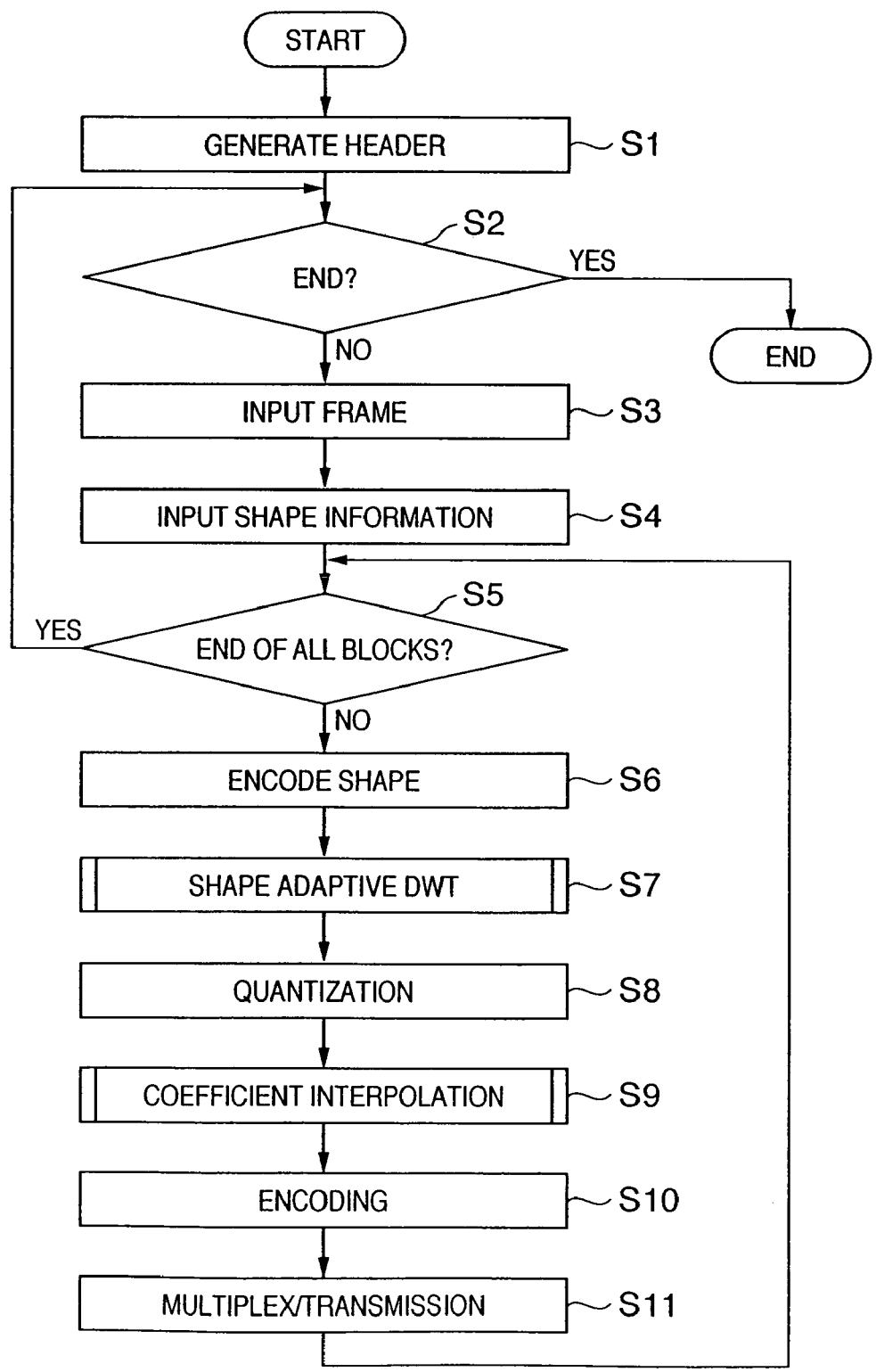
FIG. 15 is a flowchart showing a moving image encoding operation according to the fourth embodiment of the present invention.

A processing operation of the CPU 300 to cause the moving image encoding software 502 to encode image data will be described next with reference to the flowchart shown in FIG. 15.

In step S1, a header necessary for the Motion JPEG 2000 encoding method is generated and stored in the code area 507 on the memory 301. When the encoded data is stored in the code area 507, the communication software 504 sends the encoded data to the communication line 309 through the communication interface 308. After the data is sent, the region of the code area 507 is cleared. The transmission of encoded data in the code area 507 will not particularly be mentioned below.

In step S2, the end of encoding processing is determined. If the end of encoding processing is input from the terminal 303, all processes are ended. Otherwise, the flow advances to step S3. In step S3, image data is read from the image area 506 on the memory 301 in synchronism with the image input software 505. In step S4, shape information is read from the image area 506 on the memory 301 in synchronism with the object extraction software 503.

In step S5, it is determined whether processing is ended for all blocks contained in one frame. If YES in step S5, the flow returns to step S2 to process the next frame. Otherwise, the flow advances to step S6. In step S6, one block is selected from the input shape information and encoded in accordance with shape encoding of the MPEG-4 encoding method. The encoded data is stored in the code area 507 on the memory 301. In step S7, one block is selected from the input image data and subjected to shape adaptive DWT. The transform coefficient is stored in the working area 508 on the memory 301.

Figure 16:
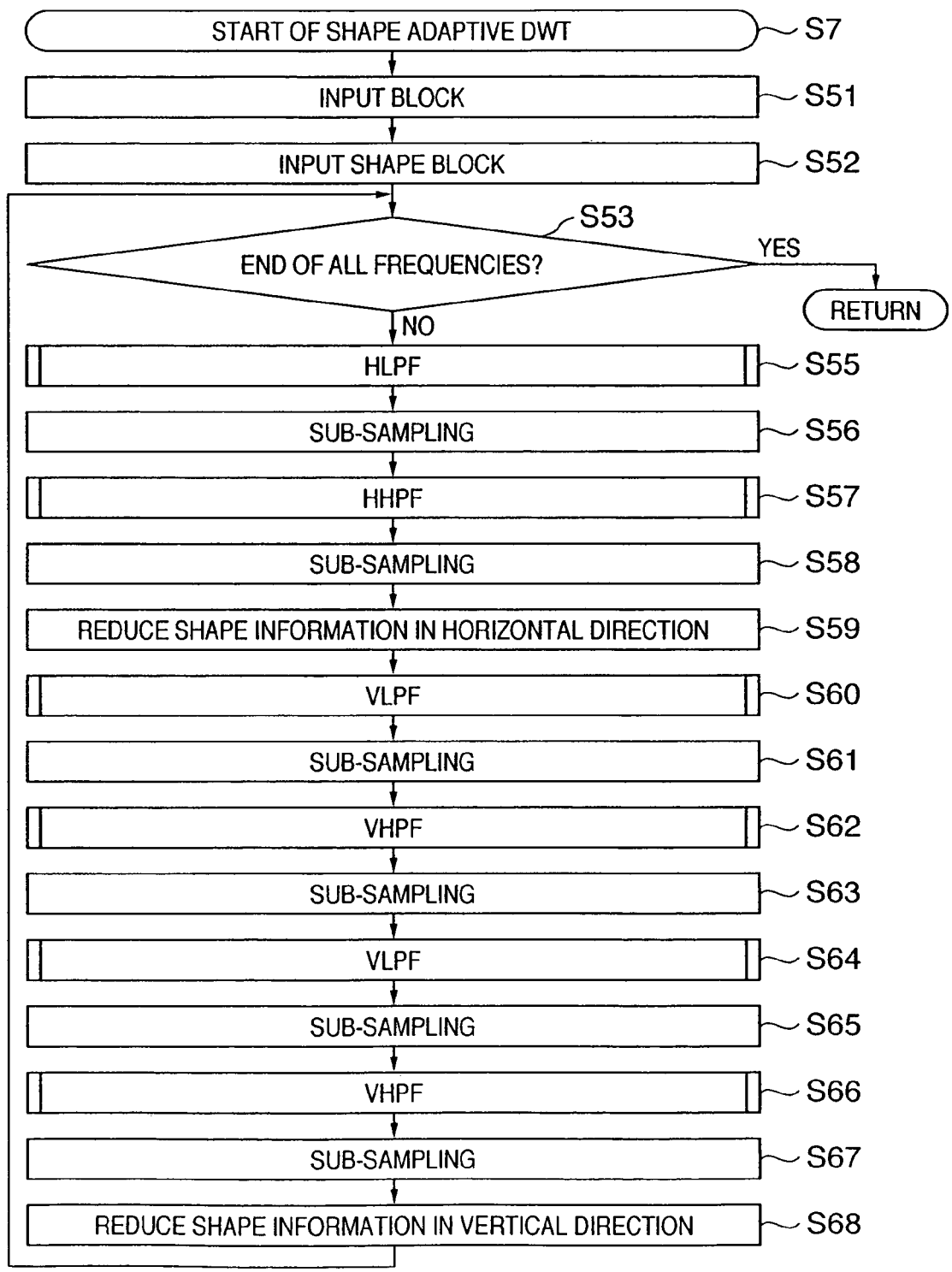
FIG. 16 is a flowchart showing a processing operation of shape adaptive DWT according to the fourth embodiment of the present invention.

The shape adaptive DWT processing in step S7 will be described with reference to the flowchart shown in FIG. 16.

In step S51, a block to be encoded is extracted from the image data in the image area 506. In step S52, a shape information block to be encoded is input from the shape information in the image area 506. In step S53, the end of shape adaptive DWT processing is determined. It is determined whether the processing is executed a predetermined application count. If YES in step S53, the processing is ended, and the flow advances to step S8 in FIG. 15. If NO in step S53, the flow advances to step S55.

In step S55, horizontal low-pass filter processing is executed for the data of the block extracted in step S51 or the frequency band stored in the image area 506 by referring to the shape information stored in the image area 506 in step S52 or shape information reduced and stored in the image area 506 in step S68.

Figure 17:
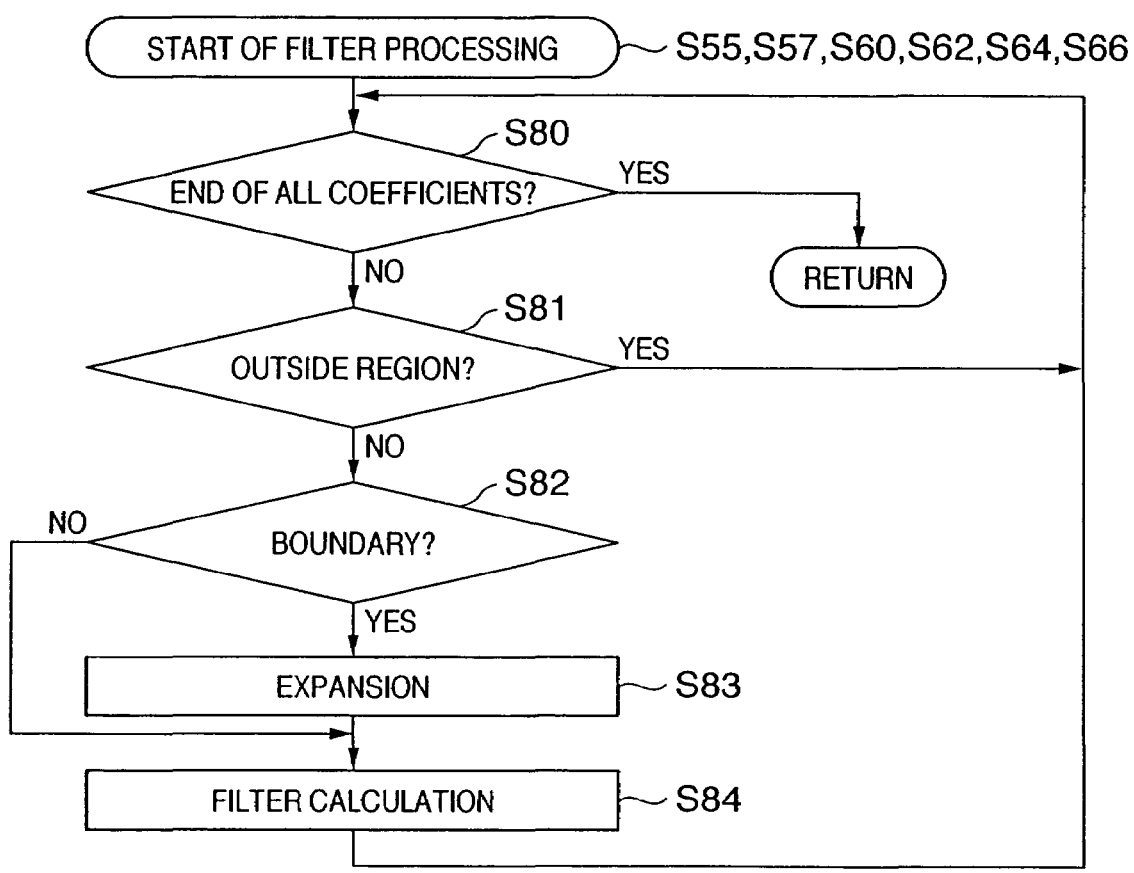
FIG. 17 is a flowchart showing a filter processing operation of shape adaptive DWT according to the fourth and fifth embodiments of the present invention.

The filter processing of shape adaptive DWT in step S55 will be described with reference to the flowchart shown in FIG. 17. Referring to FIG. 17, the basic procedures are the same except that the coefficient and its direction change between various kinds of filters.

In step S80, it is determined whether the processing is ended for all coefficients. If NO in step S80, the flow advances to step S81. If YES in step S80, the flow advances to sub-sampling processing in FIG. 16. In step S81, it is determined whether the median value indicates the outside of the region. If YES in step S81, the flow returns to step S80 because no filter calculation is executed. Otherwise, the flow advances to step S82. In step S82, it is determined whether the central value contains a boundary. If NO in step S82, the flow advances to step S84 because no interpolation/expansion processing is executed.

In step S83, the values outside the region are interpolated point-symmetrically, as in the first embodiment. In step S84, the values are multiplied by a weight and added, and the sum is stored in the working area 508 on the memory 301. The flow returns to step S80 to process the next coefficient.

Referring back to FIG. 16, in step S56, horizontal sub-sampling is executed for the data stored in the working area 508 in step S55, and the value is stored in the working area 508 on the memory 301.

In step S57, horizontal high-pass filter processing is executed for the data of the block extracted in step S51 or the frequency band stored in the image area 506 by referring to the shape information stored in the image area 506 in step S52 or shape information reduced and stored in the image area 506 in step S68. The value is stored in the working area 508 on the memory 301.

In step S58, horizontal sub-sampling is executed for the data stored in the working area 508 in step S57, and the value is stored in the working area 508 on the memory 301. In step S59, the shape information extracted or reduced and stored in the image area 506 in step S52 is sub-sampled in the horizontal direction to create reduced shape information. The reduced shape information is stored in the working area 508 on the memory 301.

In step S60, vertical low-pass filter processing is executed for the data of the frequency band sub-sampled and stored in the working area 508 in step S56 by referring to the shape information reduced and stored in the working area 508 in step S59. The result is stored in the working area 508 on the memory 301. In step S61, vertical sub-sampling is executed for the data filtered and stored in the working area 508 in step S60, and the value is stored in the image area 506 on the memory 301. This corresponds to LL.

In step S62, vertical high-pass filter processing is executed for the data of the frequency band sub-sampled and stored in the working area 508 in step S56 by referring to the shape information reduced and stored in the working area 508 in step S59. The result is stored in the working area 508 on the memory 301. In step S63, vertical sub-sampling is executed for the data filtered and stored in the working area 508 in step S62, and the value is stored in the image area 506 on the memory 301. This corresponds to LH.

In step S64, vertical low-pass filter processing is executed for the data of the frequency band sub-sampled and stored in the working area 508 in step S58 by referring to the shape information reduced and stored in the working area 508 in step S59. The result is stored in the working area 508 on the memory 301. In step S65, vertical sub-sampling is executed for the data filtered and stored in the working area 508 in step S64, and the value is stored in the image area 506 on the memory 301. This corresponds to HL.

In step S66, vertical high-pass filter processing is executed for the data of the frequency band sub-sampled and stored in the working area 508 in step S58 by referring to the shape information reduced and stored in the working area 508 in step S59. The result is stored in the working area 508 on the memory 301. In step S67, vertical sub-sampling is executed for the data filtered and stored in the working area 508 in step S66, and the value is stored in the image area 506 on the memory 301. This corresponds to HH.

In step S68, the shape information extracted and stored in the working area 508 in step S59 is sub-sampled in the vertical direction to create reduced shape information. The reduced shape information is stored in the image area 506 on the memory 301. When steps S55 to S68 are executed, the frequency bands to which DWT is adapted once and adaptive shape information can be obtained in the image area 506 on the memory 301. If the number of times of processing does not reach the desired application count in step S53, the input image data and shape information are obtained immediately before, and processing is executed for LL stored in the image area 506. With this processing, all the desired frequency bands can be obtained. If the number of times of processing reaches the desired application count in step S53, the flow advances to step S8 in FIG. 15.

Referring back to FIG. 15, in step S8, quantization is executed for the sub-band coefficients of the frequencies stored in the image area on the memory 301. The result is stored in the working area 508.

Figure 18:
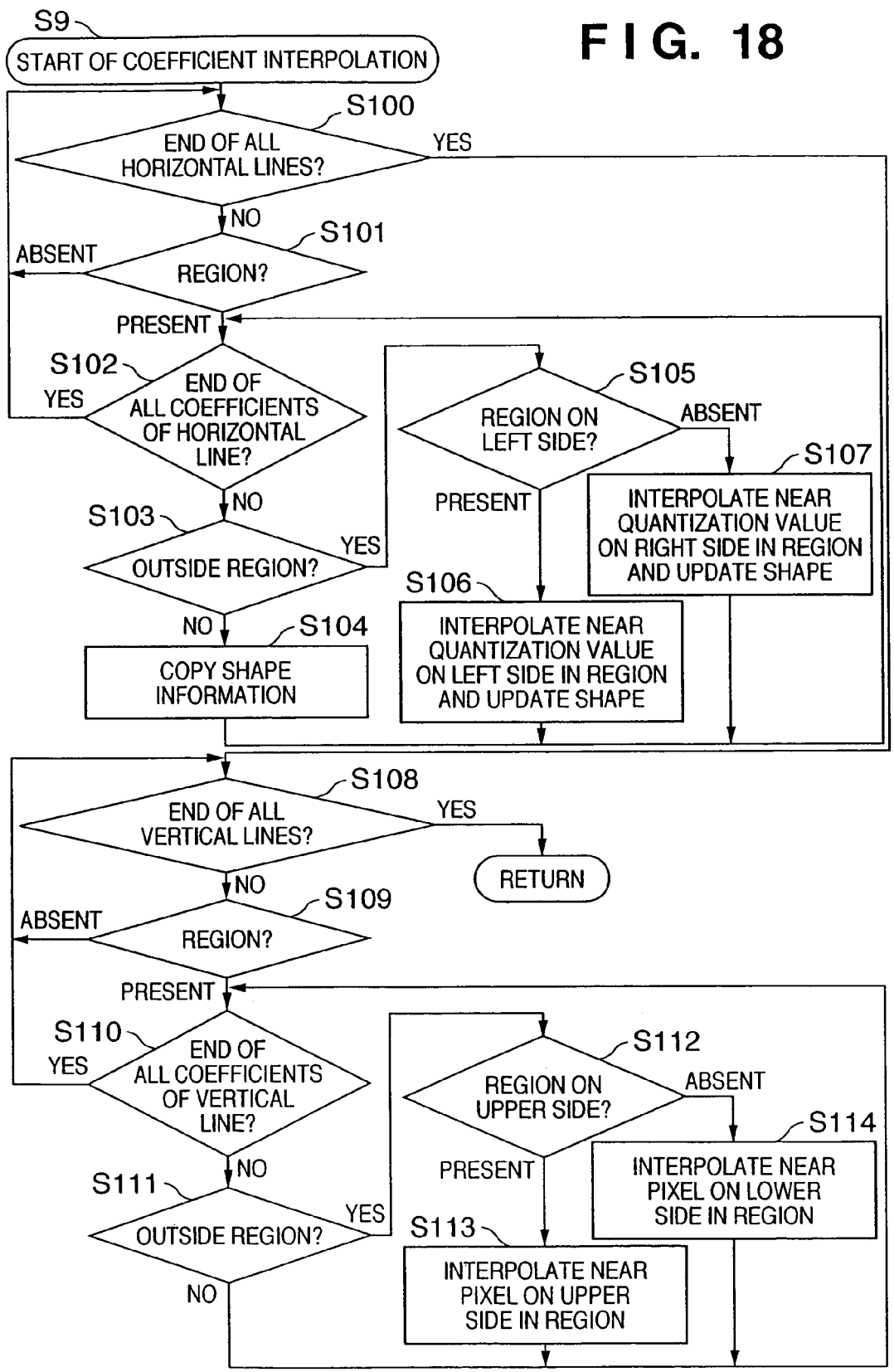
FIG. 18 is a flowchart showing a coefficient interpolation processing operation according to the fourth embodiment of the present invention.
Figure 36:
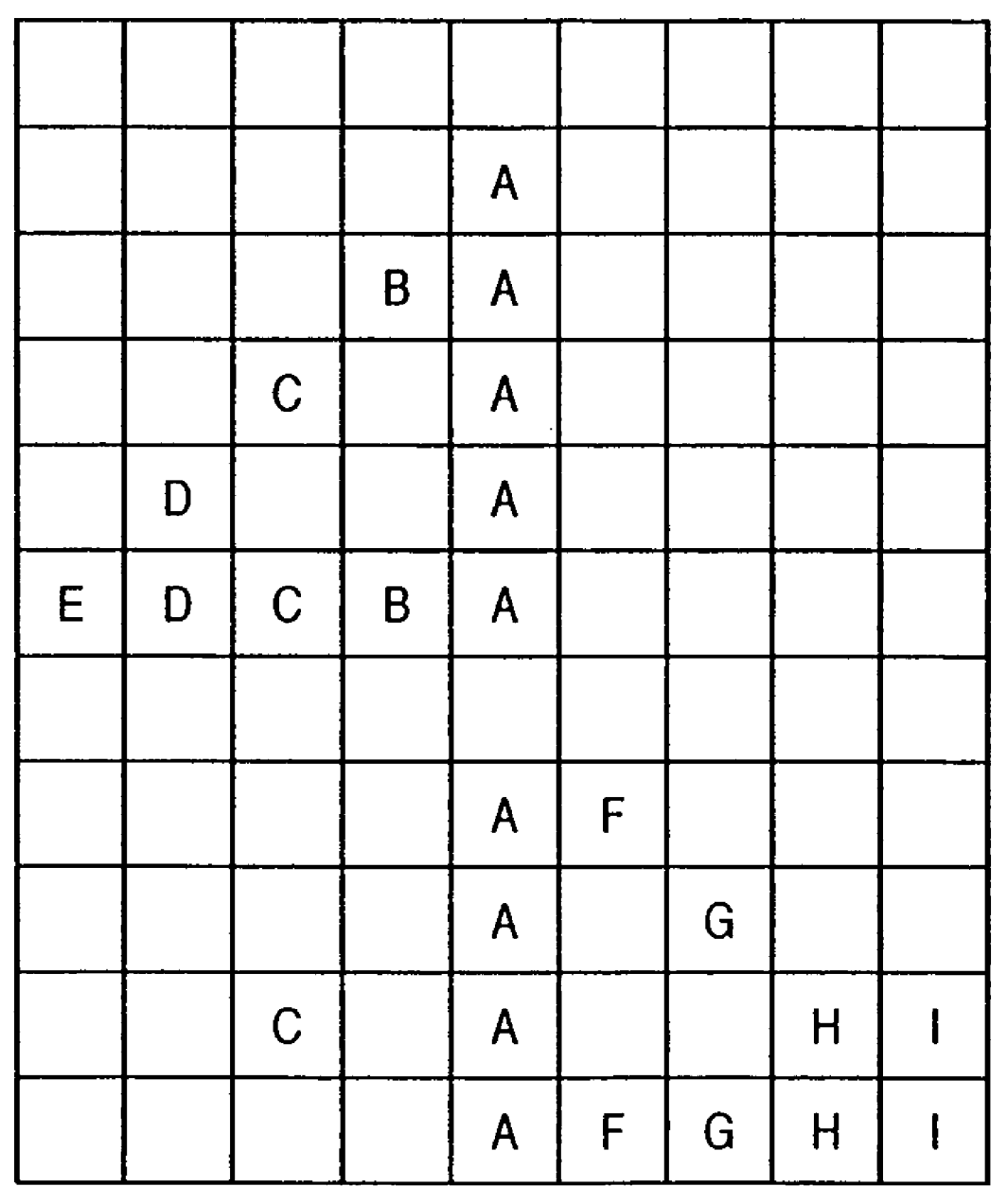

In step S9, the values outside the region are interpolated by the quantization value stored in the working area 508 in step S8 by referring to the shape information stored in the image area 506 in step S7. FIG. 36 shows input quantization results. Portions with letters A to I indicate quantization results in the region. Blank portions indicate quantization results outside the region. FIG. 18 is a flowchart showing details of coefficient interpolation processing. In step S100, it is determined whether interpolation processing is ended for all horizontal lines in the block. If NO in step S100, the flow advances to step S101. If YES in step S100, the flow advances to step S108.

In step S101, it is determined by using the shape information stored in the image area 506 whether all sub-band coefficients are outside the region in the horizontal line of the frequency band to be processed. If all sub-band coefficients are outside the region, the flow returns to step S100 to process the next horizontal line. In step S102, it is determined whether processing of all sub-band coefficients of the horizontal line to be processed is ended. If YES in step S102, the flow returns to step S100 to process the next horizontal line. Otherwise, the flow advances to step S103.

In step S103, it is determined by referring to shape information corresponding to the same position of the same frequency band whether a quantization value of interest is outside the region. If NO in step S103, the flow advances to step S104. Otherwise, the flow advances to step S105.

In step S104, the shape information at the same position is stored in the working area 508 on the memory 301. The flow returns to step to process the next sub-band coefficient. In step S105, it is determined by referring to the shape information stored in the working area 508 whether a region is present on the left side of the sub-band coefficient of interest. If such a region is present, the flow advances to step S106. Otherwise, the flow advances to step S107.

In step S106, the quantization value at the position is substituted by the nearest quantization value on the left side in the region in the working area 508. A value representing the inside of the region is stored in the shape information at the same position in the working area 508. The flow returns to step S102 to process the next sub-band coefficient.

In step S107, the quantization value at the position is substituted by the nearest quantization value on the right side in the region in the working area 508. A value representing the inside of the region is stored in the shape information at the same position in the working area 508. The flow returns to step S102 to process the next sub-band coefficient. FIG. 37 shows a result which is stored in the working area 508 in correspondence with the quantization results shown in FIG. 36. A lower case represents copy of the value of a corresponding upper case.

From step S108, vertical interpolation processing is executed. In step S108, it is determined whether interpolation processing is ended for all vertical lines in the block. If NO in step S108, the flow advances to step S109. If YES in step S108, the flow returns to step S10 in FIG. 15.

In step S109, it is determined by using the shape information stored in the image area 506 whether all sub-band coefficients are outside the region in the vertical line to be processed. If all sub-band coefficients are outside the region, the flow returns to step S108 to process the next vertical line. Otherwise, it is determined in step S110 whether processing of all sub-band coefficients of the vertical line to be processed is ended. If YES in step S110, the flow returns to step S108 to process the next vertical line. Otherwise, the flow advances to step S111.

In step S111, it is determined by referring to shape information corresponding to the same position in the shape information stored in the working area 508 in steps S104, S106, and S107 whether a quantization value of interest is outside the region. If NO in step S111, the flow returns to step S110 to process the next sub-band coefficient. Otherwise, the flow advances to step S112.

In step S112, it is determined by referring to the shape information stored in the working area 508 in steps S104, S106, and S107 whether a region is present on the upper side of the sub-band coefficient of interest. If such a region is present, the flow advances to step S113. Otherwise, the flow advances to step S114.

In step S113, the quantization value at the position is substituted by the nearest quantization value on the upper side in the region in the working area 508. The flow returns to step S110 to process the next sub-band coefficient. In step S114, the quantization value at the position is substituted by the nearest quantization value on the lower side in the region in the working area 508. The flow returns to step S110 to process the next sub-band coefficient. FIG. 38 shows a result which is stored in the working area 508 in correspondence with the quantization results shown in FIG. 36.

Referring back to FIG. 15, in step S10, the quantization value interpolated and stored in the working area 508 in step S9 is encoded and stored in the code area 507 on the memory 301. In step S11, the header stored on the memory 301 in step S1, the encoded data of the shape information stored in step S6, and the encoded data of the quantization value encoded in step S10 are multiplexed and stored in the code area 507 on the memory 301. Then, the data in the working area 508 and image area 506 are cleared. The flow returns to step S5 to process the next block. When the terminal 303 instructs the end of processing, all software programs are stopped.

With the series of selection operations, image data corresponding to a shape can be encoded. When expansion is executed by the DWT unit in consideration of the shape, and the sub-band coefficients are interpolated by neighboring values outside the region by the coefficient interpolation unit, the influence of interpolation can be suppressed. Since interpolation is not executed by a value (e.g., 0) outside the region, the encoding efficiency can be increased. In this embodiment, the JPEG 2000 encoding method is employed as the image encoding method. However, any other encoding method, and for example, a still image encoding method such as Still Texture Object encoding of MPEG-4 may be used. The encoding efficiency can also be increased by executing motion compensation encoding.

The MPEG-4 encoding method is used to encode shape information. However, any other encoding method such as JBIG or MMR may be used.

In this embodiment, the communication software 504 is activated, and encoded data in the code area 507 is transmitted to the communication line 309 through the communication interface 308. However, the encoded data may be stored in the storage device 305.

Each unit or all units of this embodiment may be implemented by hardware.

In the coefficient interpolation processing shown in FIG. 18, after horizontal interpolation is executed, vertical interpolation is executed. However, the present invention is not limited to this. Horizontal interpolation may be executed after vertical interpolation is executed.

Fifth Embodiment

In this embodiment, the decoding operation of the encoded data generated in the fourth embodiment will be described with reference to the arrangement shown in FIG. 13. An example will be described, in which encoded data stored in a storage device 305 is decoded and displayed on a monitor 307.

Figure 19:
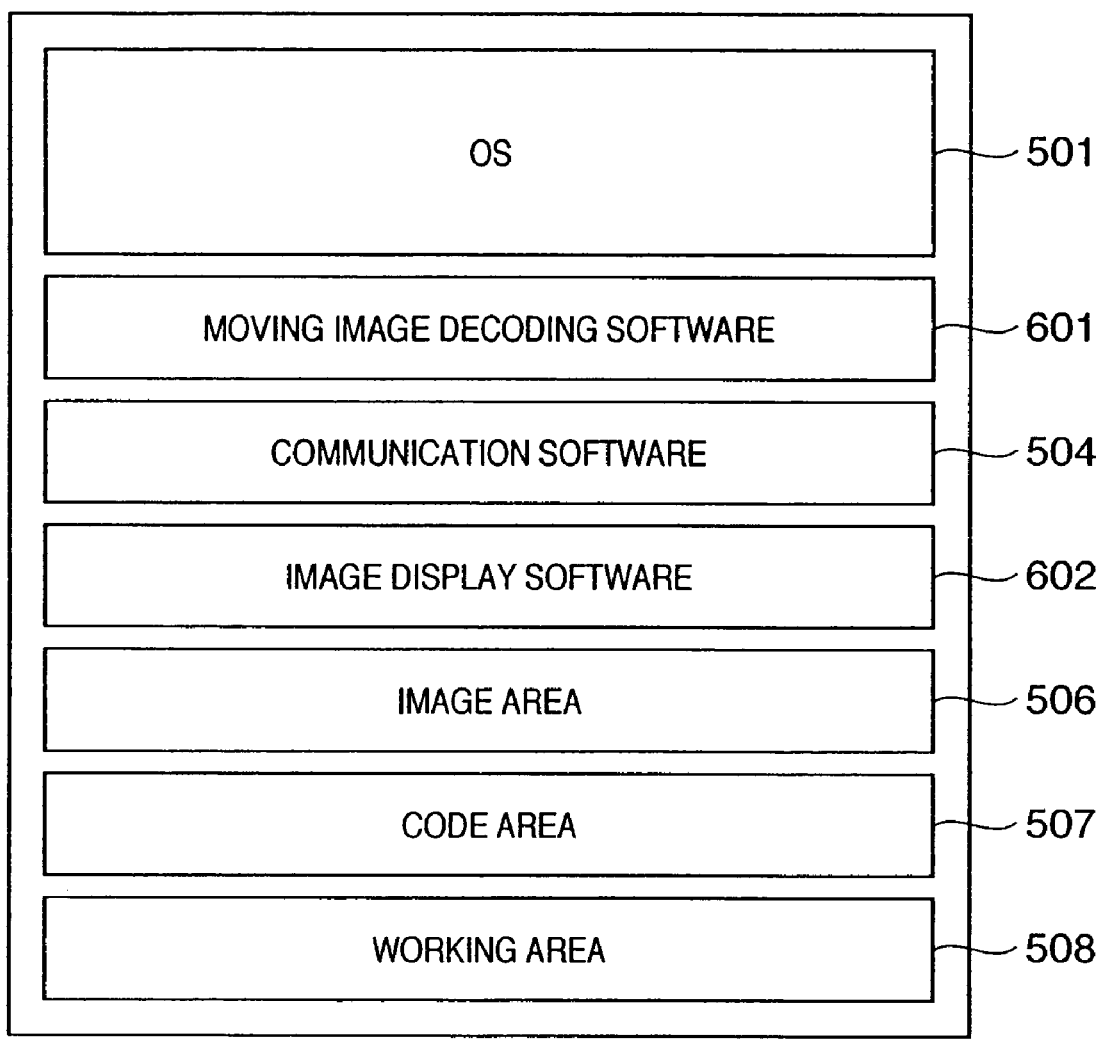
FIG. 19 is a view showing the use and storage states of a memory 301 according to the fifth embodiment of the present invention.

In this embodiment, the encoded data of moving image data is input for each frame. FIG. 19 shows the use and storage states of a memory 301. As in the fourth embodiment, the memory 301 has an OS 501, image area 506, code area 507, and working area 508. In addition, moving image decoding software 601 to decode a moving image, communication software 504 to communicate, and image display software 602 to display a moving image on the monitor 307 are stored.

Figure 20:
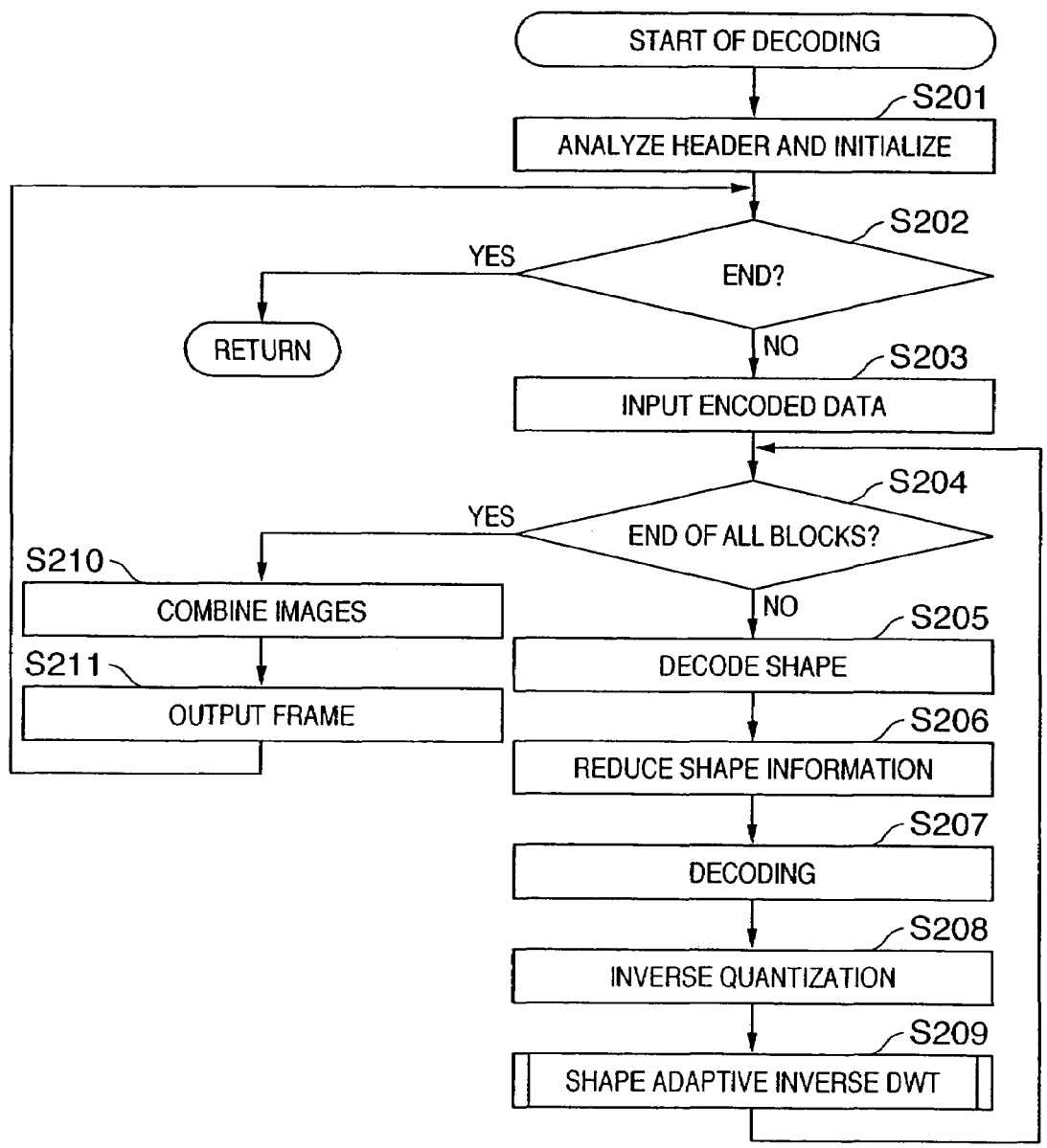
FIG. 20 is a flowchart showing a moving image encoding operation according to the fifth embodiment of the present invention.

As in the fourth embodiment, the units are initialized, and software stored in a storage device 304 is activated. An operation of a CPU 300 to cause the moving image decoding software 601 to execute decoding will be described with reference to the flowchart shown in FIG. 20.

In step S201, the moving image decoding software 601 inputs the header of the encoded data of moving image data from the storage device 305, stores it in the code area 507 on the memory 301, grasps the encoding characteristic, and stores initial values in the working area 508 on the memory 301.

In step S202, the end is determined. If all encoded data in the storage device 305 are decoded, or an interrupt instruction is issued from a terminal 303, all memory areas are cleared, and the software operation is ended. Otherwise, the flow advances to step S203 to process the next frame. In step S203, the encoded data of moving image data is input from the storage device 305 for each frame and stored in the code area 507 on the memory 301. In step S204, it is determined whether decoding for all blocks in the frame is ended. If YES in step S204, the flow advances to step S210. Otherwise, the flow advances to step S205.

In step S205, encoded data related to shape information is read out from the code area 507 and decoded. In this embodiment, decoding is performed in accordance with shape encoding of the MPEG-4 encoding method to generate shape information. The shape information is stored in the image area 506. The generated shape information is information representing the inside or outside of a region and containing 1-bit data per pixel.

In step S206, a DWT application count n for the shape information in the image area 506 is read out from the analysis result in step S201, and reduced images of n steps are generated and stored in the image area 506. In step S207, encoded data related to image data is read out from the code area 507 and decoded to obtain quantized sub-band coefficients. The sub-band coefficients are stored in the working area 508.

In step S208, the quantized sub-band coefficients in the working area 508 are read and inverse quantized to reproduce the sub-band coefficients. The sub-band coefficients are returned to the same region of the working area 508. In step S209, the reproduced sub-band coefficients in the working area 508 are read and subjected to inverse DWT adaptive to the shape information in the image area. The transform coefficients are stored in the working area 508 on the memory 301.

The shape adaptive inverse DWT processing in step S209 will be described with reference to the flowchart shown in FIG. 21. In step S251, the sub-band coefficients in the working area 508 are read. In step S252, reduced shape information corresponding to the block decoded from the shape information in the image area 506 is input.

In step S253, the end of shape adaptive inverse DWT processing is determined. It is determined whether the processing is executed a predetermined application count. If YES in step S253, the processing is ended, and the flow advances to step S204 in FIG. 20. In step S254, vertical up-sampling is executed for the data of a frequency band LL, which is inverse quantized and stored in the working area 508. The value is stored in the working area 508 on the memory 301.

In step S255, vertical low-pass filter processing is executed for the data of the frequency band LL up-sampled in step S254 by referring to the shape information stored in the image area 506 in step S252. The result is stored in the working area 508. This filter processing is executed in accordance with the flowchart shown in FIG. 17 of the fourth embodiment. This also applied to the subsequent filter processing operations.

In step S256, vertical up-sampling is executed for the data of a frequency band LH, which is inverse quantized and stored in the working area 508. The value is stored in the working area 508 on the memory 301.

In step S257, vertical high-pass filter processing is executed for the data of the frequency band LH up-sampled in step S256 by referring to the shape information stored in the image area in step S252. The result is stored in the working area 508. In step S258, the data are combined at the frequency defined in inverse DWT and stored in the working area 508.

In step S259, vertical up-sampling is executed for the data of a frequency band HL, which is inverse quantized and stored in the working area 508. The value is stored in the working area 508 on the memory 301. In step S260, vertical low-pass filter processing is executed for the data of the frequency band HL up-sampled in step S259 by referring to the shape information stored in the image area 506 in step S252. The result is stored in the working area 508.

In step S261, vertical up-sampling is executed for the data of a frequency band HH, which is inverse quantized and stored in the working area 508. The value is stored in the working area 508 on the memory 301. In step S262, vertical high-pass filter processing is executed for the data of the frequency band HH up-sampled in step S261 by referring to the shape information stored in the image area 506 in step S252. The result is stored in the working area 508.

In step S263, the data are combined at the frequency defined in inverse DWT and stored in the working area 508. In step S264, the reduced shape information stored in the working area 508 is double-up-sampled in the horizontal direction by repeating for each coefficient of the shape information and stored in the working area 508.

In step S265, horizontal up-sampling is executed for the data obtained by combining the frequency bands LL and LH and stored in the working area 508 in step S258. The value is stored in the working area 508 on the memory 301. In step S266, horizontal low-pass filter processing is executed for the data up-sampled in step S265 by referring to the shape information up-sampled in the vertical direction and stored in the working area 508 in step S264. The result is stored in the working area 508.

In step S267, horizontal up-sampling is executed for the data obtained by combining the frequency bands LH and HH and stored in the working area 508 in step S263. The value is stored in the working area 508 on the memory 301. In step S268, horizontal high-pass filter processing is executed for the data up-sampled in step S267 by referring to the shape information up-sampled in the horizontal direction and stored in the working area 508 in step S264. The result is stored in the working area 508.

In step S269, the data are combined at the frequency defined in inverse DWT and stored in the image area 506. The flow returns to step S253 to process the next frequency band. If YES in step S253, this processing is ended, and the flow returns to step S204 in FIG. 20.

Referring back to FIG. 20, if it is determined in step S204 that the processing is ended for all blocks in the frame, the flow advances to step S210. In steps 210, target image data is extracted and stored in the image area 506. In step S211, the image data stored in the image area 506 in step S210 is output. In step S211, the output image data is displayed on the monitor 307 by the image display software 602.

With the series of selection operations, encoded data which is encoded by causing the DWT unit to execute expansion by software in consideration of the shape can be decoded. Hence, the encoded data can be decoded without any degradation.

In this embodiment, shape information is encoded by the MPEG-4 encoding method, and an image is encoded by the JPEG 2000 encoding method. However, any other encoding method may be used. For example, shape information may be encoded by JBIG or MMR, and image data may be encoded by a still image encoding method such as Still Texture Object encoding of MPEG-4.

In this embodiment, encoded data is read out from a storage device. Instead, the communication software 504 may be activated to receive encoded data in the code area 507 from the communication line 309 through the communication interface 308. The function of each unit or those of all units of this embodiment may be implemented by hardware.

Sixth Embodiment

In the above-described embodiments, of image data, moving image data is encoded/decoded. However, the application target of the present invention is not limited to moving image data. The present invention can also be applied to a still image. In this embodiment, a still image encoding apparatus according to the present invention will be described.

Figure 27:
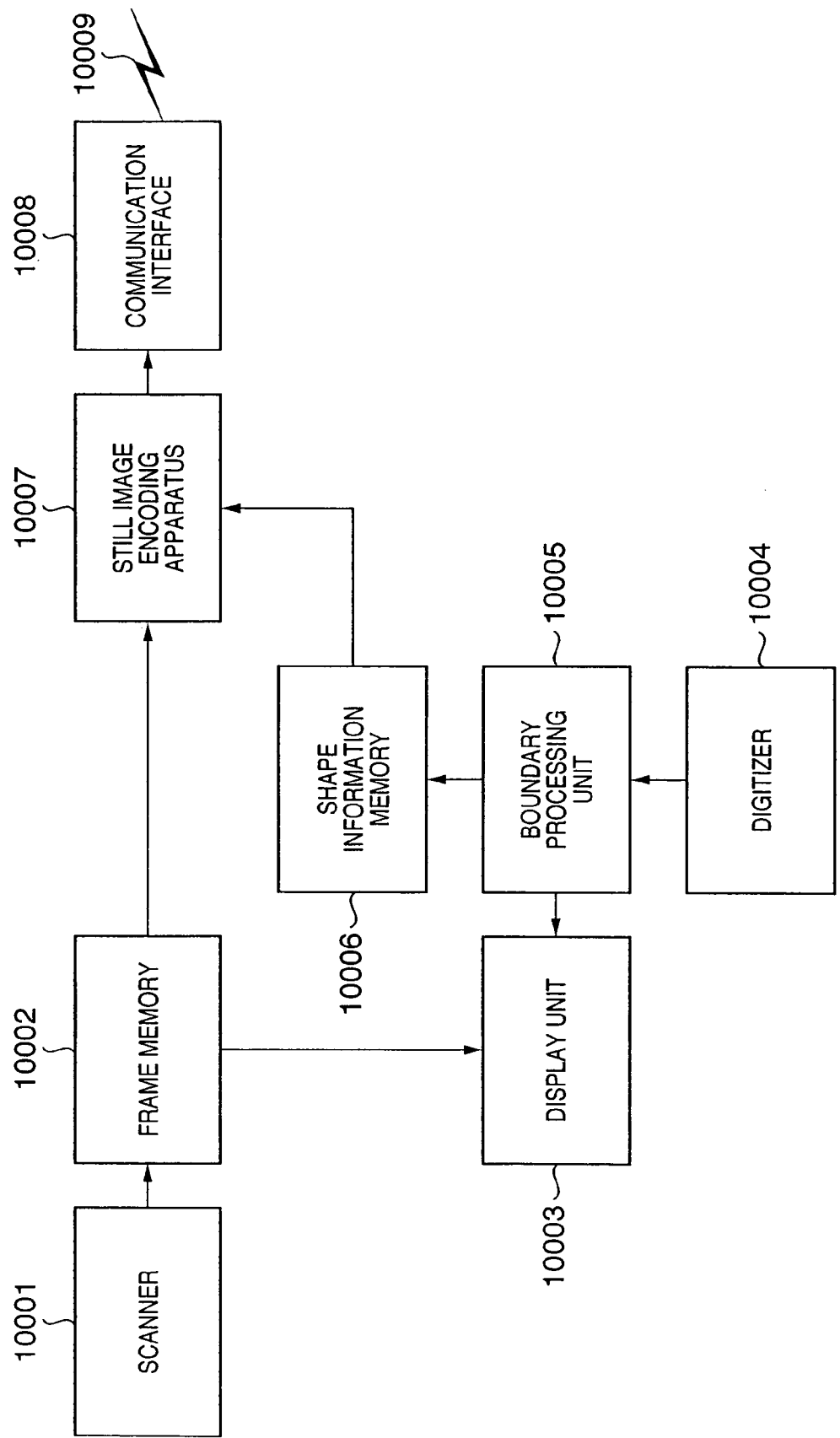
FIG. 27 is a block diagram showing an arrangement example of a facsimile apparatus according to the sixth embodiment of the present invention.

FIG. 27 shows an example in which the present invention is applied to a facsimile communication apparatus. A scanner 10001 reads a document. The scanner 10001 reads a color or grayscale document and generates an input image by photoelectric conversion and digitization. A frame memory 10002 accumulates the generated input image. A display unit 10003 displays the image data accumulated in the frame memory 10002.

A digitizer 10004 causes a user (not shown) to designate a necessary portion while observing the image displayed on the display unit 10003. A boundary processing unit 10005 determines, as an encoding target region, the inside of the region designed by the digitizer 10004 and stores the region in a shape information memory 10006. The shape information memory 10006 stores pixel values "1" in the region and pixel values "0" outside the region as shape information.

Reference numeral 10007 denotes a still image encoding apparatus to which the present invention is applied. A communication interface 10008 generates a packet to be transmitted to a communication line 10009 and transmits it to the communication line 10009. The communication line 10009 is formed from, e.g., a LAN or public line.

Image data read by the scanner 10001 is stored in the frame memory 10002. The image data stored in the frame memory 10002 is displayed on the display unit 10003. The user (not shown) traces the outline of a necessary portion by using the digitizer 10004. The boundary processing unit 10005 determines the target region, generates binary image information containing pixels having a value of 1 inside the target region and those having a value of 0 outside the region, and stores it in the shape information memory 10006 as shape information. The shape information stored in the shape information memory 10006 and the image data stored in the frame memory 10002 are input to the still image encoding apparatus 10007. The still image encoding apparatus 10007 encodes the image data and inputs the encoded data to the communication interface 10008. A packet is generated and transmitted to the destination apparatus through the communication line 10009.

Figure 28:
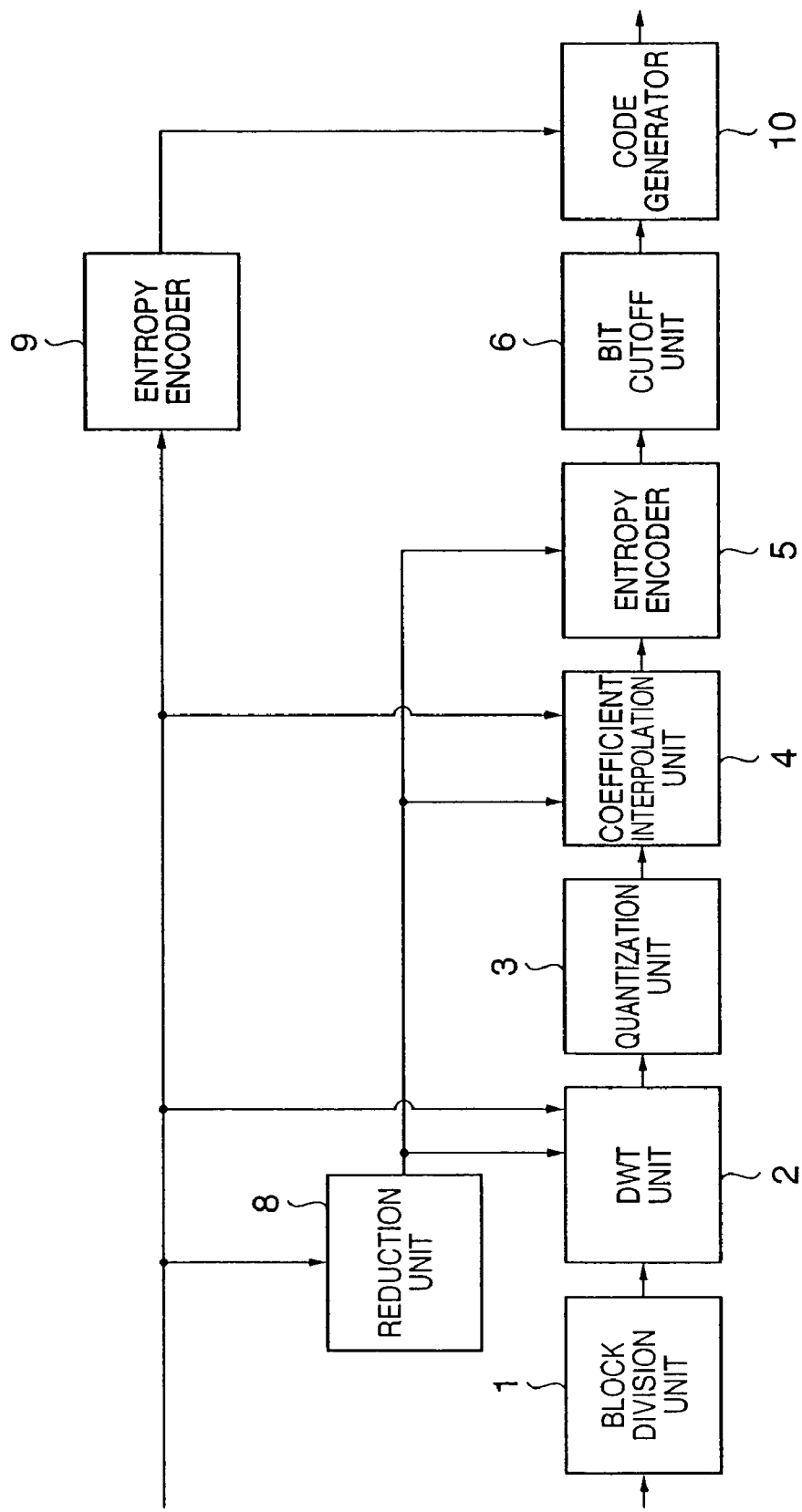
FIG. 28 is a block diagram showing an arrangement example of a still image encoding apparatus according to the sixth embodiment of the present invention.

FIG. 28 is a block diagram showing an arrangement example of the still image encoding apparatus 10007 shown in FIG. 27 according to this embodiment. As the image encoding method, the still image encoding apparatus 10007 can employ, e.g., the JPEG 2000 encoding method. However, the present invention is not limited to this. As the shape information encoding method, the still image encoding apparatus 10007 can employ, e.g., the MMR encoding method. However, the present invention is not limited to this.

The basic arrangement of the apparatus shown in FIG. 28 is the same as that of the moving image encoding apparatus shown in FIG. 1. However, the apparatus shown in FIG. 28 has no block division unit 7 in FIG. 1. Hence, a reduction unit 8 reduces shape information received from the shape information memory 10006 in accordance with the frequency band of a DWT unit 2. An entropy encoder 9 executes encoding by the MMR encoding method.

The remaining processes are basically the same as those of the moving image encoding apparatus described in the first embodiment, and a description thereof will be omitted here.

Seventh Embodiment

In the sixth embodiment, of the embodiments of the present invention, still image data encoding processing has been described. In the seventh embodiment, a still image decoding apparatus which decodes still image data will be described.

Figure 29:
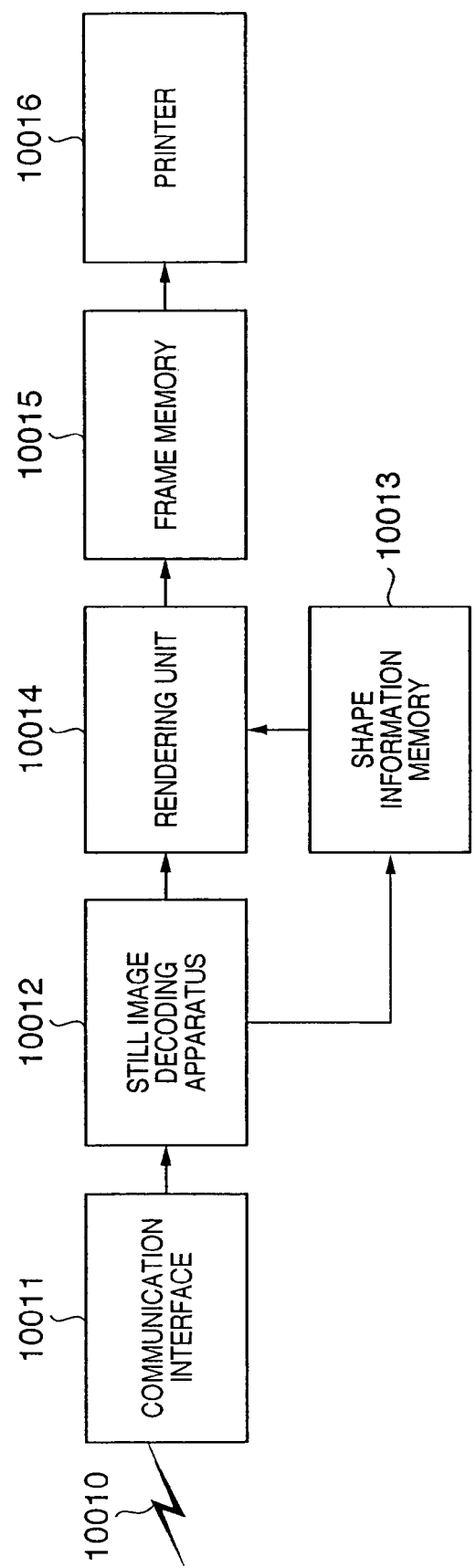
FIG. 29 is a block diagram showing an arrangement example of a facsimile apparatus according to the seventh embodiment of the present invention.

FIG. 29 shows an example in which the present invention is applied to a facsimile communication apparatus. A communication line 10010 is formed from, e.g., a LAN or public line. A communication interface 10011 analyzes packet data received from the communication line 10010 and reconstructs encoded data. Reference numeral 10012 denotes a still image decoding apparatus according to this embodiment. A shape information memory 10013 stores decoded shape information. A rendering unit 10014 renders the still image decoded by the still image decoding apparatus by referring to the shape information stored in the shape information memory 10013. A frame memory 10015 stores the rendered image data. A printer 10016 prints the contents of the frame memory 10015.

Packet data received from the communication line 10010 is input to the communication interface 10011 so that encoded data is reconstructed. The reconstructed encoded data is input to the still image decoding apparatus 10012. The block diagram corresponding to an arrangement example of the still image decoding apparatus 10012 shown in FIG. 29 is the same as that shown in FIG. 9. Processing in the still image decoding apparatus 10012 is also the same as that described with reference to FIG. 9 in the second embodiment, and a description thereof will be omitted here.

Referring to FIG. 9, shape information stored in a frame memory 402 is stored in the shape information memory 10013 in FIG. 29. The rendering unit 10014 reads out image data from a frame memory 408 and renders it into a printing format in accordance with the shape information stored in the shape information memory 10013. The rendered image data is stored in the frame memory 10015. The image data stored in the frame memory 10015 is printed and output by the printer 10016.

Eighth Embodiment

Figure 39:
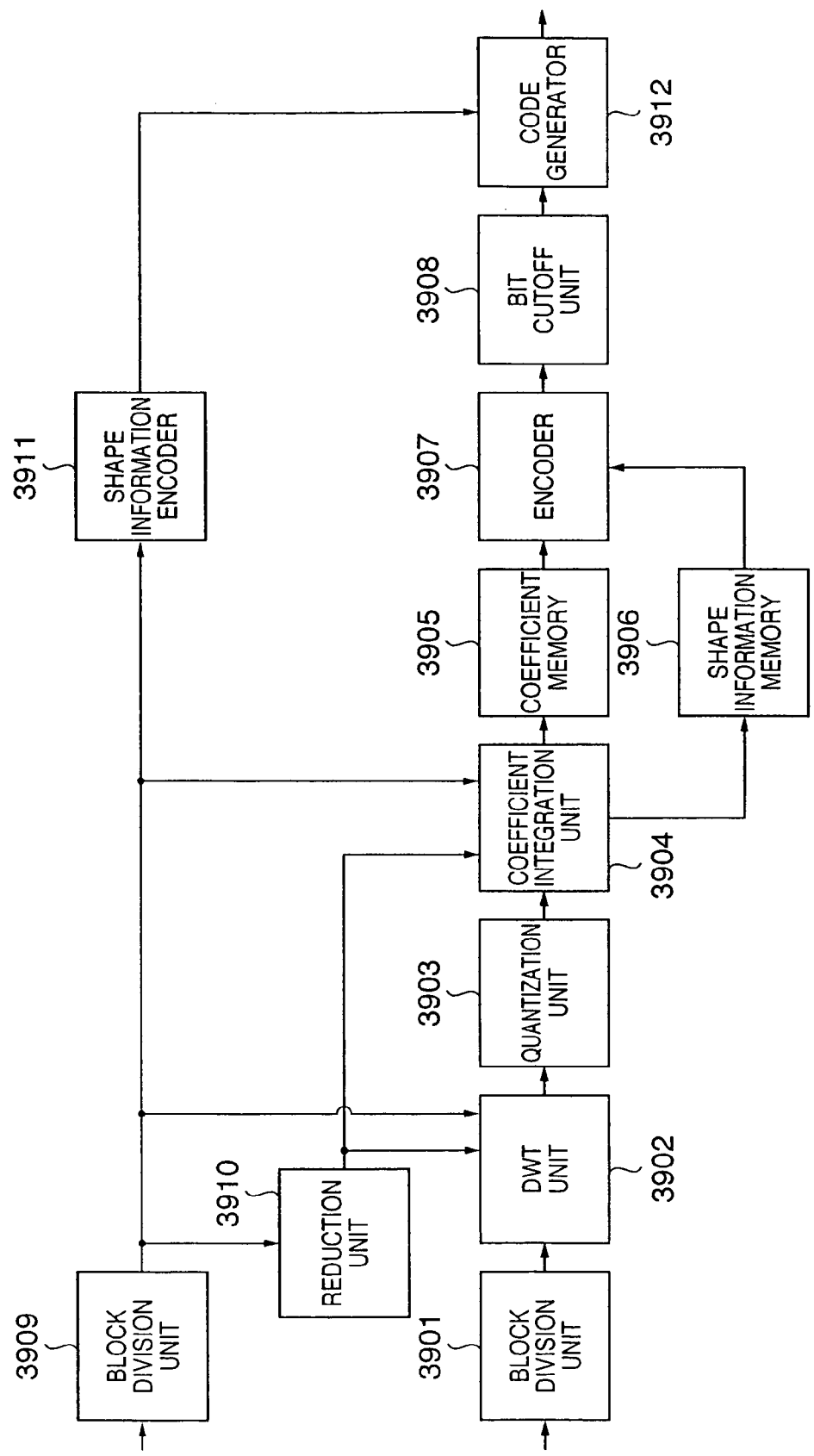
FIG. 39 is a block diagram showing an arrangement example of a moving image encoding apparatus according to the eighth embodiment of the present invention.

FIG. 39 is a block diagram showing a moving image encoding apparatus according to the eighth embodiment of the present invention. In the eighth embodiment, the Motion JPEG 2000 encoding method will be exemplified as the image encoding method used by the moving image encoding apparatus. However, the present invention is not limited to this. In addition, the MPEG-4 encoding method will be exemplified as the shape encoding method. However, the present invention is not limited to this.

Referring to FIG. 39, a block division unit 3901 divides input image data into blocks. A DWT unit 3902 executes DWT for the divided blocks. A quantization unit 3903 quantizes sub-band coefficients obtained by DWT. A coefficient integration unit 3904 integrates the sub-band coefficients and shape information in the region in the quantization results. A coefficient memory 3905 stores the sub-band coefficients output from the coefficient integration unit 3904.

A shape information memory 3906 stores shape information output from the coefficient integration unit 3904. An encoder 3907 executes EBCOT encoding of the JPEG 2000 encoding method for each bit plane. A bit cutoff unit 3908 adjusts the bit rate. A block division unit 3909 divides input shape information into blocks. A reduction unit 3910 reduces the shape information divided into blocks in accordance with the frequency band of the DWT unit 3902.

A shape information encoder 3911 encodes shape information in accordance with shape encoding of the MPEG-4 encoding method. A code generator 3912 generates a necessary header and forms encoded data on the basis of the outputs from the bit cutoff unit 3908 and shape information encoder 3911.

The moving image encoding operation of the moving image encoding apparatus with the above-described arrangement will be described below.

In this embodiment, moving image data is input for each frame. Simultaneously, separately extracted shape information is input. Shape information may be extracted in the apparatus, as a matter of course. FIG. 22A shows input image data, and FIG. 22B shows its shape information.

Moving image data is input to the block division unit 3901, and shape information is input to the block division unit 3909. Each block division unit holds data of one frame, divides it into blocks, and outputs each block to the subsequent stage. The moving image data divided into blocks by the block division unit 3901 is input to the DWT unit 3902. The application count of DWT executed by the DWT unit 3902 is 2, and the number of divided blocks is 7. However, the present invention is not limited to this.

The shape information divided into blocks is input to the shape information encoder 3911 and reduction unit 3910. The shape information is encoded by the shape information encoder 3911 in accordance with shape encoding of the MPEG-4 encoding method and output to the code generator 3912.

The reduction unit 3910 reduces the received shape information in accordance with the application count in the DWT unit 3902. When the application count of this embodiment is 2, the shape information is reduced to ½ and ¼. That is, letting T be the application count, reduced images of $(½)^N$ (N=1, . . . , T) are generated. The pieces of reduced shape information correspond to frequency bands. FIG. 22C shows the pieces of shape information arranged.

The detailed arrangement and operation of the DWT unit 3902 are the same as the contents described in the first embodiment with reference to FIGS. 2, 3, 5 to 8, and 23, and a description thereof will be omitted here.

Determination of the inside/outside of a region based on shape information and pixel value interpolation are the same as those already described in the first embodiment with reference to FIGS. 5 to 8.

The sub-band coefficient of each frequency band generated by the DWT unit 3902 is quantized by the quantization unit 3903 and input to the coefficient integration unit 3904. The coefficient integration unit 3904 receives the reduced shape information from the reduction unit 3910 and integrates the sub-band coefficients in the region.

Figure 40:
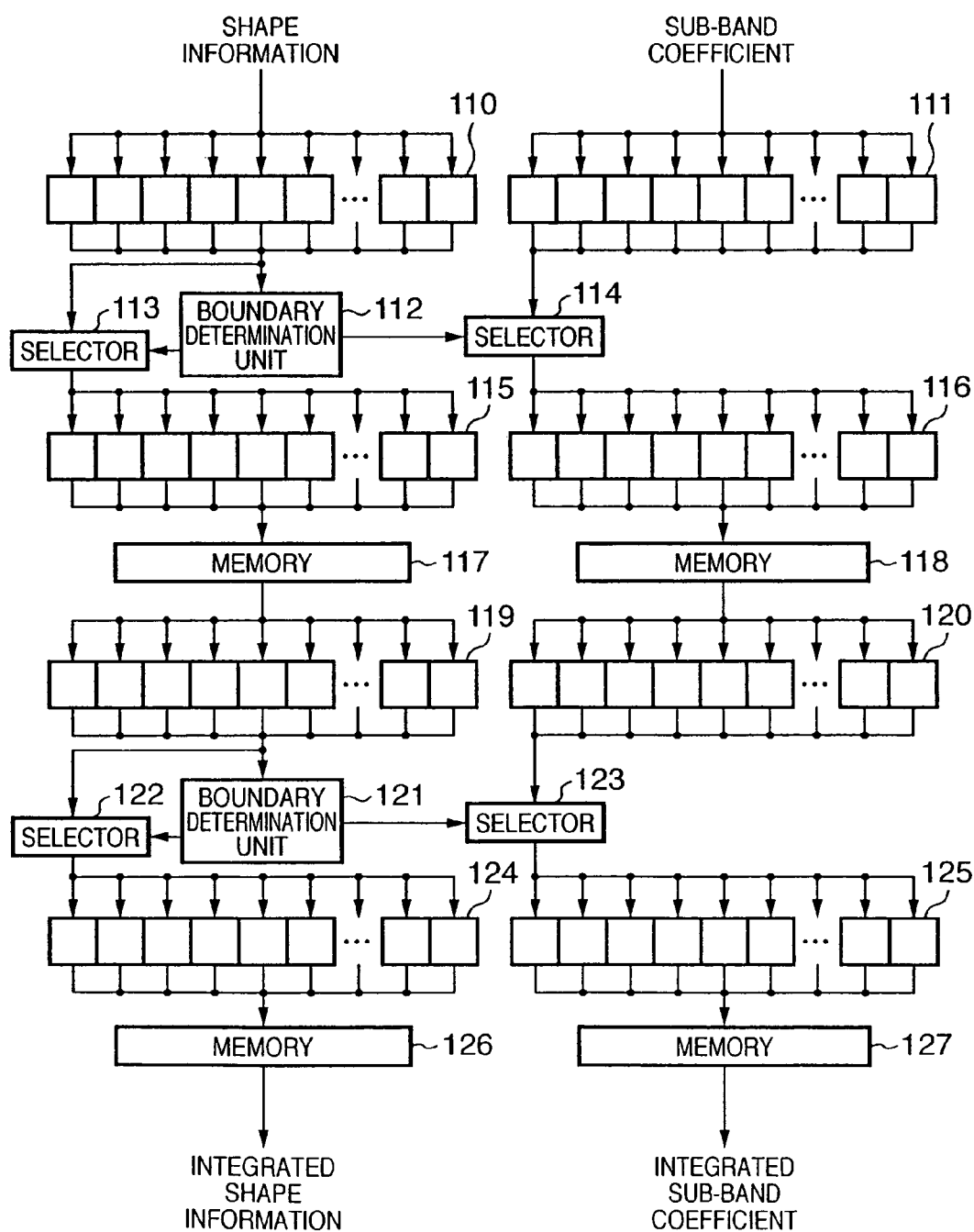
FIG. 40 is a block diagram showing an arrangement example of a coefficient integration unit according to the eighth embodiment of the present invention.

FIG. 40 is a block diagram showing the detailed arrangement example of the coefficient integration unit 3904. Referring to FIG. 40, a latch group 110 stores shape information of one horizontal line. A latch group 111 stores sub-band coefficients of one horizontal line. A boundary determination unit 112 determines boundaries from the received shape information. A selector 113 switches the inputs from the latch group 110 in accordance with the contents of the boundary determination unit 112. A selector 114 switches the inputs from the latch group 111 in accordance with the contents of the boundary determination unit 112. A latch group 115 stores shape information as the output from the selector 113. A latch group 116 stores sub-band coefficients as the output from the selector 114. A memory 117 stores one block output from the latch group 115 which stores shape information. A memory 118 stores one block output from the latch group 116 which stores sub-band coefficients.

A latch group 119 stores shape information of one vertical line. A latch group 120 stores sub-band coefficients of one vertical line. A boundary determination unit 121 determines boundaries from the received shape information. A selector 122 switches the inputs from the latch group 119 in accordance with the contents of the boundary determination unit 121. A selector 123 switches the inputs from the latch group 120 in accordance with the contents of the boundary determination unit 121. A latch group 124 stores shape information as the output from the selector 122. A latch group 125 stores sub-band coefficients as the output from the selector 123. A memory 126 stores one block output from the latch group 124 which stores shape information. A memory 127 stores one block output from the latch group 1256 which stores sub-band coefficients.

In the above arrangement, shape information and sub-band coefficients of one horizontal line are input and stored in the latch groups 110 and 111, respectively. The boundary determination unit 112 reads out shape information one by one from the latch group 110 from the left side in the horizontal direction. If the data indicates the inside of the region, control is executed such that the selectors 113 and 114 output the input data. If the data indicates the outside of the region, control is executed such that the selectors 113 and 114 output no data.

Before the start of processing, the latch groups 115 and 116 are always cleared by 0. Shape information having a value of 0 indicates the outside of the region. Data stored in the latch groups 110 and 111 are read out one by one in accordance with the clock. If the data indicates the inside of the region, the shape information and sub-band coefficient are sequentially stored in the latch groups 115 and 116. If the data indicates the outside of the region, no data is stored. When processing of one line is ended, the pieces of shape information and sub-band coefficients are stored close to the left because data outside the region are excluded.

Figure 42A:
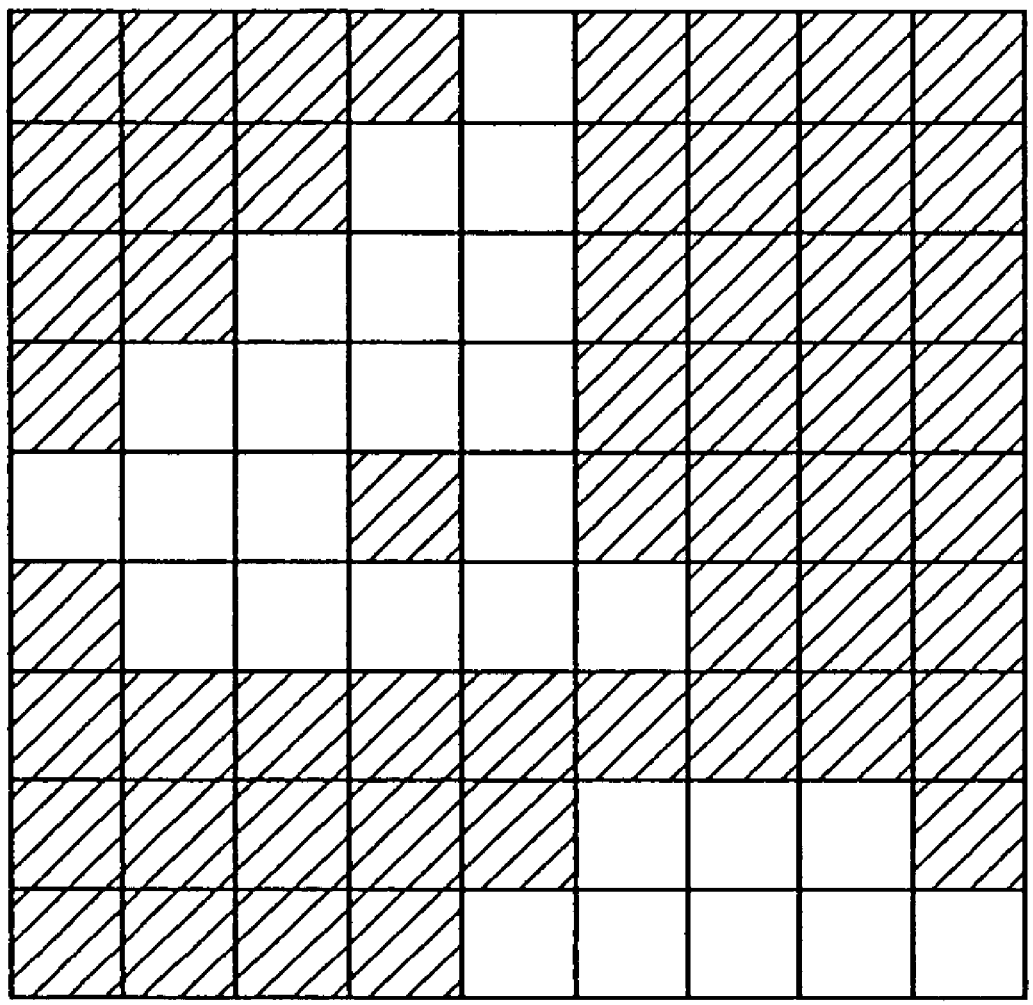
FIG. 42A is a view showing an example of coefficient values to be integrated according to the embodiment of the present invention.
Figure 42B:
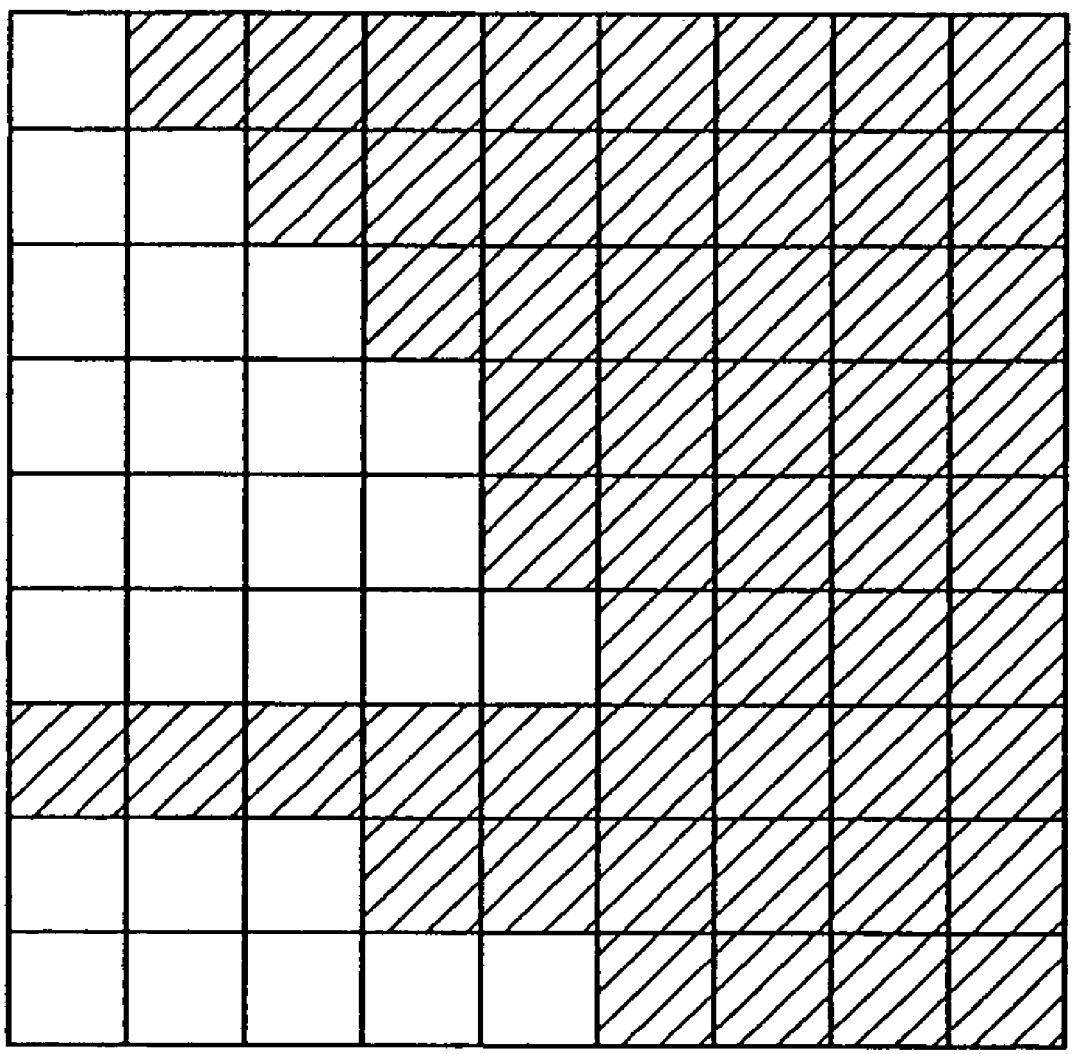
FIG. 42B is a view showing an example of coefficient values during integration according to the embodiment of the present invention.
Figure 42C:
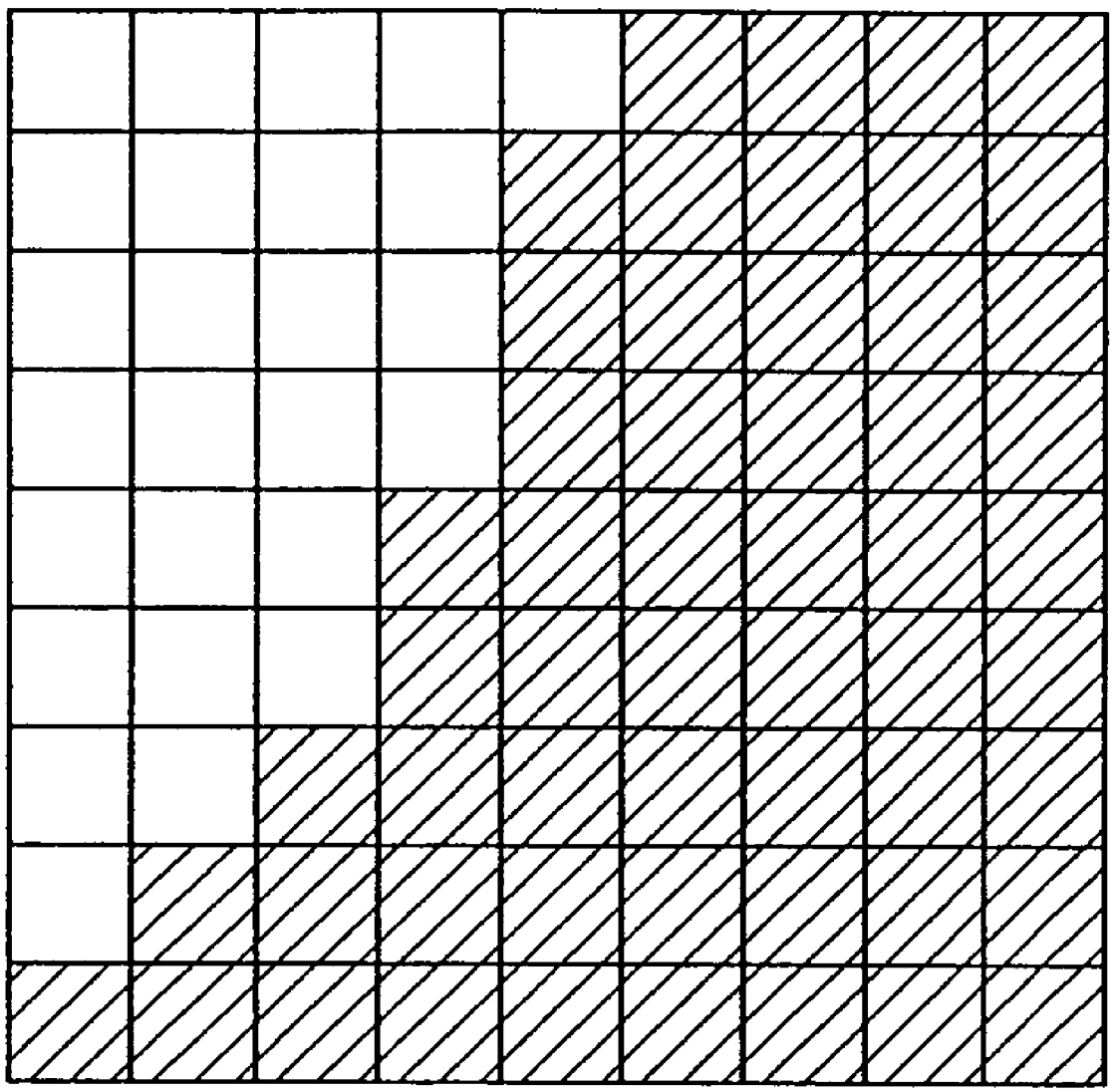
FIG. 42C is a view showing an example of integrated coefficient values according to the embodiment of the present invention.

The shape information storage result in the latch group is stored in the memory 117, and the sub-band coefficient storage result is stored in the memory 118. FIGS. 42A to 42C are views showing the storage states in the memories 117 and 118. Referring to FIGS. 42A to 42C, a white cell indicates data in the region, and a gray cell indicates data outside the region.

FIG. 42A shows input shape information or sub-band coefficients. When the above-described processing is executed for such input data, the pieces or shape information or sub-band coefficients are stored in the memory 117 or 118 as shown in FIG. 42B.

When processing of one block in the horizontal direction is ended, shape information and sub-band coefficients of one vertical line are input from the memories 117 and 118 and stored in the latch groups 119 and 120, respectively. The boundary determination unit 121 reads out shape information one by one from the latch group 119 from the upper side in the vertical direction. If the data indicates the inside of the region, control is executed such that the selectors 122 and 123 output the input data. If the data indicates the outside of the region, control is executed such that the selectors 122 and 123 output no data.

Before the start of processing, the latch groups 124 and 125 are always cleared by 0. Data stored in the latch groups 119 and 120 are read out one by one in accordance with the clock. If the data indicates the inside of the region, the shape information and sub-band coefficient are sequentially stored in the latch groups 124 and 125. If the data indicates the outside of the region, no data is stored. When processing of one vertical line is ended, the pieces of shape information and sub-band coefficients are stored close to the upper side. The shape information storage result is stored in the memory 126, and the sub-band coefficient storage result is stored in the memory 127. FIG. 42C shows the shape information or sub-band coefficients obtained by executing the above-described processing for the data shown in FIG. 42B. The outputs from the memories 126 and 127 are stored in the shape information memory 3906 and coefficient memory 3905 in FIG. 39 as integrated shape information and integrated sub-band coefficient, respectively.

Referring back to FIG. 39, the integrated sub-band coefficients and integrated shape information, which are stored in the coefficient memory 3905 and shape information memory 3906, are input to the encoder 3907. The sub-band coefficients are EBCOT-encoded for each bit plane and input to the bit cutoff unit 3908.

Figure 41:
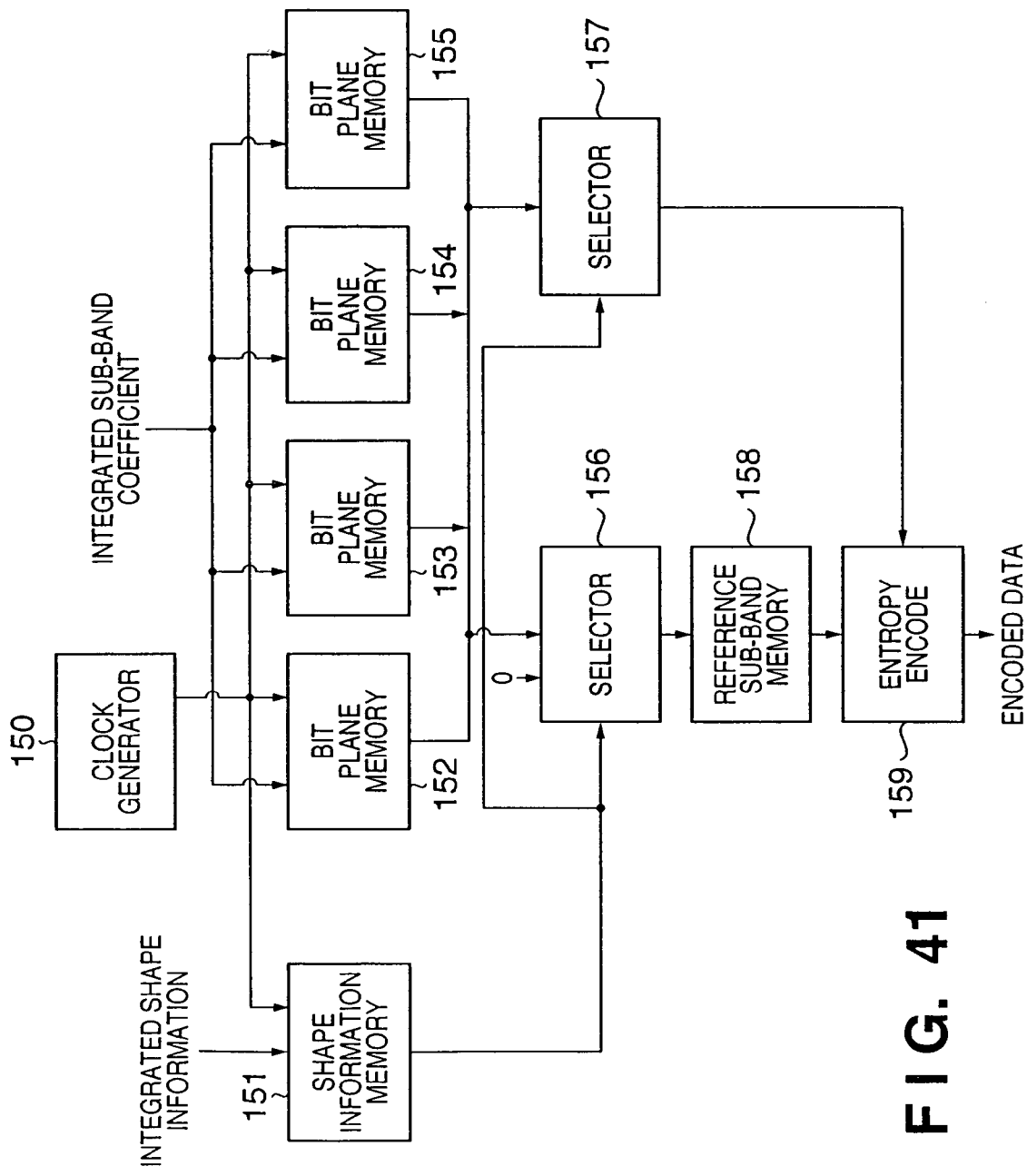
FIG. 41 is a block diagram showing an arrangement example of an encoder according to the eighth embodiment of the present invention.

FIG. 41 is a block diagram showing the detailed arrangement example of the encoder 3907. Referring to FIG. 41, a clock generator 150 generates a clock for each integrated sub-band coefficient. A shape information memory 151 stores integrated shape information input from the shape information memory 3906. Bit plane memories 152, 153, 154, and 155 store the bits of the integrated sub-band coefficients for each bit plane. A selector 156 controls the input and output in accordance with the integrated shape information in the shape information memory 151. A selector 157 controls the output in accordance with the integrated shape information in the shape information memory 151. A reference sub-band memory 158 stores sub-band coefficients to be referred to. Reference numeral 159 denotes an entropy encoder.

The shape information memory 151 stores the shape information in the shape information memory 3906. When the sub-band coefficients in the coefficient memory 3905 are stored in the bit plane memories 152, 153, 154, and 155 for each bit plane, the clock generator 150 generates the clock so that arithmetic encoding is started from the upper bit plane. The selector 157 reads out the bits to be encoded from the bit plane memories 152, 153, 154, and 155 in accordance with the clock. When corresponding integrated shape information stored in the shape information memory 151 indicates the inside of the region, the bits are input to the entropy encoder 159. When integrated shape information indicates the outside of the region, no bit is output, and the entropy encoder 159 does not operate.

When it is identified on the basis of corresponding integrated shape information stored in the shape information memory 151 that the integrated sub-band coefficient to be encoded is in the region, the selector 156 appropriately reads out the bits of encoded sub-band coefficients of the integrated sub-band coefficients around the integrated sub-band coefficient to be encoded from the bit plane memories 152, 153, 154, and 155 and outputs the bits. On the basis of corresponding integrated shape information stored in the shape information memory 151, for sub-band coefficients to be referred to, which are outside the region, "0" is selected as the input and output. The output from the selector 156 is stored in the reference sub-band memory 158. The entropy encoder 159 reads the bits to be encoded from the selector 157 and the reference value from the reference sub-band memory 158 and encodes the bits to be encoded. The encoding result is input to the bit cutoff unit 3908 in FIG. 39.

The bit cutoff unit 3908 determines the number of bit planes to be output to execute rate control on the basis of the capacity of a buffer (not shown) and inputs the encoded data of the bit plane to the code generator 3912. The code generator 3912 multiplexes a necessary header, the encoded data of the shape information output from the shape information encoder 3911, and the encoded data output from the bit cutoff unit 3908 and outputs the multiplexed data.

With the series of selection operations, image data corresponding to a shape can be encoded. When expansion is executed by the DWT unit in consideration of the shape, and the sub-band coefficients are integrated by the coefficient integration unit 3904 in accordance with the shape information, the sub-band coefficients in the region, which have high correlation, can be integrated. Since the number of targets to be encoded is decreased, the encoding efficiency can be increased. In addition, since the number of targets to be entropy-encoded decreases, high-speed processing can be implemented.

Ninth Embodiment

Figure 43:
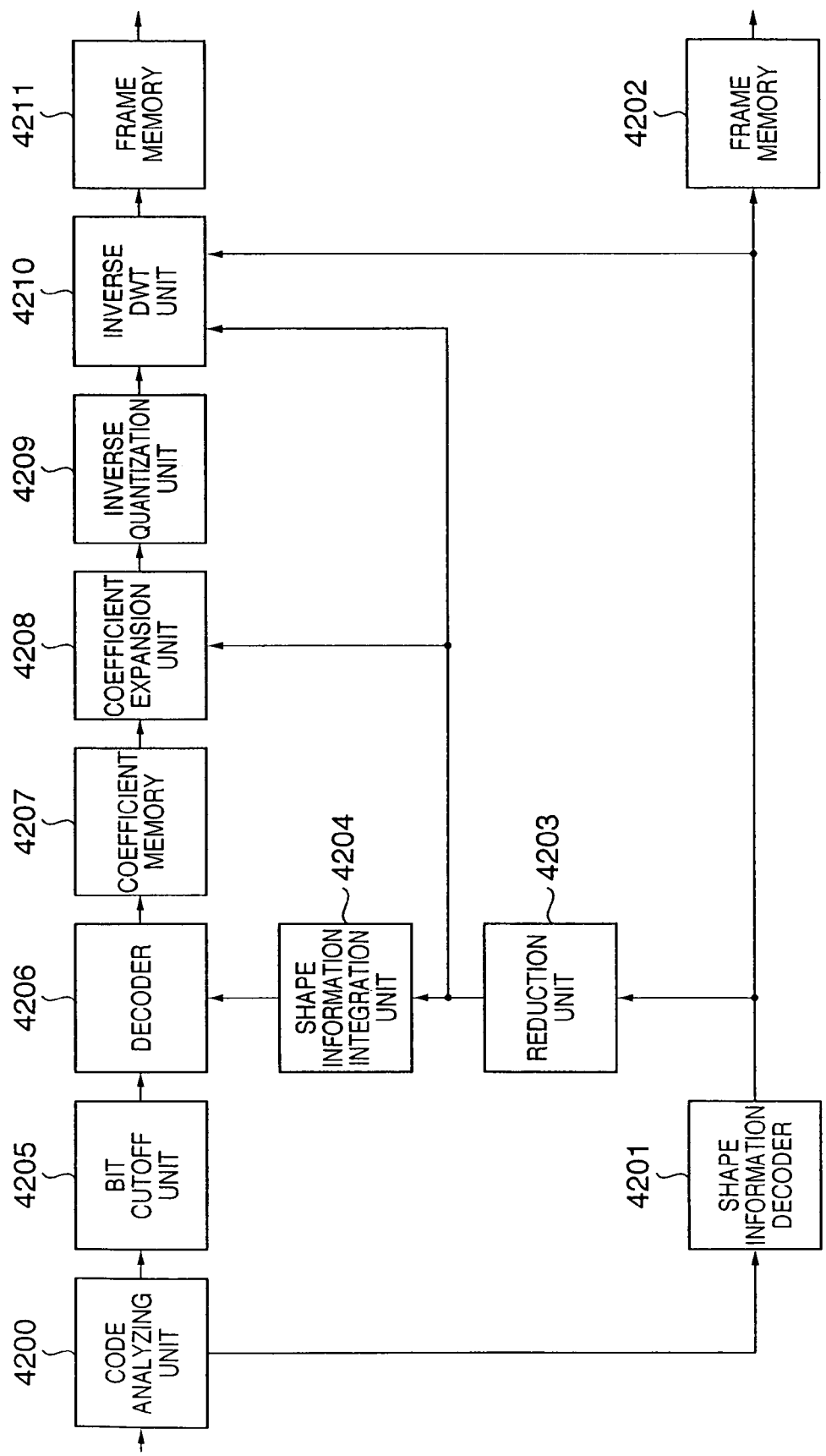
FIG. 43 is a block diagram showing an arrangement example of a moving image decoding apparatus according to the ninth embodiment of the present invention.

FIG. 43 is a block diagram showing an arrangement example of a moving image decoding apparatus according to the ninth embodiment of the present invention. In the ninth embodiment, an example will be described, in which encoded data generated in the eighth embodiment is decoded. However, the present invention is not limited to this.

A code analyzing unit 4200 analyzes a header, controls the subsequent stage on the basis of the analysis result, and inputs received encoded data to a bit cutoff unit 4205 and shape information decoder 4201. The shape information decoder 4201 decodes data in accordance with shape encoding of the MPEG-4 encoding method. A frame memory 4202 stores shape information obtained by decoding. A reduction unit 4203 reduces the decoded shape information in accordance with the frequency band of an inverse DWT unit 4210. A shape information integration unit 4204 integrates shape information to generate integrated shape information.

The bit cutoff unit 4205 adjusts the number of bits to be decoded. A decoder 4206 decodes each bit plane in accordance with EBCOT encoding of the JPEG 2000 encoding method. A coefficient memory 4207 stores decoded sub-band coefficients. A coefficient expansion unit 4208 expands the sub-band coefficients on the basis of shape information. An inverse quantization unit 4209 inverse quantizes quantized sub-band coefficients. The inverse DWT unit 4210 executes inverse DWT for each inverse quantized block on the basis of the shape information. A frame memory 4211 stores image data obtained by decoding.

The moving image decoding operation of the moving image decoding apparatus with the above arrangement will be described below. In this embodiment, encoded data of moving image data is input for each frame.

The input encoded data is input to the code analyzing unit 4200. The code analyzing unit 4200 analyzes the added header to grasp the encoding characteristic and initializes subsequent units. The code analyzing unit 4200 also separates, from the received encoded data, encoded data related to shape information and encoded data related to image data and outputs the former to the shape information decoder 4201 and the latter to the bit cutoff unit 4205.

The shape information decoder 4201 executes decoding in accordance with shape encoding of the MPEG-4 encoding method to generate shape information and stores it in the frame memory 4202. Simultaneously, the shape information is input to the reduction unit 4203. The reduction unit 4203 generates and holds a reduced image of the shape information in accordance with the DWT application count obtained by analysis by the code analyzing unit 4200. In this embodiment, since the encoded data generated in the eighth embodiment is decoded, the application count is 2. The reduced shape information is input to the shape information integration unit 4204, coefficient expansion unit 4208, and inverse DWT unit 4210.

The shape information integration unit 4204 executes the same processing as shape information integration processing by the coefficient integration unit 3904 (FIG. 40) of the eighth embodiment. Integrated shape information corresponding to shape information stored in the frame memory 4202 is generated and provided to the decoder 4206. More specifically, the shape information integration unit 4204 includes a latch group 110, boundary determination unit 112, selector 113, latch group 115, memory 117, latch group 119, latch 121, latch 122, selector 124, and memory 126 in FIG. 40. Integrated shape information is generated by integrating pieces of shape information representing the inside of the region and output to the decoder 4206 in FIG. 43.

The encoded data related to image data is input to the bit cutoff unit 4205. The bit cutoff unit 4205 adjusts the number of bits to be decoded in accordance with the situation of the decoder 4206 and the like. The decoder 4206 receives the encoded data related to image data from the bit cutoff unit 4205 and the integrated shape information from the shape information integration unit 4204.

FIG. 44 is a block diagram showing the detailed arrangement example of the decoder 4206. Referring to FIG. 44, a clock generator 220 generates a clock for each sub-band coefficient. A shape information memory 221 stores shape information input from the shape information integration unit 4204. A selector 222 controls the input and output in accordance with the shape information in the shape information memory 221. A reference sub-band memory 223 stores coefficients to be referred to. Reference numeral 224 denotes an entropy decoder. Bit plane memories 225, 226, 227, and 228 store the bits of the sub-band coefficients for each bit plane.

When the shape information from the shape information integration unit 4204 is stored in the shape information memory 221, the clock generator 220 generates the clock to execute processing for each coefficient. If the sub-band coefficient to be decoded is in the region, the selector 222 appropriately reads out the bits of encoded sub-band coefficients of the sub-band coefficients around the sub-band coefficient to be encoded from the bit plane memories 225, 226, 227, and 228.

For sub-band coefficients to be referred to in the shape information memory 221, which are outside the region, "0" is output. When the data indicates the outside of the region, the selector 222 outputs no data, and the entropy decoder 224 does not operate. The entropy decoder 224 reads the encoded data and the reference value from the reference sub-band memory 223 and decodes the bits. The decoded bits are stored in the bit plane memories 225, 226, 227, and 228 in accordance with the clock generator 220.

Figure 45:
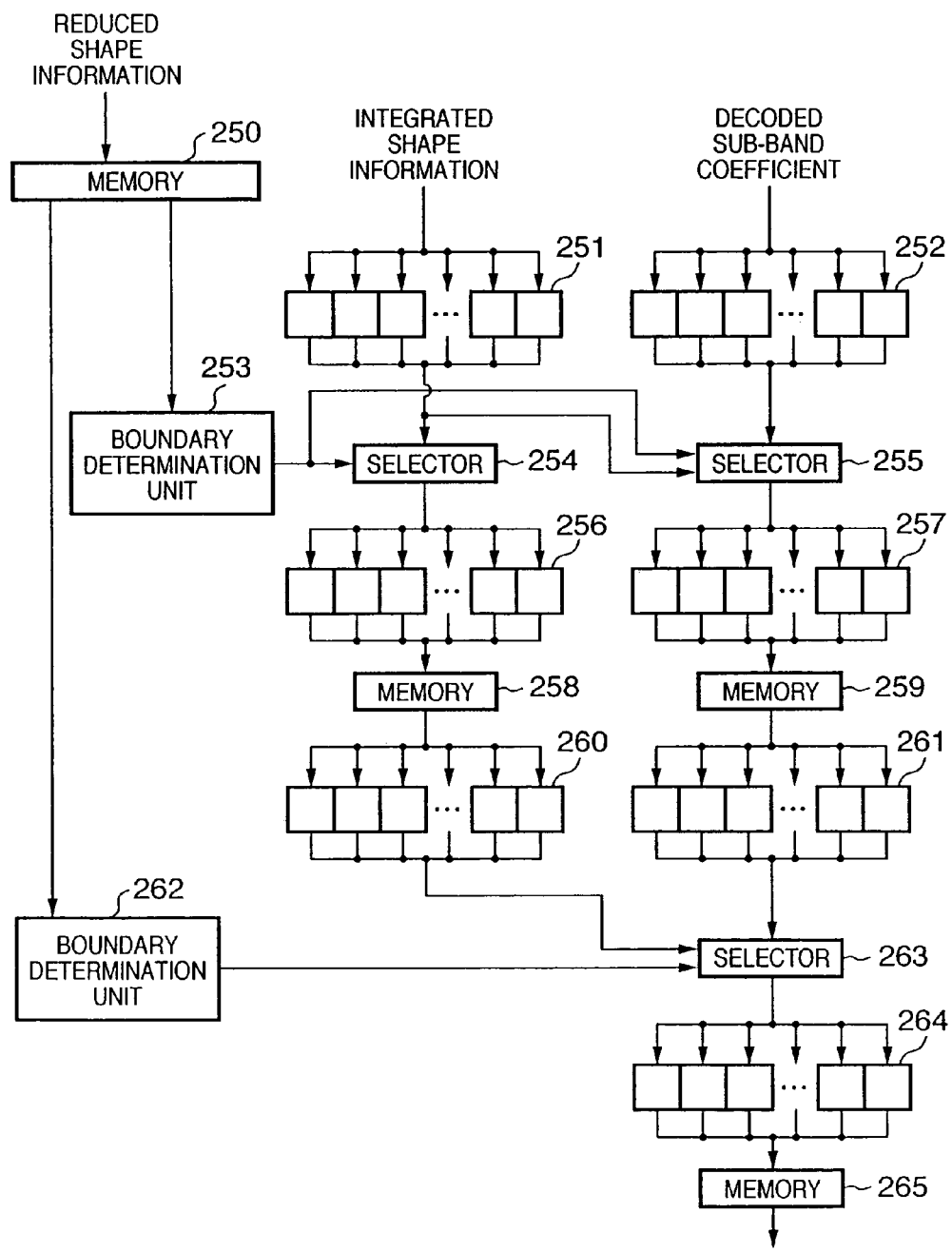
FIG. 45 is a block diagram showing an arrangement example of a coefficient expansion unit according to the ninth embodiment of the present invention.

The decoding result is input to the coefficient memory 4207 in FIG. 43. The coefficient expansion unit 4208 expands the coefficients. FIG. 45 is a block diagram showing the detailed arrangement of the coefficient expansion unit 4208. A memory 4250 stores shape information reduced in accordance with the frequency band. A latch group 4251 accumulates the data of one horizontal line of the shape information integrated by the shape information integration unit 4204. A latch group 4252 accumulates the data of one horizontal line of decoded sub-band coefficient data.

A boundary determination unit 4253 determines boundaries in the horizontal direction from the received shape information. A selector 4254 controls the output in accordance with the output from the boundary determination unit 4253. A selector 4255 controls the output in accordance with the outputs from the boundary determination unit 4253 and latch group 4251. A latch group 4256 accumulates the output from the selector 4254. A latch group 4257 accumulates the output from the selector 4255. Memories 4258 and 4259 store shape information and sub-band coefficients for each block, respectively.

A latch group 4260 accumulates the data of one vertical line of shape information. A latch group 4261 accumulates the data of one vertical line of sub-band coefficient data. A boundary determination unit 4262 determines boundaries in the vertical direction from the received shape information. A selector 4263 controls the output in accordance with the outputs from the boundary determination unit 4262 and latch group 4260. A latch group 4264 accumulates the output from the selector 4263. A memory 4265 stores sub-band coefficients for each block.

In the above arrangement, shape information adaptive to the frequency band to be processed is input from the reduction unit 4203 in FIG. 43 and stored in the memory 4250. One horizontal line of integrated shape information and one horizontal line of sub-band coefficients are input from the shape information integration unit 4204 and coefficient memory 4207 in FIG. 43 and stored in the latch groups 4251 and 4252, respectively.

The boundary determination unit 4253 reads shape information one by one from the memory 4250 from the left side in the horizontal direction. If the data indicates the inside of the region, a control signal is generated such that the selector 4254 outputs the input from the latch group 4251. Similarly, a control signal is generated such that the selector 4255 outputs the input from the latch group 4252. If the data indicates the outside of the region, control is executed such that no selectors execute input.

Before the start of processing, the latch groups 4256 and 4257 are always cleared by 0. Shape information having a value of 0 indicates the outside of the region. Data are read out one by one in accordance with the clock. If the data indicates the inside of the region, the shape information and sub-band coefficient are sequentially stored in the latch groups 4256 and 4257. If the data indicates the outside of the region, no data is stored, and the latch position is moved to the left by one. When the output from the latch group 4251 indicates the outside of the region, the selectors 4254 and 4255 end the line processing.

Figure 42D:
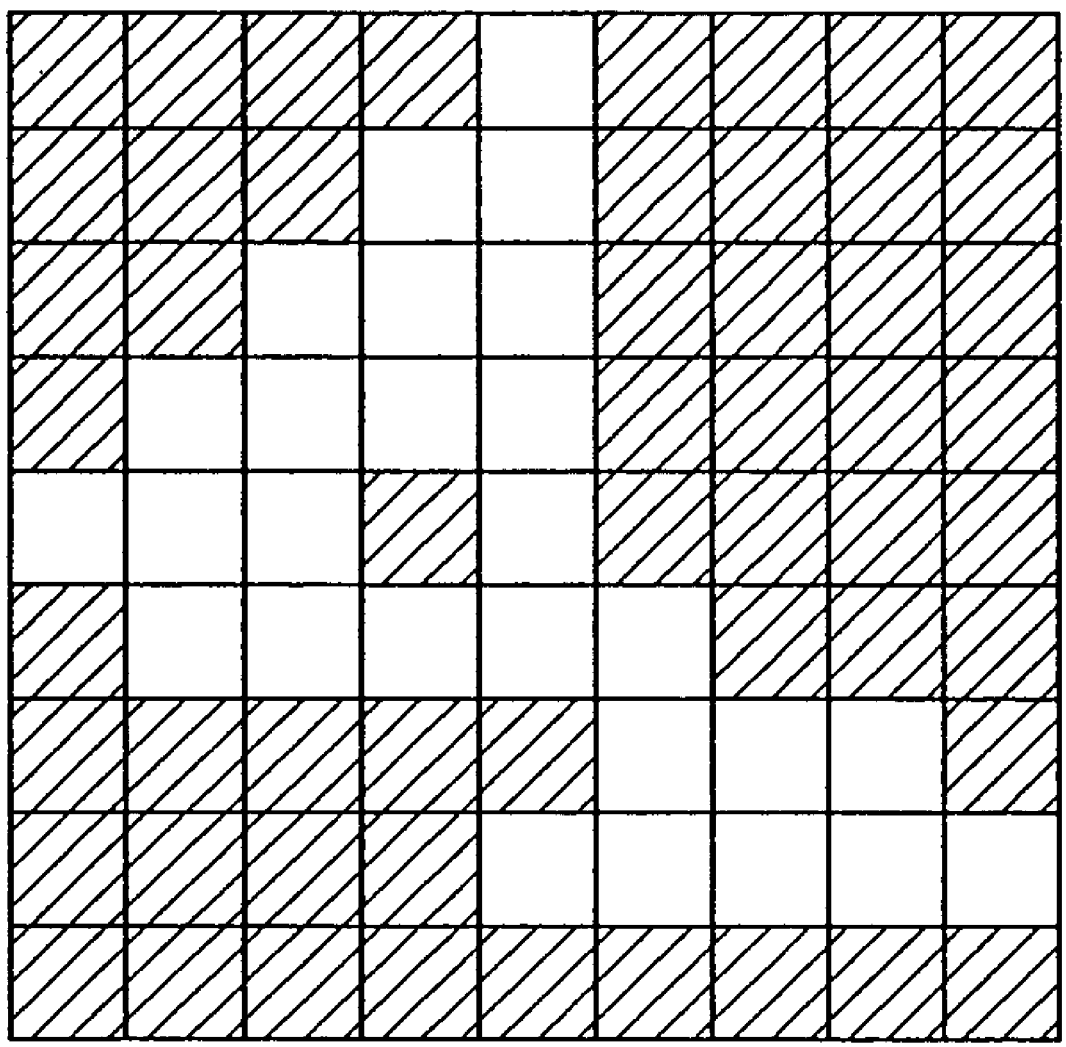
FIG. 42D is a view showing an example of coefficient values during expansion according to the embodiment of the present invention.

When processing of one line is ended, the pieces of shape information and sub-band coefficients are arranged in the original state in the horizontal direction. The shape information storage result is stored in the memory 4258, and the sub-band coefficient storage result is stored in the memory 4259. FIGS. 42A to 42D show these states. FIG. 42D shows shape information or sub-band coefficients stored in the memory 4258 or 4259 by executing the above processing for the data in FIG. 42C.

When processing of one block in the horizontal direction is ended, shape information and sub-band coefficients of one vertical line are input from the memories 4258 and 4259 and stored in the latch groups 4260 and 4261, respectively. The boundary determination unit 4262 reads shape information one by one from the upper side in the vertical direction. If the data indicates the inside of the region, a control signal is generated such that the selector 4263 outputs the input from the latch group 4261.

If the data indicates the outside of the region, control is executed such that no selector executes input. Before the start of processing, the latch group 4264 is always cleared by 0. Data are read out one by one in accordance with the clock. If the data indicates the inside of the region, the shape information and sub-band coefficient are sequentially stored in the latch group 4264. If the data indicates the outside of the region, no data is stored, and the latch position is moved to the left by one. When the output from the latch group 4260 indicates the outside of the region, the selector 4263 ends the line processing.

When processing of one line is ended, the pieces of shape information and sub-band coefficients are arranged in the original state even in the vertical direction. That is, the state returns to that in FIG. 42A. As a result, the sub-band coefficients are stored in the memory 4265.

The output from the memory 4265 is output to the inverse quantization unit 4209 in FIG. 43. Referring back to FIG. 43, the inverse quantization unit 4209 executes predetermined inverse quantization for the input value to reproduce the sub-band coefficient and inputs it to the inverse DWT unit 4210. The arrangement of the inverse DWT unit 4210 is the same as that shown in FIG. 10 of the second embodiment, and a description thereof will be omitted.

With the series of selection operations, encoded data encoded by integration by the DWT unit in consideration of the shape can be decoded. Hence, encoded data at a high encoding efficiency can be decoded without any degradation. The number of symbols is smaller than that when processing is executed for all sub-band coefficients. Hence, the processing speed can be increased. When the information amount is appropriately decreased by bit cutoff, high-speed processing can be executed.

10th Embodiment

Figure 46:
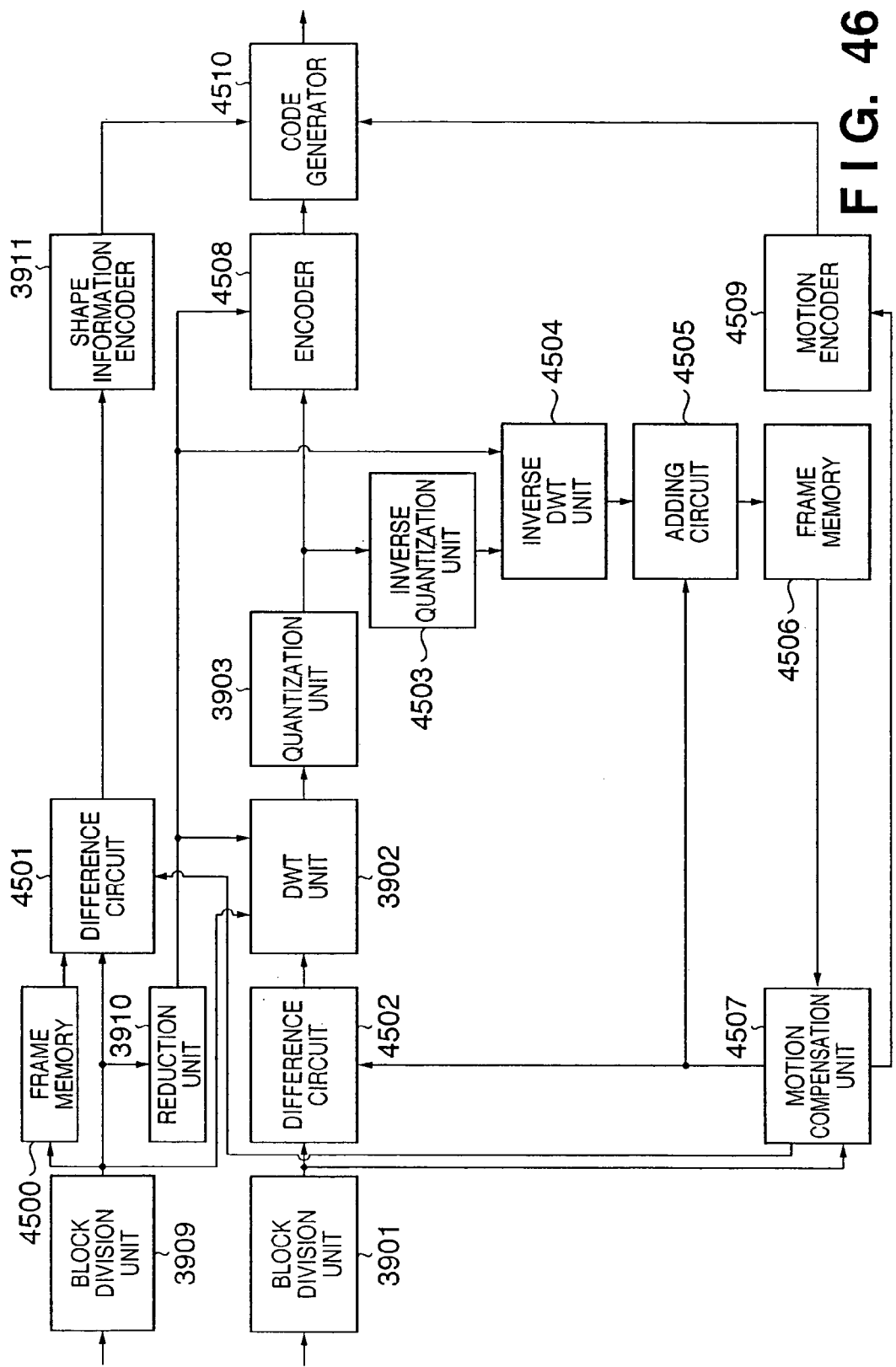
FIG. 46 is a block diagram showing an arrangement example of a moving image encoding apparatus according to the 10th embodiment of the present invention.

FIG. 46 is a block diagram showing the arrangement example of a moving image encoding apparatus according to the 10th embodiment of the present invention. The same reference numerals as in FIG. 39 of the eighth embodiment denote parts having the same functions in FIG. 46, and a description thereof will be omitted.

A frame memory 4500 stores shape information. A difference circuit 4501 obtains the difference between the shape information and its predictive data obtained by a motion vector obtained by a motion compensation unit 4507. A difference circuit 4502 obtains the difference between image data and its predictive data obtained by the motion vector obtained by the motion compensation unit 4507. An inverse quantization unit 4503 executes inverse quantization of a quantization unit 3903. An inverse DWT unit 4504 executes inverse transform of a DWT unit 3902. Inverse transform is executed by referring to shape information, like the DWT unit 3902.

The inverse DWT unit 4504 includes the blocks shown FIG. 10 and operates like the inverse DWT unit 4210 of the ninth embodiment. An adding circuit 4505 adds the result to the predictive data. A frame memory 4506 stores a decoded image for reference for motion compensation. The motion compensation unit 4507 executes motion prediction on the basis of the frame memory 4506 and the input image and calculates the motion vector and predictive data.

An encoder 4508 executes EBCOT encoding of the JPEG 2000 encoding method for each bit plane in consideration of the shape. A motion encoder 4509 encodes the motion vector and the like. A code generator 4510 generates a necessary header and forms encoded data on the basis of the outputs from a shape information encoder 3911, encoder 4508, and motion encoder 4509.

The moving image encoding operation of the moving image encoding apparatus with the above-described arrangement will be described below. In this embodiment, moving image data is input for each frame. Simultaneously, separately extracted shape information is input. Shape information may be extracted from the moving image data in the apparatus, as a matter of course.

As in the eighth embodiment, moving image data is input to a block division unit 3901, and shape information is input to a block division unit 3909. Each block division unit holds data of one frame, divides it into blocks, and outputs each block to the subsequent stage. The moving image data divided into blocks by the block division unit 3901 is input to the motion compensation unit 4507 and difference circuit 4502.

The motion compensation unit 4507 compares the received image data with the data of at least one decoded image stored in the frame memory 4506 and generates a motion vector to minimize the predictive error and its predictive data. The generated motion vector is encoded by the motion encoder 4509 and input to the code generator 4510.

The shape information divided into blocks by the block division unit 3909 is input to the difference circuit 4501, reduction unit 3910, frame memory 4500 and DWT unit 3902. The shape information stored in the frame memory 4500 is used for motion compensation of the shape information of other frames. On the basis of the motion vector calculated by the motion compensation unit 4507, the difference circuit 4501 obtains the predictive data of shape information from the encoded shape information stored in the frame memory 4500 and obtains the difference. The shape information encoder 3911 encodes the difference output from the difference circuit 4501 in accordance with shape encoding of the MPEG-4 encoding method and outputs it to the code generator 4510. The reduction unit 3910 reduces the received shape information in accordance with the application count in the DWT unit 3902.

The difference circuit 4502 subtracts the predictive data calculated by the motion compensation unit 4507. The DWT unit 3902 receives the shape information from the block division unit 3909 and the reduced shape information from the reduction unit 3910. The DWT unit 3902 receives, from the difference circuit 4502, pixel values in intra-encoding or a predictive error in motion compensation. The DWT unit 3902 executes DWT while executing interpolation and expansion with reference to the shape information, as in the eighth embodiment. The quantization unit 3903 executes quantization. The data is input to the encoder 4508 and inverse quantization unit 4503.

Like the encoder 9 of the first embodiment, the encoder 4508 interpolates 0 to the neighboring coefficients outside the region. FIG. 47 is a block diagram showing the detailed arrangement of the encoder 4508. The same reference numerals as in FIG. 41 of the eighth embodiment denote parts having the same functions in FIG. 47, and a description thereof will be omitted. A boundary determination unit 4520 determines boundaries. A selector 4521 selectively outputs 0 or the inputs from bit plane memories 152, 153, 154, and 155 in accordance with the contents of the boundary determination unit 4520. A reference sub-band memory 4522 stores coefficients to be referred to. Reference numeral 4523 denotes an entropy encoder.

Figure 49:
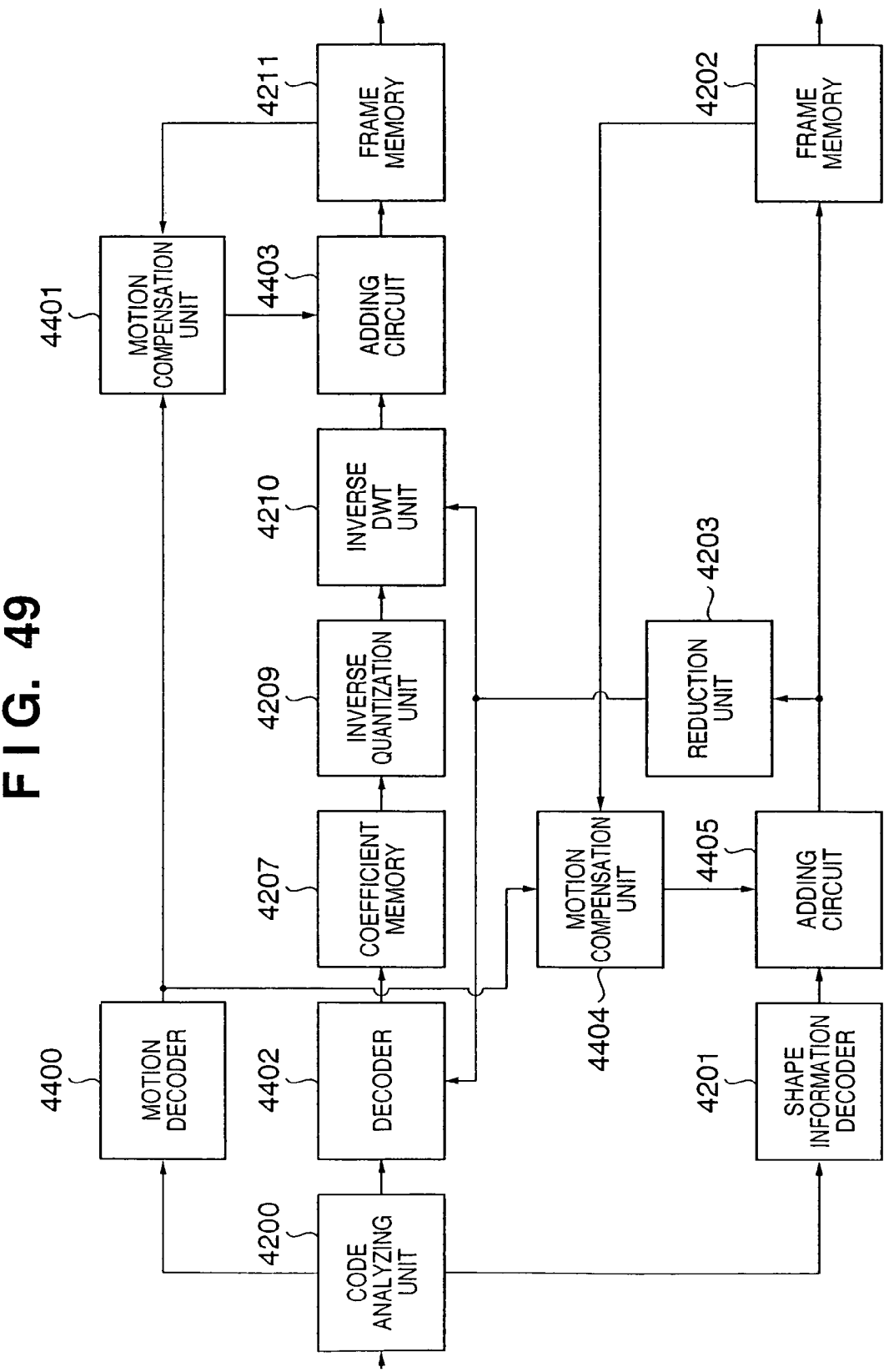
FIG. 49 is a block diagram showing an arrangement example of a moving image decoding apparatus according to the 11th embodiment of the present invention.

In the above arrangement, when the shape information reduced by the reduction unit 3910 is stored in a shape information memory 151, and the sub-band coefficients from the quantization unit 3903 in FIG. 49 are stored in the bit plane memories 152, 153, 154, and 155 for each bit plane, a clock generator 150 generates a clock so that the encoder 4508 starts arithmetic encoding from the upper bit plane. The boundary determination unit 4520 determines each pixel to be encoded is inside or outside the region.

When the bit to be encoded is in the region, the selector 4521 reads out the bits to be encoded from the bit plane memories 152, 153, 154, and 155 in accordance with the clock. By referring to shape information around the bits to be encoded, the selector 4521 appropriately reads out bits of the same level or encoded bits of a higher level from the bit plane memories 152, 153, 154, and 155 in correspondence with encoded coefficients in the region.

Figure 48:
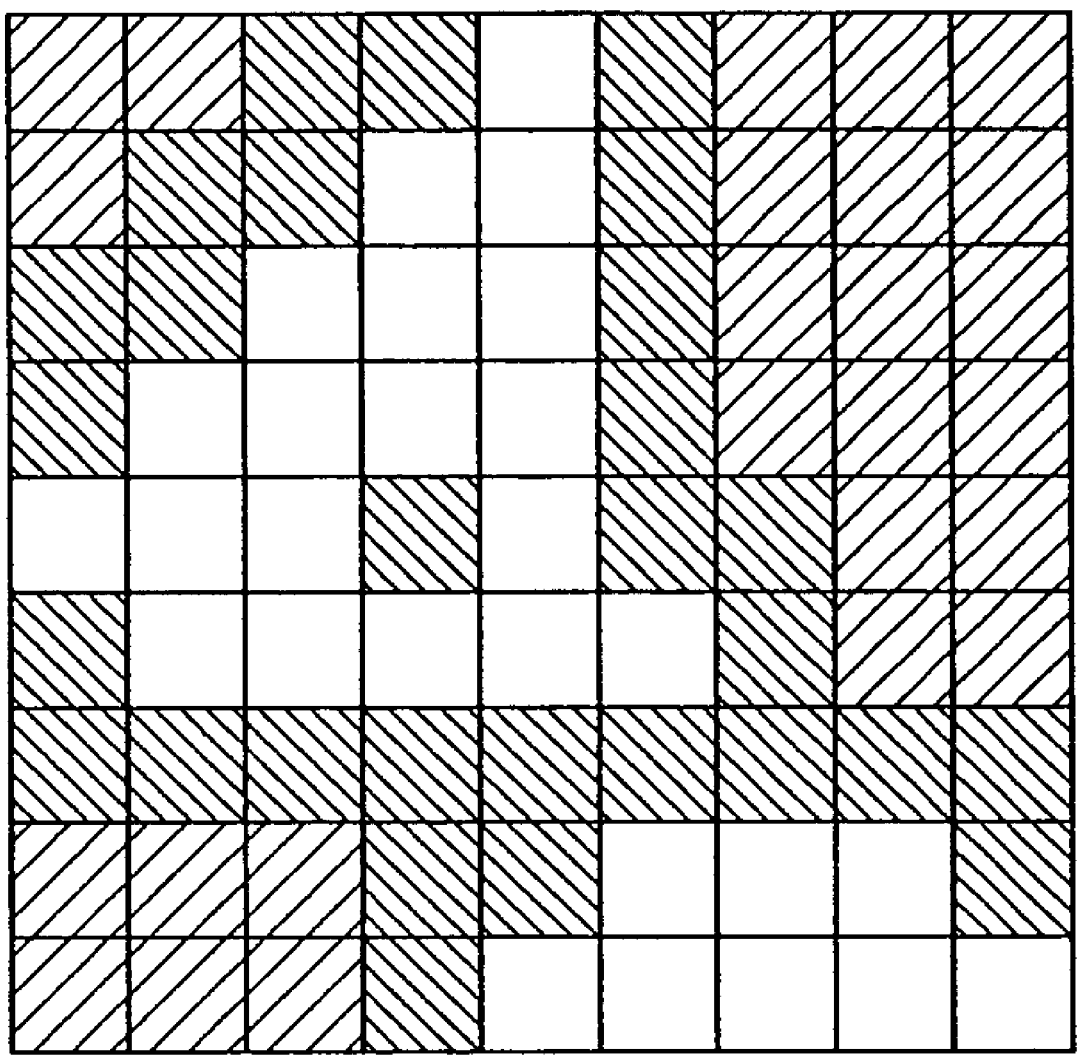
FIG. 48 is a view showing coefficient values interpolated with coefficients according to the embodiment of the present invention.

When a pixel value outside the region is to be referred to for shape information, 0 is selected as the reference value. The output from the selector 4521 is stored in the reference sub-band memory 4522. In this embodiment, 0 is selected for coefficients represented by black cells in FIG. 48 in correspondence with the shape information shown in FIG. 42A. The entropy encoder 4523 reads the bits to be encoded and the reference value from the reference sub-band memory 4522 and encodes the bits to be encoded. The encoding result is input to the code generator 4510 in FIG. 46.

Referring back to FIG. 46, the encoded data obtained by encoding by the encoder 4508 is input to the code generator 4510. The code generator 4510 adds header information and outputs it together with the encoded data related to the motion, the encoded data of shape information, and the encoded data of quantized coefficients.

Simultaneously, the output from the quantization unit 3903 is inverse quantized by the inverse quantization unit 4503, subjected to inverse DWT by the inverse DWT unit 4504, added with the predictive data by the adding circuit 4505, and stored in the frame memory 4506.

With the series of selection operations, image data corresponding to a shape can be encoded. When expansion is executed by the DWT unit in consideration of the shape while executing motion compensation to decrease the number of targets to be encoded in accordance with the shape information, the encoding efficiency can be increased. In addition, since the number of targets to be entropy-encoded decreases, high-speed processing can be implemented.

11th Embodiment

FIG. 49 is a block diagram showing the arrangement of a moving image decoding apparatus according to the 11th embodiment of the present invention. In this embodiment, an example will be described, in which encoded data generated in the 10th embodiment is decoded. However, the present invention is not limited to this.

The same reference numerals as in FIG. 43 of the ninth embodiment denote parts having the same functions in FIG. 49, and a description thereof will be omitted.

A motion decoder 4400 decodes a motion vector. A motion compensation unit 4401 calculate the predictive data of image data on the basis of the motion vector. A decoder 4402 decodes each bit plane in accordance with EBCOT encoding of the JPEG 2000 encoding method. An adding circuit 4403 adds the predictive data. A motion compensation unit 4404 calculates the predictive data of shape information. An adding circuit 4405 adds the predictive data.

The moving image decoding operation of the moving image decoding apparatus with the above arrangement will be described below. In this embodiment, encoded data of moving image data is input for each frame.

As in the ninth embodiment, the input encoded data is input to a code analyzing unit 4200. The code analyzing unit 4200 analyzes the added header to grasp the encoding characteristic and initializes subsequent units. The code analyzing unit 4200 also separates, from the received encoded data, encoded data related to the motion, encoded data related to shape information, and encoded data related to image data and inputs them to the motion decoder 4400, shape information decoder 4201, and decoder 4402, respectively.

The motion decoder 4400 decodes the information such as a motion vector related to the motion and inputs it to the motion compensation unit 4401 and motion compensation unit 4404. The motion compensation unit 4401 generates predictive data from a frame memory 4211 which stores the decoded image in accordance with the motion vector and outputs the predictive data to the adding circuit 4403. Similarly, the motion compensation unit 4404 generates predictive data of shape information from a frame memory 4202 which stores the decoded shape information in accordance with the motion vector and outputs the predictive data to the adding circuit 4405.

As in the ninth embodiment, the shape information decoder 4201 executes decoding in accordance with shape encoding of the MPEG-4 encoding method and inputs the decoded data to the adding circuit 4405. The adding circuit 4405 adds the data to the predictive data supplied from the motion compensation unit 4404 to play back the shape information. The shape information is stored in the frame memory 4202 and also input to a reduction unit 4203. The reduction unit 4203 generates and holds a reduced image of the shape information. The reduced shape information is input to the decoder 4402 and inverse DWT unit 4210.

The decoder 4402 having the arrangement shown in FIG. 44 decodes sub-band coefficients. As a difference from FIG. 44, the sub-band coefficients to be decoded are integrated so no multiple coefficients are decoded. The decoding result is input to a coefficient memory 4207 in FIG. 49. As in the ninth embodiment, an inverse quantization unit 4209 executes predetermined inverse quantization. The inverse DWT unit 4210 plays back a predictive error or pixel value. The output from the inverse DWT unit 4210 is input to the adding circuit 4403 and added to the predictive data supplied from the motion compensation unit 4401. A decoded image is obtained and stored in the frame memory 4211. The decoded image is appropriately read out from the frame memory 4211, and the shape information is appropriately read out from the frame memory 4202.

With the series of selection operations, encoded data encoded by the DWT unit in consideration of the shape can be decoded. Hence, the encoded data can be decoded without any degradation. The number of symbols is smaller than that when processing is executed for all sub-band coefficients. Hence, the processing speed can be increased. When motion compensation is executed, the encoding efficiency can be increased.

12th Embodiment

A moving image encoding apparatus according to the 12th embodiment will be described next. The arrangement of the moving image encoding apparatus according to this embodiment is the same as that shown in FIG. 13. Hence, a description of the moving image encoding apparatus will be omitted.

An operation of a CPU 300 to cause moving image encoding software 502 to encode image data according to this embodiment will be described next with reference to the flowchart shown in FIG. 50.

In step S5001, a header necessary for the Motion JPEG 2000 encoding method is generated and stored in a code area 507 on a memory 301. When encoded data is stored in the code area 507, communication software sends the encoded data to a communication line 309 through a communication interface 308. After the data is sent, the region of the code area 507 is cleared. The transmission of encoded data in the code area 507 will not particularly be mentioned below.

In step S5002, the end of encoding processing is determined. If the end of encoding processing is input from a terminal 303, all processes are ended. Otherwise, the flow advances to step S5003. In step S5003, image data is read from an image area 506 on the memory 301 in synchronism with image input software 505. In step S5004, shape information is read from the image area 506 on the memory 301 in synchronism with object extraction software 503.

In step S5005, it is determined whether processing is ended for all blocks contained in one frame. If YES in step S505, the flow returns to step S5002 to process the next frame. Otherwise, the flow advances to step S5006. In step S5006, one block is selected from the input shape information and encoded in accordance with shape encoding of the MPEG-4 encoding method. The encoded data is stored in the code area 507 on the memory 301. In step S5007, it is determined whether encoding of all frequency bands is ended. If YES in step S5007, the flow advances to step S5012. Otherwise, the flow advances to step S5008 to encode the frequency band.

In step S5008, one block is selected from the input image data and subjected to shape adaptive DWT. The transform coefficient is stored in a working area 508 on the memory 301.

The shape adaptive DWT processing in step S5008 is the same as in the fourth embodiment described with reference to FIG. 16, and a description thereof will be omitted here. If it is determined in step S53 in FIG. 16 that the processing is executed a desired application count, the flow advances to step S5009 in FIG. 50.

Figure 50:
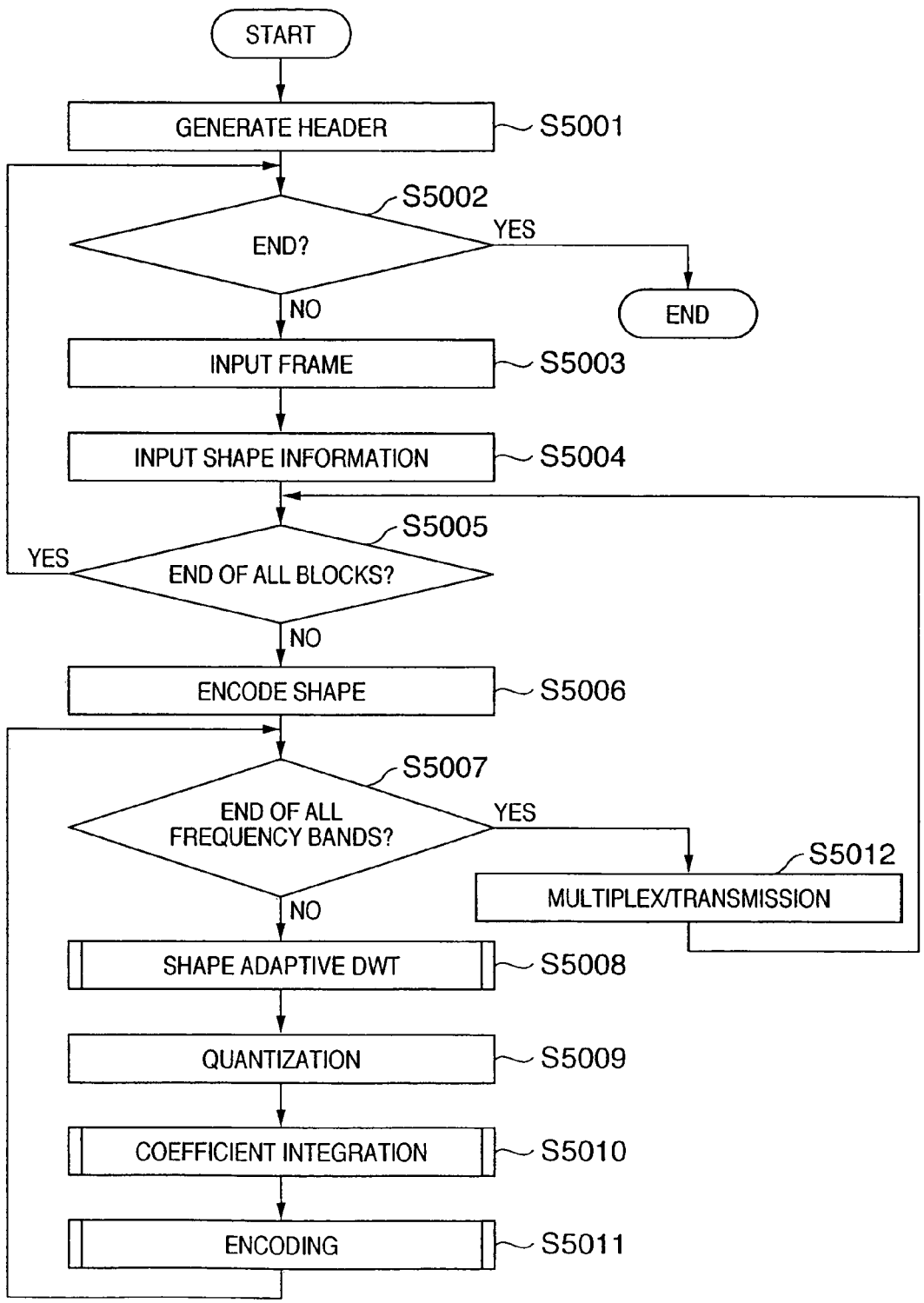
FIG. 50 is a flowchart showing an example of a moving image encoding operation according to the 12th embodiment of the present invention.
Figure 51:
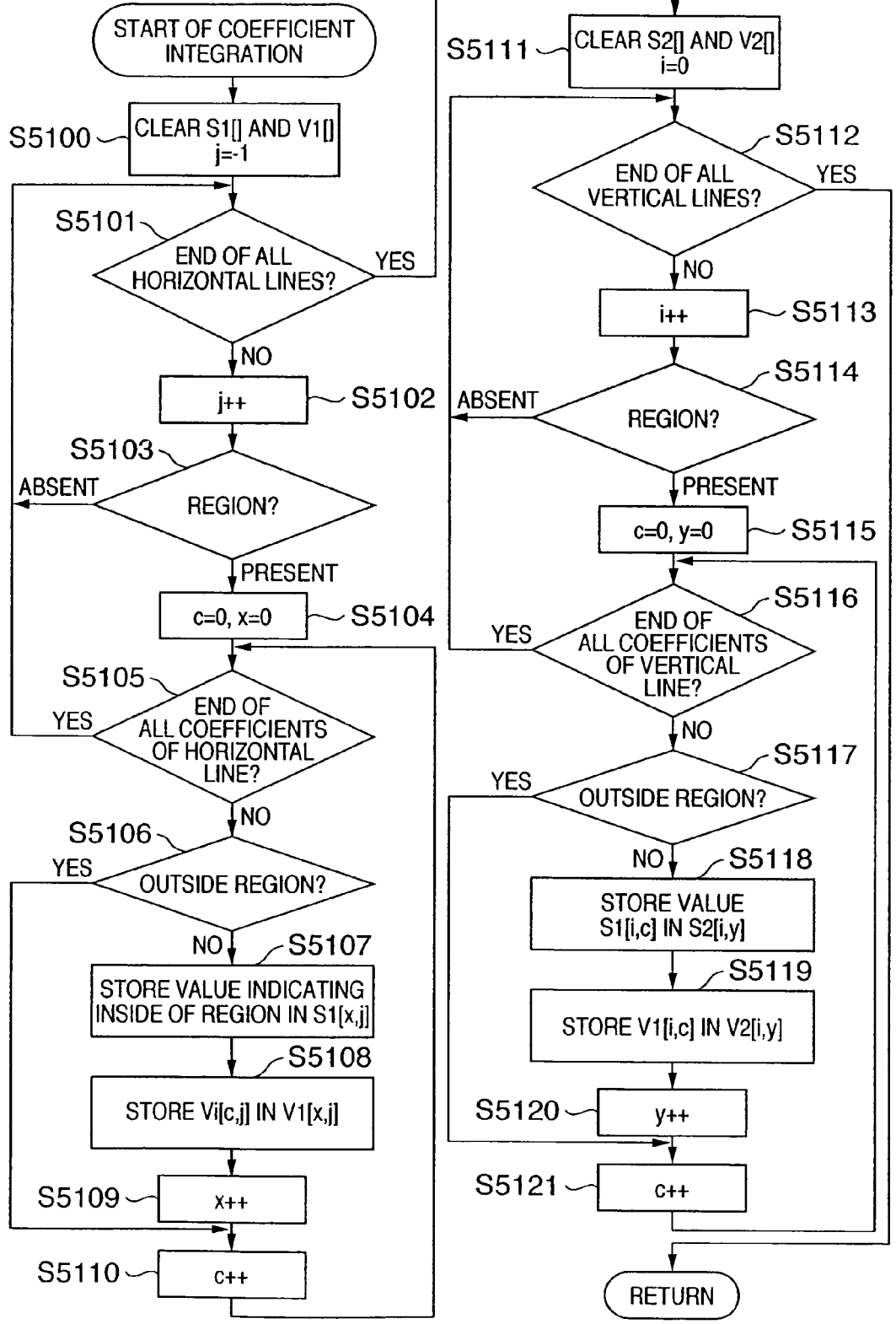
FIG. 51 is a flowchart showing an example of a coefficient integration processing operation according to the 12th embodiment of the present invention.

In step S5009 in FIG. 50, the sub-band coefficients of the frequency bands stored in the image area on the memory 301 are quantized. The result is stored in the working area 508. In step S5010, the quantization values stored in the working area 508 in step S5009 are integrated by referring to the shape information stored in the image area 506 in step S5007. The coefficient integration processing will be described with reference to the detailed flowchart in FIG. 51.

In step S5100, an area S5001 for shape information and an area V1 for sub-band coefficients in the working area 508 on the memory 301 are cleared by 0. A counter value j is set to −1. In step S5101, it is determined whether integration processing is ended for all horizontal lines of the frequency bands in the block. If NO in step S5101, the flow advances to step S5102. If YES in step S5101, the flow advances to step S5111.

In step S5102, the counter value j is incremented by one. In step S5103, it is determined by using the shape information stored in the image area 506 whether all sub-band coefficients of the horizontal line to be processed are outside the region. If all sub-band coefficients are outside the region, i.e., if no region is present in the line, the flow returns to step S5101 to process the next horizontal line. Otherwise, counter values c and x are set to 0 in step S5104.

In step S5105, it is determined whether processing of all sub-band coefficients of the horizontal line to be processed is ended. If YES in step S5105, the flow returns to step S5101 to process the next horizontal line. Otherwise, the flow advances to step S5106. In step S5106, it is determined by referring to shape information corresponding to the same position of the same frequency band whether a quantization value of interest is outside the region. If NO in step S5106, the flow advances to step S5107. Otherwise, the flow advances to step S5110.

In step S5107, for the shape information at the same position, a value representing the inside of the region is stored in an area S1[x,j] of the working area 508 on the memory 301. In step S5108, a sub-band coefficient V1[c,j] at the same position stored in the image area 506 is stored in V1[x,j] of the working area 508. In step S5109, the counter value x is incremented by one.

In step S5110, the counter value c is incremented by one. The flow returns to step S5105 to process the next sub-band coefficient. If it is determined in step S5101 that the processing in steps S5102 to S5110 is ended for all horizontal lines, the flow advances to step S5111. If NO in step S5101, the processing from step S5102 is repeated. Integration processing in the vertical direction is executed from step S5111.

In step S5111, an area S2 for shape information and an area V2 for sub-band coefficients in the working area 508 on the memory 301 are cleared by 0. A counter value i is set to 0. In step S5112, it is determined whether integration processing is ended for all vertical lines in the block. If NO in step S5112, the flow advances to step S5113. If YES in step S5112, the flow returns to step S5011 in FIG. 50. In step S5113, the counter value i is incremented by one. In step S5114, it is determined by using the shape information stored in the image area 506 whether all sub-band coefficients of the vertical line to be processed are outside the region. If all sub-band coefficients are outside the region, i.e., if no region is present in the line, the flow returns to step S5112 to process the next vertical line.

In step S5115, the counter values c and y are set to 0. In step S5116, it is determined whether processing of all sub-band coefficients of the vertical line to be processed is ended. If YES in step S5116, the flow returns to step S5112 to process the next vertical line. Otherwise, the flow advances to step S5117. In step S5117, it is determined by referring to shape information S1[i,c] corresponding to the same position of the same frequency band whether a sub-band coefficient of interest is outside the region. If NO in step S5117, the flow advances to step S5118. Otherwise, the flow advances to step S5121.

In step S5118, the shape information S1[i,c] is stored in an area S2[i,y] of the working area 508 on the memory 301. In step S5119, a sub-band coefficient Vi[i,c] at the same position stored in the working area 508 is stored in V2[i,y] of the working area 508. In step S5120, the counter value y is incremented by one. In step S5121, the counter value c is incremented by one. The flow returns to step S5116 to process the next sub-band coefficient.

If it is determined in step S5112 that the processing in steps S5113 to S5121 is ended for all vertical lines, the coefficient integration processing is ended. The flow returns to step S5011 in FIG. 50. If NO in step S5112, the processing from step S5113 is repeated.

Referring back to FIG. 50, in step S5011, the quantization value V2 integrated and stored in the working area 508 in step S5010 is encoded by referring to the encoded shape information S2.

Figure 52:
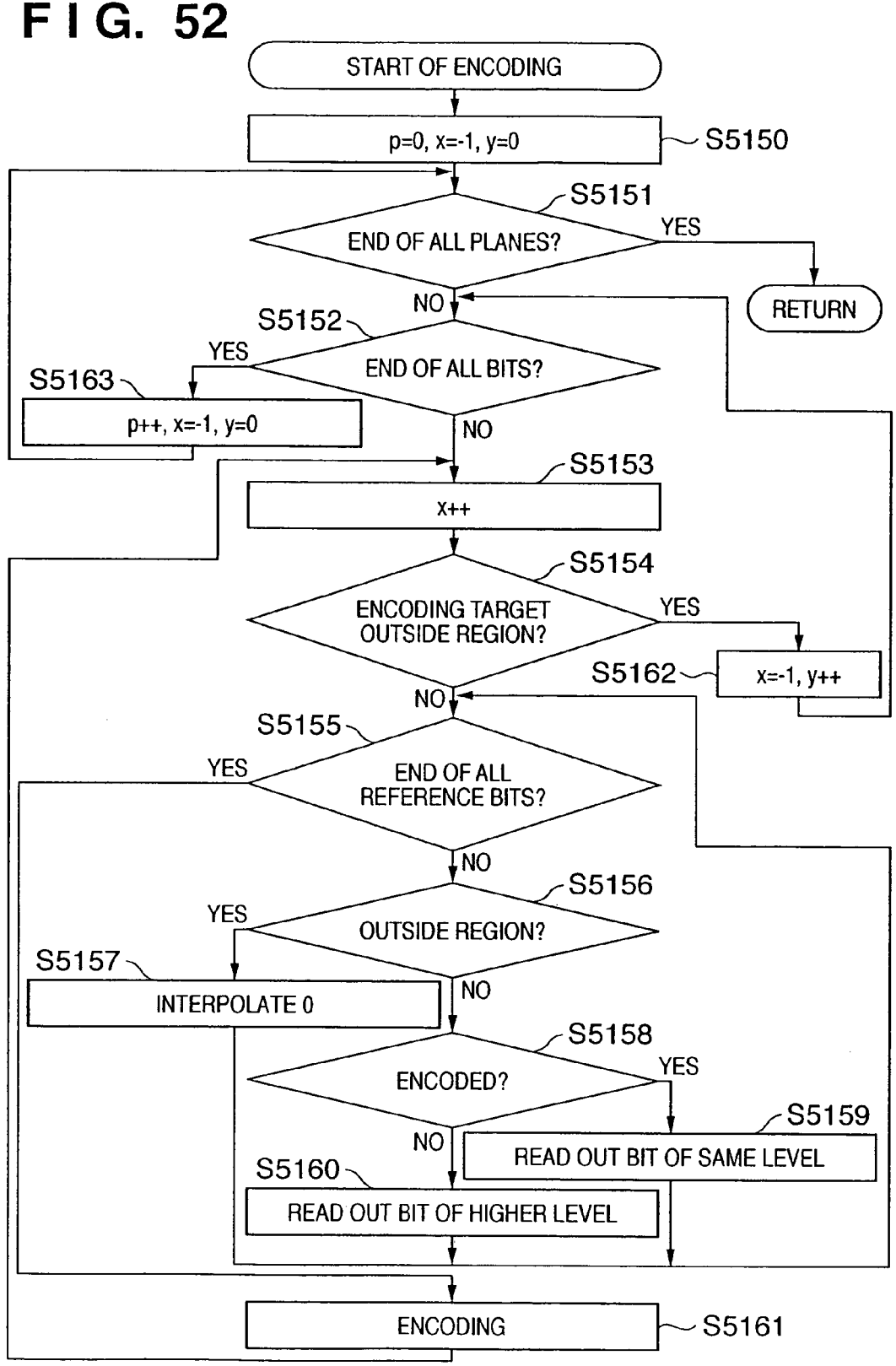
FIG. 52 is a flowchart showing an example of an encoding processing operation according to the 12th embodiment of the present invention.

FIG. 52 is a detailed flowchart of the encoding processing. In step S5150, a counter value p of a bit plane is set to 0, the counter value x in the horizontal direction is set to −1, and the counter value y in the vertical direction is set to 0. In step S5151, it is determined by referring to the counter value p to be processed whether encoding processing of all bit planes to be encoded is ended. If YES in step S5151, the flow returns to step S5007 in FIG. 50. Otherwise, the flow advances to step S5152.

In step S5152, it is determined whether encoding processing of all bits of the pth bit plane from the upper bit of the sub-band coefficients to be encoded is ended. If YES in step S5152, the flow advances to step S5163. Otherwise, the flow advances to step S5153. In step S5153, the counter value x is incremented by one. In step S5154, it is determined by referring to the integrated shape information S2[x,y] (x and y are the positions of sub-band coefficients in the block) whether the sub-band coefficient V2[x,y] containing the bit to be encoded is outside the region. If YES in step S5154, the flow advances to step S5162. Otherwise, the flow advances to step S5155.

In step S5155, it is determined whether all reference bits necessary for encoding the bits to be encoded are determined. If NO in step S5155, the flow advances to step S5156 to determine the next reference bit in the raster order. If YES is step S5155, the flow advances to step S5161. In step S5156, it is determined by referring to the integrated shape information S2[x+i,y+j] (i=−1 to 1, j=−1 to 1) whether the sub-band coefficient containing the target bit is outside the region. If YES in step S5156, the flow advances to step S5157. Otherwise, the flow advances to step S5158.

In step S5157, 0 is interpolated to the target reference bit. The flow returns to step S5155 to determine the next reference bit value. In step S5158, it is determined whether the bit of the sub-band coefficient containing the target reference bit is encoded. If YES in step S5158, the flow advances to step S5159. Otherwise, the flow advances to step S5160.

In step S5159, an encoded bit of the same level is read out from the sub-band coefficient V2[x+i,y+j] stored in the working area 508 on the memory 301. The flow returns to step S5155 to determine the next reference bit value. In step S5160, an encoded bit of a higher level is read out from the sub-band coefficient V2[x+i,y+j] stored in the working area 508 on the memory 301. The flow returns to step S5155 to determine the next reference bit value.

If it is determined in step S5155 that all reference bits are determined, in step S5161, entropy encoding is executed, and the generated codes are stored in the code area 507 on the memory 301. The flow returns to step S5153 to process the next bit. If it is determined in step S5154 that the sub-band coefficient is outside the region, no bit to be encoded remains in the horizontal line. Hence, in step S5162, the counter value x is set to −1, and the counter value y is incremented by one to process the next line.

If it is determined in step S5152 that encoding of all bits is ended, in step S5163, the counter value p is incremented by one, the counter value x is set to −1, and the counter value y is set to 0 to encode the next bit plane. If it is determined in step S5151 that processing of all bit planes is ended, the flow returns to step S5007 in FIG. 50. If it is determined in step S5007 that processing of all frequency bands is ended, in step S5012, the header data stored on the memory 301 in step S5001, the encoded data of shape information stored in step S5006, and the encoded data of quantization values encoded in step S5011 are multiplexed and stored in the code area 507 on the memory 301. The data in the working area 508 and image area 506 are cleared. The flow advances to step S5005 to process the next block. When the terminal 303 instructs the end of processing, all software programs are stopped.

With the series of selection operations, image data corresponding to a shape can be encoded. When expansion is executed by DWT in consideration of the shape, and sub-band coefficients in the region are integrated by coefficient integration, the encoding efficiency can be increased by using the correlation between the sub-band coefficients. In this embodiment, the JPEG 2000 encoding method is employed as the image encoding method. However, any other encoding method, and for example, a still image encoding method such as Still Texture Object encoding of MPEG-4 may be used. The encoding efficiency can also be increased by executing motion compensation encoding.

The MPEG-4 encoding method is used to encode shape information. However, any other encoding method such as JBIG or MMR may be used. In this embodiment, the communication software is activated, and encoded data in the code area 507 is transmitted to the communication line 309 through the communication interface 308. However, the encoded data may be stored in the storage device 305.

Figure 53:
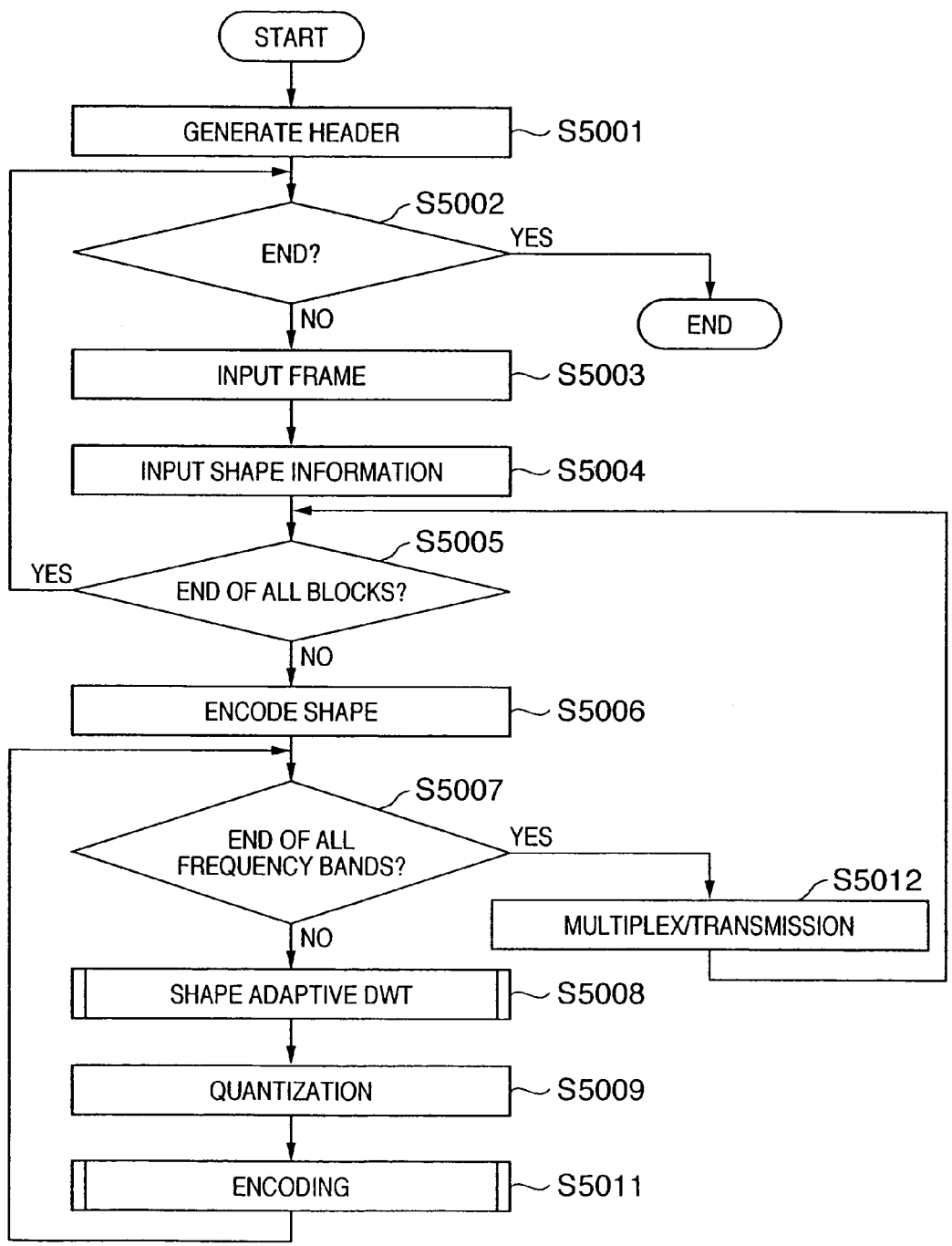
FIG. 53 is a flowchart showing an example of a moving image encoding operation according to the 12th embodiment of the present invention.

The function of each unit or those of all units of this embodiment may be implemented by hardware. FIG. 53 is a flowchart showing another operation of the CPU 300 to cause the moving image encoding software to execute encoding. FIG. 53 is different from FIG. 50 in that coefficient integration in step S5010 is omitted. Since the number of reference bits outside the region increases, correlation in encoding becomes low. However, since the integration processing can be omitted, the processing speed can be increased.

13th Embodiment

In this embodiment, the decoding operation of the encoded data generated in the 12th embodiment will be described with reference to the arrangement shown in FIG. 13. An example will be described, in which encoded data stored in a storage device 305 is decoded and displayed on a monitor 307.

In this embodiment, the encoded data of moving image data is input for each frame. FIG. 19 shows the use and storage states of a memory 301. As in the 12th embodiment, the memory 301 has an OS 501, image area 506, code area 507, and working area 508. In addition, moving image decoding software 601 to decode a moving image, communication software 504 to communicate, and image display software 602 to display a moving image on the monitor 307 are stored.

Figure 54:
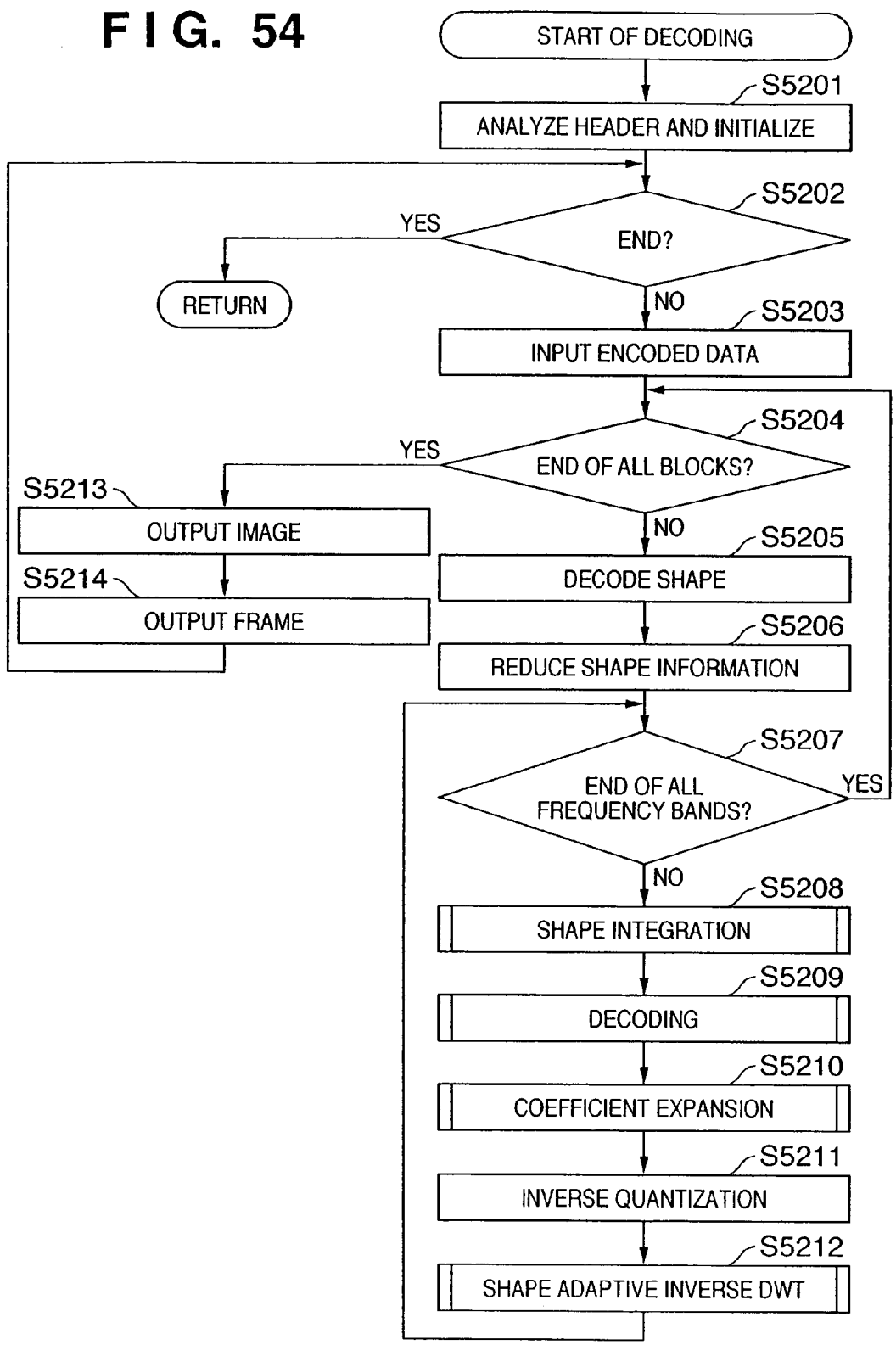
FIG. 54 is a flowchart showing an example of a moving image decoding operation according to the 13th embodiment of the present invention.

As in the 12th embodiment, the units are initialized, and software stored in a storage device 304 is activated. An operation of a CPU 300 to cause the moving image decoding software 601 to execute decoding will be described with reference to the flowchart shown in FIG. 54.

In step S5201, the moving image decoding software 601 inputs the header of the encoded data of moving image data from the storage device 305, stores it in the code area 507 on the memory 301, grasps the encoding characteristic, and stores initial values in the working area 508 on the memory 301.

In step S5202, the end is determined. If all encoded data in the storage device 305 are decoded, or an interrupt instruction is issued from a terminal 303, all memory areas are cleared, and the software operation is ended. Otherwise, the flow advances to step S5203 to process the next frame.

In step S5203, the encoded data of moving image data is input from the storage device 305 for each frame and stored in the code area 507 on the memory 301. In step S5204, it is determined whether decoding for all blocks in the frame is ended. If YES in step S5204, the flow advances to step S5213. Otherwise, the flow advances to step S5205.

In step S5205, encoded data related to shape information is read out from the code area 507 and decoded. In this embodiment, decoding is performed in accordance with shape encoding of the MPEG-4 encoding method to generate shape information. The shape information is stored in the image area 506. The generated shape information is information representing the inside or outside of a region and containing 1-bit data per pixel. In step S5206, a DWT application count n for the shape information in the image area 506 is read out from the analysis result in step S5201, and reduced images of n steps are generated and stored in the image area 506.

In step S5207, it is determined whether decoding of all frequency bands is ended. If YES in step S5207, the flow returns to step S5204 to decode the next block. Otherwise, the flow advances to step S5208. In step S5208, the reduced shape information which is generated in step S5206 and adaptive to the frequency band to be decoded is read out from the image area 506 on the memory 301, and shape integration processing is executed. In the shape integration processing, only shape information processing in the coefficient integration in FIG. 51 of the 12th embodiment is executed, thereby storing the shape information in integrated shape information S2 in the working area 508.

Figure 55:
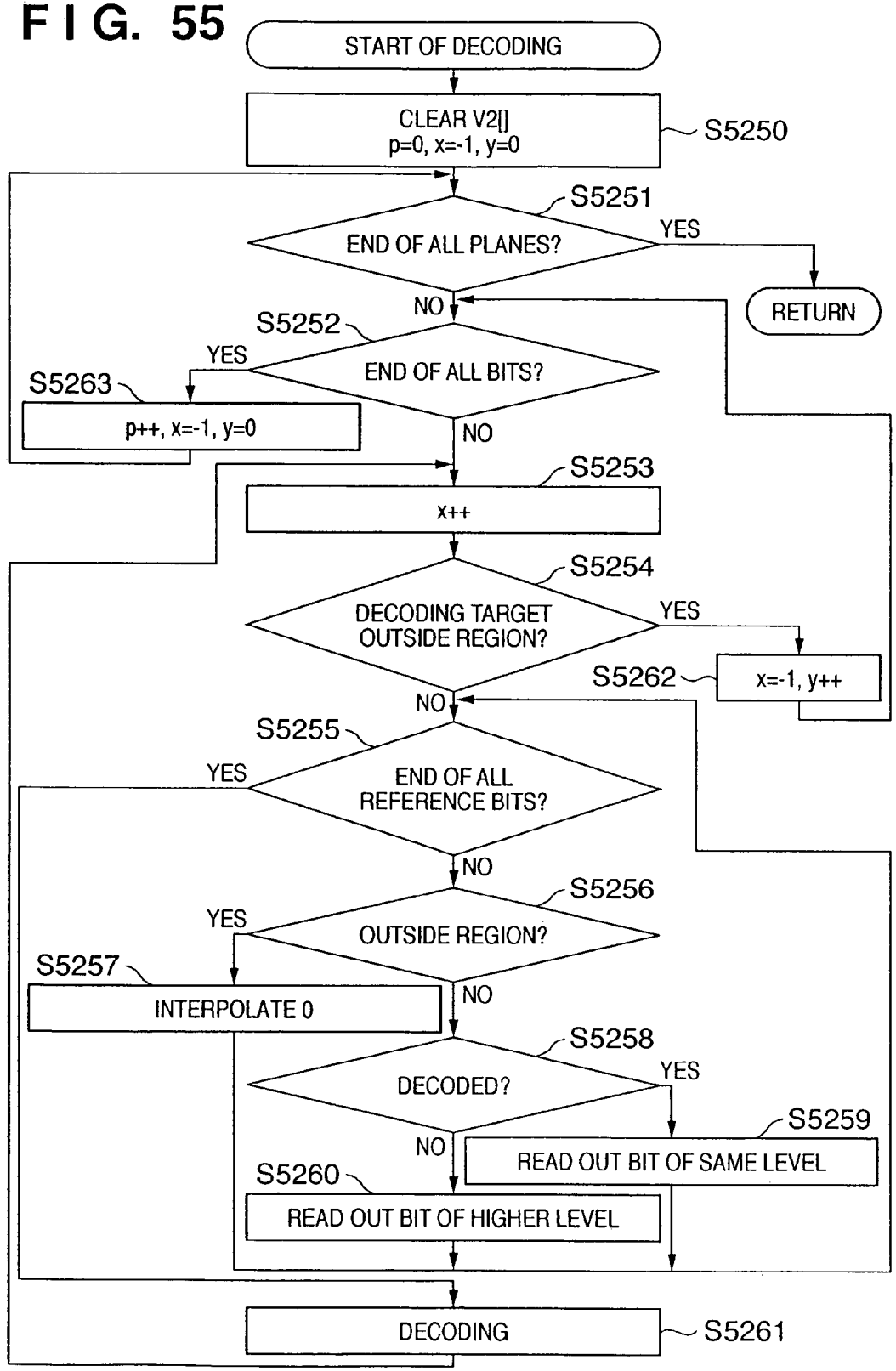
FIG. 55 is a flowchart showing an example of a decoding processing operation according to the 13th embodiment of the present invention.

In step S5209, encoded data related to image data is read out from the code area 507 and decoded to obtain quantized sub-band coefficients. They are stored in the working area 508. FIG. 55 is a detailed flowchart of decoding processing. In step S5250, an area V2 for sub-band coefficients in the working area 508 on the memory 301 is cleared by 0. A counter value p of the bit plane is set to 0. A counter value x in the horizontal direction is set to −1. A counter value y in the vertical direction is set to 0.

In step S5251, it is determined by referring to the counter value p to be processed whether decoding processing of all bit planes to be decoded is ended. If YES in step S5251, the flow returns to step S5210 in FIG. 54 to execute coefficient expansion processing. Otherwise, the flow advances to step S5252. In step S5252, it is determined whether decoding processing of all bits of the pth bit plane from the upper bit of the sub-band coefficients to be decoded is ended. If YES in step S5252, the flow advances to step S5263. Otherwise, the flow advances to step S5253.

In step S5253, the counter value x is incremented by one. In step S5254, it is determined by referring to the shape information S2[x,y] (x and y are the positions of sub-band coefficients in the block) whether the sub-band coefficient V2[x,y] containing the bit to be decoded is outside the region. If YES in step S5254, the flow advances to step S5262. Otherwise, the flow advances to step S5255. In step S5255, it is determined whether all reference bits necessary for decoding the bits to be decoded are determined. If NO in step S5255, the flow advances to step S5256 to determine the next reference bit in the raster order. If YES is step S5255, the flow advances to step S5261.

In step S5256, it is determined by referring to the shape information S2[x+i,y+j] (i=−1 to 1, j=−1 to 1) whether the sub-band coefficient containing the target reference bit is outside the region. If YES in step S5256, the flow advances to step S5257. Otherwise, the flow advances to step S5258. In step S5257, 0 is interpolated to the target reference bit. The flow returns to step S5255 to determine the next reference bit value.

In step S5258, it is determined whether the bit of the sub-band coefficient containing the target reference bit is decoded. If YES in step S5258, the flow advances to step S5259. Otherwise, the flow advances to step S5260. In step S5259, a decoded bit of the same level is read out from the sub-band coefficient V2[x+i,y+j] stored in the working area 508 on the memory 301. The flow returns to step S5255 to determine the next reference bit value.

In step S5260, a decoded bit of a higher level is read out from the sub-band coefficient V2[x+i,y+j] stored in the working area 508 on the memory 301. The flow returns to step S5255 to determine the next reference bit value. If it is determined in step S5255 that all reference bits are determined, in step S5261, entropy decoding is executed, and the generated bits are stored in corresponding bits of the sub-band coefficient V2[x+i,y+j] in the working area 508 on the memory 301. The flow returns to step S5253 to process the next bit.

If it is determined in step S5254 that the sub-band coefficient is outside the region, no bit to be decoded remains in the horizontal line. Hence, in step S5262, the counter value x is set to −1, and the counter value y is incremented by one to process the next line. If it is determined in step S5252 that decoding of all bits is ended, in step S5263, the counter value p is incremented by one, the counter value x is set to −1, and the counter value y is set to 0 to decode the next bit plane.

Referring back to FIG. 54, the sub-band coefficient generated by the decoding processing in step S5209 is stored in the area V2 of the working area 508, and the integrated shape information is stored in the area S2. The flow advances to step S5210. In step S5210, coefficient expansion is executed.

Figure 56:
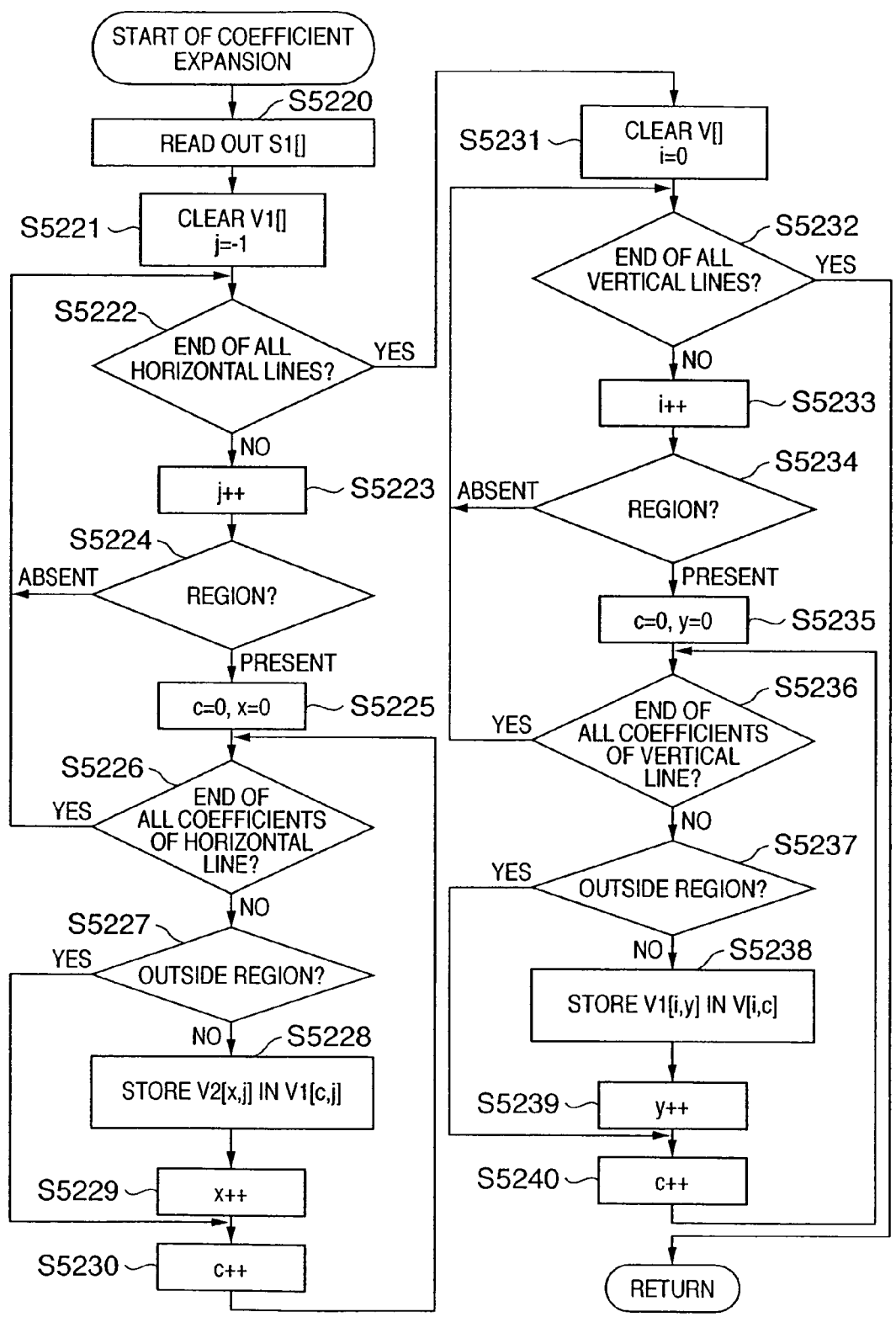
FIG. 56 is a flowchart showing an example of a coefficient expansion processing operation according to the 13th embodiment of the present invention.

Coefficient expansion processing will be described with reference to the detailed flowchart shown in FIG. 56.

In step S5220, reduced shape information adaptive to a corresponding frequency band is stored in an area S1 for shape information in the working area 508 on the memory 301. In step S5221, an area V1 for sub-band coefficients is cleared by 0. A counter value j is set to −1. In step S5222, it is determined whether expansion processing is ended for all horizontal lines of the frequency bands in the block. If NO in step S5222, the flow advances to step S5223. If YES in step S5222, the flow advances to step S5231.

In step S5223, the counter value j is incremented by one. In step S5224, it is determined by using the shape information stored in the image area 506 whether all sub-band coefficients of the horizontal line to be processed are outside the region. If all sub-band coefficients are outside the region, i.e., if no region is present in the line, the flow returns to step S5222 to process the next horizontal line. In step S5225, the counter values c and x are set to 0.

In step S5226, it is determined whether processing of all sub-band coefficients of the horizontal line to be processed is ended. If YES in step S5226, the flow returns to step S5222 to process the next horizontal line. Otherwise, the flow advances to step S5227. In step S5227, it is determined by referring to shape information S1[i,c] corresponding to the same position of the same frequency band whether a quantization value of interest is outside the region. If NO in step S5227, the flow advances to step S5228. Otherwise, the flow advances to step S5230.

In step S5228, the sub-band coefficient V2[x,j] stored in the working area 508 is stored in V1[c,j] of the working area 508. In step S5229, the counter value x is incremented by one.

In step S5230, the counter value c is incremented by one. The flow returns to step S5226 to process the next sub-band coefficient. If it is determined in step S5222 that the processing in steps S5223 to S5230 is ended for all horizontal lines, the flow advances to step S5231. If NO in step S5222, the processing from step S5223 is repeated. Expansion processing in the vertical direction is executed from step S5231.

In step S5231, an area V for sub-band coefficients in the working area 508 on the memory 301 is cleared by 0. The counter value i is set to 0. In step S5232, it is determined whether expansion processing is ended for all vertical lines in the block. If NO in step S5232, the flow advances to step S5233. If YES in step S5232, the flow returns to step S5211 in FIG. 54.

In step S5233, the counter value i is incremented by one. In step S5234, it is determined by using the shape information stored in the working area 508 whether all sub-band coefficients of the vertical line to be processed are outside the region. If all sub-band coefficients are outside the region, i.e., if no region is present in the line, the flow returns to step S5232 to process the next vertical line. Otherwise, the counter values c and y are set to 0 in step S5235.

In step S5236, it is determined whether processing of all sub-band coefficients of the vertical line to be processed is ended. If YES in step S5236, the flow returns to step S5232 to process the next vertical line. Otherwise, the flow advances to step S5237.

In step S5237, it is determined by referring to shape information S1[i,c] corresponding to the same position of the same frequency band whether a quantization value of interest is outside the region. If NO in step S5237, the flow advances to step S5238. Otherwise, the flow advances to step S5240. In step S5238, the sub-band coefficient V1[i,y] at the same position stored in the working area 508 is stored in V[i,c] of the working area 508.

In step S5239, the counter value y is incremented by one. In step S5240, the counter value c is incremented by one. The flow returns to step S5236 to process the next sub-band coefficient. If it is determined in step S5232 that the processing in steps S5233 to S5240 is ended for all vertical lines, the coefficient expansion processing is ended. The flow returns to step S5211 in FIG. 54. If NO in step S5232, the processing from step S5232 is repeated.

Referring back to FIG. 54, the sub-band coefficient expanded in step S5210 is stored in the area V of the working area 508. In step S5211, the quantized sub-band coefficient in the working area 508 is read and subjected to inverse quantization to reproduce the sub-band coefficient. The sub-band coefficient is returns to the same area of the working area 508.

In step S5212, the reproduced sub-band coefficients in the working area 508 are read and subjected to inverse DWT adaptive to the shape information in the image area 506. The transform coefficients are stored in the working area 508 on the memory 301.

The shape adaptive inverse DWT processing in step S5212 is the same as that described in the fifth embodiment with reference to FIG. 21, and a description thereof will be omitted here.

Referring back to FIG. 54, if it is determined in step S5207 that decoding of all frequency bands is ended, the flow advances to step S5204 to decode the next block. If it is determined in step S5204 that processing of all block in the frame is ended, the flow advances to step S5213.

In step S5213, image data stored in the image area 506 in step S5212 is output. In step S5214, the output image data is displayed on the monitor 307 by image display software.

With the series of selection operations, image data which is encoded by the DWT unit in consideration of the shape and in which the coefficients are integrated to increase the correlation can be decoded. Hence, the encoded data can be decoded without any degradation. The number of symbols is smaller than that when processing is executed for all sub-band coefficients. Hence, the processing speed can be increased. When motion compensation is executed, the encoding efficiency can be increased.

In this embodiment, the JPEG 2000 encoding method is employed as the image encoding method. However, any other encoding method, and for example, a still image encoding method such as Still Texture Object encoding of MPEG-4 may be used.

The MPEG-4 encoding method is used to encode shape information. However, any other encoding method such as JBIG or MMR may be used. Shape information may be encoded on the upper bits of sub-band coefficients as bit planes.

The function of each unit or those of all units of this embodiment may be implemented by hardware.

Figure 57:
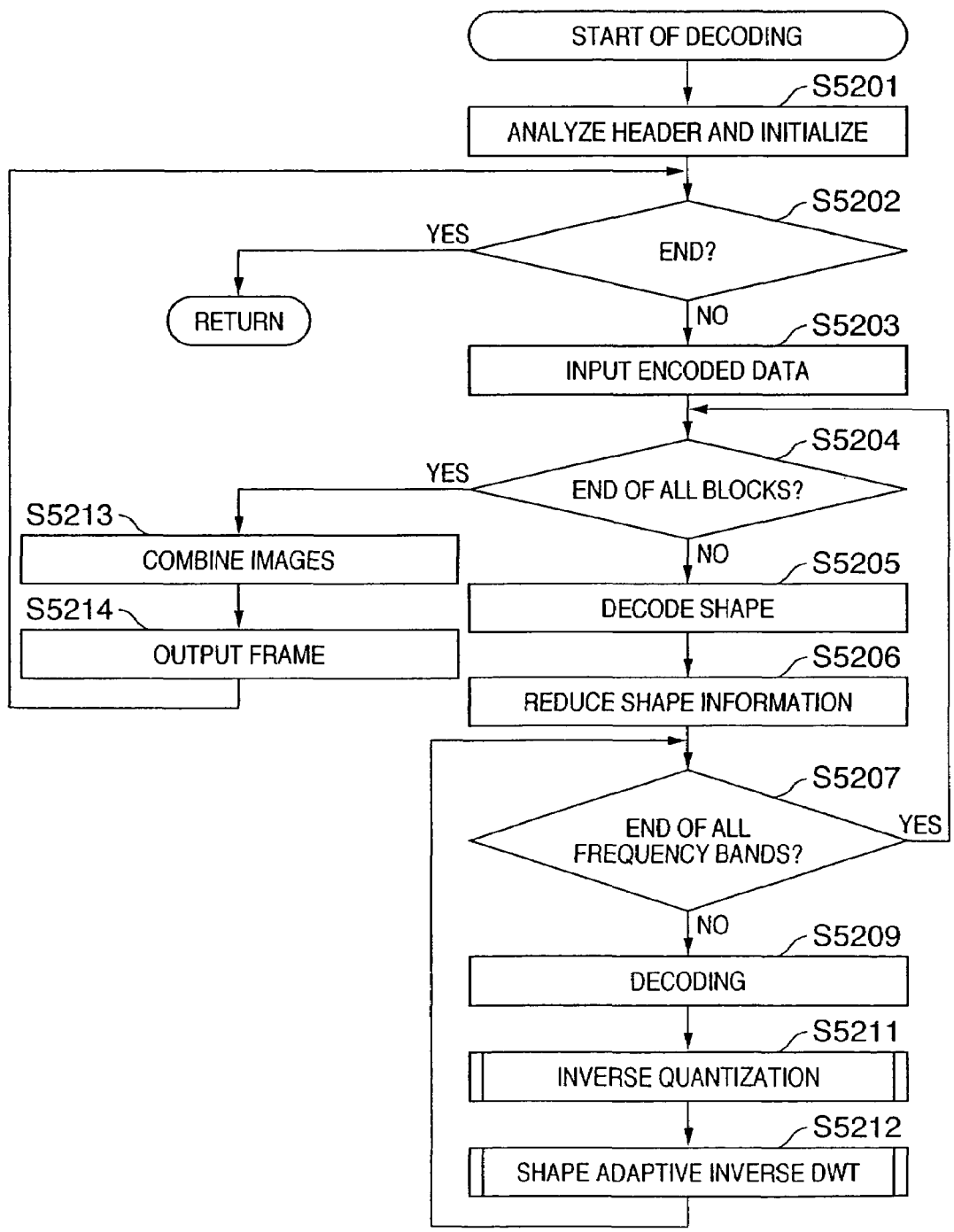
FIG. 57 is a flowchart showing an example of a moving image encoding operation according to the 13th embodiment of the present invention.

FIG. 57 is a flowchart showing another operation of the CPU 300 to cause the moving image encoding software to execute encoding. FIG. 57 is different from FIG. 54 in that coefficient integration in step S5208 and coefficient expansion in step S5210 are omitted. Since the number of reference bits outside the region increases, correlation in encoding becomes low. However, since the integration processing can be omitted, the processing speed can be increased.

14th Embodiment

In the eighth to 13th embodiments, of image data, moving image data is encoded/decoded. However, the application target of the present invention is not limited to moving image data. The present invention can also be applied to a still image. In this embodiment, a still image encoding/decoding apparatus according to the present invention will be described.

An example in which the present invention is applied to a facsimile communication apparatus is already shown in FIG. 27. The arrangement and processing of each constituent element are the same as the contents described in the sixth embodiment.

Figure 58:
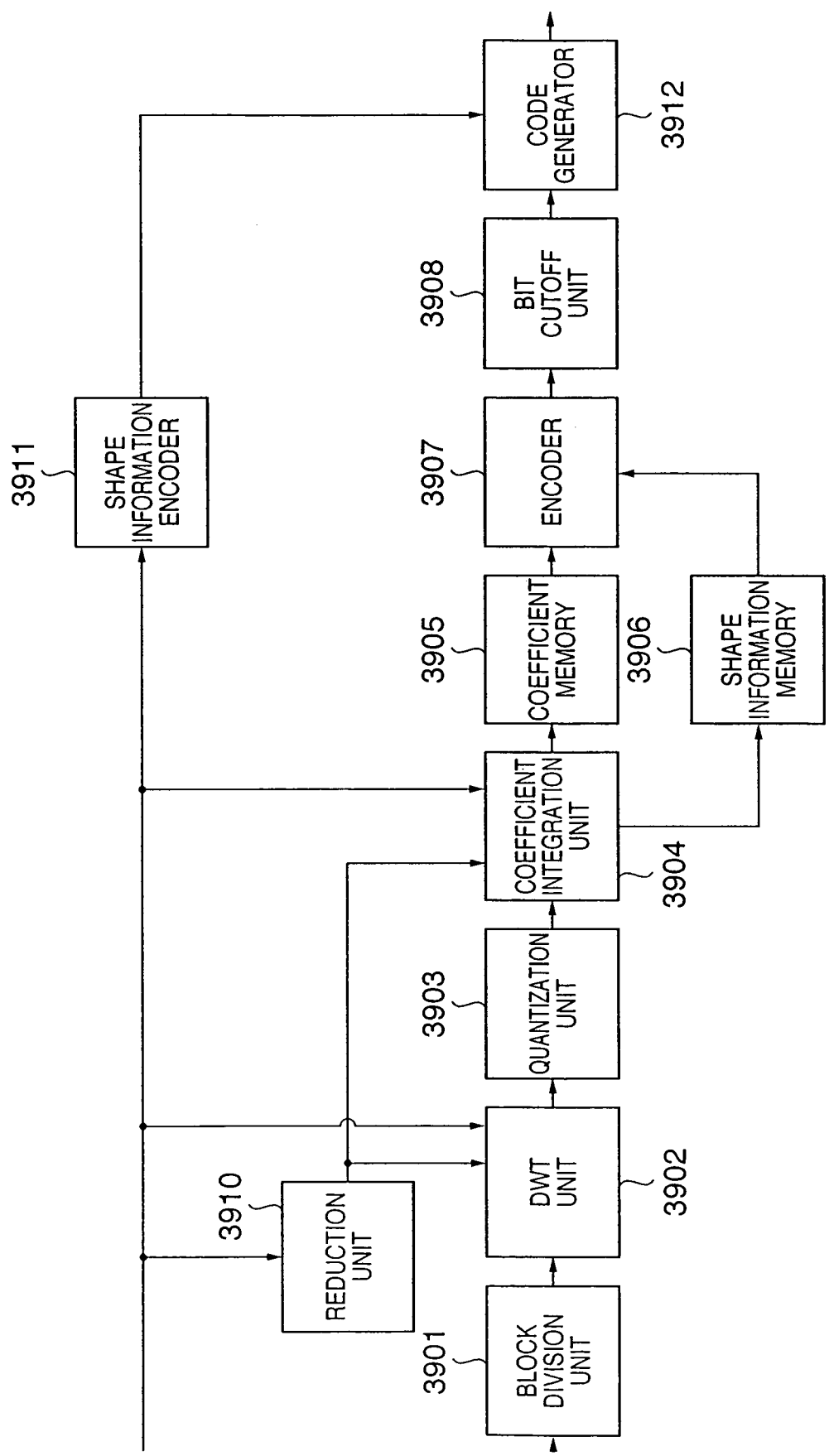
FIG. 58 is a block diagram showing an arrangement example of a still image encoding apparatus according to the 14th embodiment of the present invention.

However, a still image encoding apparatus 10007 according to this embodiment has an arrangement shown in FIG. 58. The JPEG 2000 encoding method will be exemplified as the image encoding method used by the still image encoding apparatus 10007. However, the present invention is not limited to this. In addition, the MMR encoding method will be exemplified as the shape encoding method. However, the present invention is not limited to this.

The basic arrangement of the apparatus shown in FIG. 58 is the same as that of the moving image encoding apparatus shown in FIG. 39. However, the apparatus shown in FIG. 58 has no block division unit 3909 in FIG. 39. Hence, a reduction unit 3910 reduces shape information received from a shape information memory 10006 in accordance with the frequency band of a DWT unit 3902.

The remaining processes are basically the same as those of the moving image encoding apparatus described in the eighth embodiment, and a description thereof will be omitted here.

A still image encoding apparatus according to this embodiment is the same as that described in the seventh embodiment, and a description thereof will be omitted here.

As described above, in the present invention, expansion is executed by DWT in consideration of the shape, and encoding/decoding is executed by referring to shape information. Hence, encoding/decoding corresponding to an arbitrary shape is possible. When coefficients are integrated, the correlation between coefficients in a region can be increased, and encoding/decoding can be performed efficiently.

In the above-described embodiments, the JPEG 2000 encoding method is employed as the image encoding method. However, any other encoding method, and for example, a still image encoding method such as Still Texture Object encoding of MPEG-4 may be used.

The MMR encoding method is used to encode shape information. However, any other encoding method such as JBIG or MPEG-4 encoding method may be used. Shape information may be encoded on the upper bits of sub-band coefficients as bit planes.

The structures of memories and latches are not limited to those described above. A shape information memory or coefficient memory may be used together with other memories. Alternatively, data may be read out directly from a memory without using any latch group.

The function of each unit or those of all units of this embodiment may be described by software and executed by an arithmetic device such as a CPU.

According to the present invention, efficient shape encoding and encoded data decoding corresponding to an arbitrary shape can be executed. In the present invention, in the encoding method of encoding sub-band coefficients, efficient encoding and encoded data decoding corresponding to an arbitrary shape can be implemented.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-203703 filed on Jul. 9, 2004, Japanese Patent Application No. 2004-203704 filed on Jul. 9, 2004, Japanese Patent Application No. 2005-166169 filed on Jun. 6, 2005 and Japanese Patent Application No. 2005-166170 filed on Jun. 6, 2005, the entire contents of which are hereby incorporated by reference herein.

What is claimed is:

1. An image encoding apparatus comprising:
   a frequency band division unit for dividing image data into a plurality of frequency bands to generate sub-band coefficients;
   a sub-band coefficient interpolation unit for interpolating sub-band coefficients outside a region of a shape by using shape information representing a shape of the image data and the sub-band coefficients in the region of the shape;
   an encoding unit for encoding the interpolated sub-band coefficients to generate encoded data; and
   a shape information encoding unit for encoding the shape information to generate shape information encoded data.

2. The apparatus according to claim 1, wherein said frequency band division unit comprises an interpolation unit for interpolating, for pixels outside the region, by using pixel data in the region on the basis of the shape information.

3. The apparatus according to claim 1, wherein said sub-band coefficient interpolation unit interpolates by repeating a coefficient belonging to a boundary of the region.

4. The apparatus according to claim 1, wherein said sub-band coefficient interpolation unit repeatedly interpolates by using a nearest coefficient belonging to a boundary of the region.

5. The apparatus according to claim 1, wherein said sub-band coefficient interpolation unit interpolates by using an average value of coefficients belonging to a boundary of the region.

6. An image encoding method comprising:
   a frequency band division step of dividing image data into a plurality of frequency bands to generate sub-band coefficients;
   a sub-band coefficient interpolation step of interpolating sub-band coefficients outside a region of a shape by using shape information representing a shape of the image data and the sub-band coefficients in the region of the shape;
   an encoding step of encoding the interpolated sub-band coefficients to generate encoded data;
   a shape information encoding step of encoding the shape information to generate shape information encoded data; and wherein the above steps are performed by a computer.

7. A computer-readable recording medium recording a program that, when executed by a computer, carries out the method of claim 6.

8. An image decoding apparatus for decoding encoded data obtained by encoding sub-band coefficients of frequency-divided image data and shape information encoded data obtained by encoding shape information representing a shape of the image data, comprising:

- a shape information decoding unit for decoding the shape information encoded data to generate the shape information;
- a decoding unit for decoding the encoded data to generate the sub-band coefficients;
- a frequency band combination unit for combining the frequency bands to generate the image data by interpolating and combining sub-band coefficients outside a region of the shape with reference to the shape information; and
- an output unit for outputting the shape information and the image data.

9. An image decoding method of decoding encoded data obtained by encoding sub-band coefficients of frequency-divided image data and shape information encoded data obtained by encoding shape information representing a shape of the image data, comprising:

- a shape information decoding step of decoding the shape information encoded data to generate the shape information;
- a decoding step of decoding the encoded data to generate the sub-band coefficients;
- a frequency band combination step of combining the frequency bands to generate the image data by interpolating and combining sub-band coefficients outside a region of the shape with reference to the shape information;
- an output step of outputting the shape information and the image data; and
- wherein the above steps are performed by a computer.

10. A computer-readable recording medium recording a program that, when executed by a computer, carries out the method of claim 9.

* * * * *